(12) United States Patent
Strohalm et al.

(10) Patent No.: US 10,615,015 B2
(45) Date of Patent: Apr. 7, 2020

(54) METHOD FOR IDENTIFICATION OF THE ELEMENTAL COMPOSITION OF SPECIES OF MOLECULES

(71) Applicant: Thermo Fisher Scientific (Bremen) GmbH, Bremen (DE)

(72) Inventors: Martin Strohalm, Bremen (DE); Hans Pfaff, Ganderkesee (DE); Evgenia Razumovski, San Diego, CA (US)

(73) Assignee: Thermo Fisher Scientific (Bremen) GMBH, Bremen (DE)

( * ) Notice: Subject to any disclaimer, the term of this patent is extended or adjusted under 35 U.S.C. 154(b) by 249 days.

(21) Appl. No.: 15/441,066

(22) Filed: Feb. 23, 2017

(65) Prior Publication Data
US 2018/0240659 A1   Aug. 23, 2018

(51) Int. Cl.
| | | |
|---|---|---|
| H01J 49/00 | (2006.01) | |
| H01J 49/34 | (2006.01) | |
| G01N 30/86 | (2006.01) | |
| G01N 30/72 | (2006.01) | |

(52) U.S. Cl.
CPC ...... *H01J 49/0036* (2013.01); *G01N 30/7233* (2013.01); *G01N 30/8631* (2013.01); *H01J 49/34* (2013.01)

(58) Field of Classification Search
CPC .......... H01J 49/00; H01J 49/34; G01N 30/86; G01N 30/72
USPC ........................................................ 436/173
See application file for complete search history.

(56) References Cited

U.S. PATENT DOCUMENTS

| | | | | |
|---|---|---|---|---|
| 8,831,888 B2 | 9/2014 | Pfaff | | |
| 2006/0284068 A1* | 12/2006 | Amirav | ........ | H01J 49/0036 250/282 |
| 2008/0001079 A1 | 1/2008 | Wang et al. | | |
| 2008/0052011 A1* | 2/2008 | Wang | ........ | H01J 49/0036 702/27 |
| 2009/0076737 A1* | 3/2009 | Wang | ........ | G01N 33/6848 702/23 |
| 2009/0299653 A1* | 12/2009 | Pfaff | ........ | G06K 9/00543 702/28 |
| 2009/0302213 A1* | 12/2009 | Kuehl | ........ | H01J 49/0009 250/282 |
| 2010/0171032 A1* | 7/2010 | Wang | ........ | H01J 49/0009 250/282 |
| 2011/0224104 A1* | 9/2011 | Razumovski | ........ | C12Q 1/04 506/26 |
| 2012/0049058 A1* | 3/2012 | Grothe, Jr. | ........ | H01J 49/0036 250/282 |
| 2013/0110412 A1* | 5/2013 | Valkenborg | ........ | G06K 9/00563 702/23 |
| 2014/0045273 A1* | 2/2014 | Cerda | ........ | G01N 27/62 436/173 |
| 2014/0361159 A1* | 12/2014 | Pfaff | ........ | H01J 49/0036 250/282 |
| 2015/0228464 A1* | 8/2015 | Duchoslav | ........ | H01J 49/004 250/282 |
| 2015/0369782 A1* | 12/2015 | Kageyama | ........ | H01J 49/0036 250/288 |

OTHER PUBLICATIONS

Rockwood, A. L. et al, Analytical Chemistry 1996, 68, 2027-2030.*
Seebass, B. et al, J. Chem. Inf. Comput. Sci. 1999, 39, 713-717.*
Rockwood, A. L. et al, Journal of the American Society for Mass Spectrometry 2003, 14, 311-322.*
Grange, A. H. et al, Rapid Communications in Mass Spectrometry 2005, 19, 2699-2715.*
Kim, S. et al, International Journal of Mass Spectrometry 2006, 251, 260-265.*
Stoll, N. et al, Journal of the American Society for Mass Spectrometry 2006, 17, 1692-1699.*
Bocker S. et al, "Decomposing Metabolomic Isotope Patterns", In: Algorithms in Bioinformatics, WABI 2006, Lecture Notes in Computer Science, Bucher P. et al. (eds), 2006, vol. 4175. Springer, Berlin, Heidelberg.*
Koch, B. et al, Analytical Chemistry 2007, 79, 1758-1763.*
Nakamura, Y. et al, Plant Biotechnology 2008, 25, 377-380.*
Bocker S. et al, Bioinformatics 2008, 24, i49-i55.*
Taylor, N. S. et al, Metabolomics 2009, 5, 44-58.*
Rogers, S. et al, Bioinformatics 2009, 25, 512-518.*
Zhu, P. et al, Analytical Chemistry 2009, 81, 5910-5917.*
Erve, J. C. L. et al, Journal of the American Society for Mass Spectrometry 2009, 20, 2058-2069.*
Wolf, S. et al, BMC Bioinformatics 2010, 11, paper 148, 12 pages.*
Kaufmann, A., Rapid Communications in Mass Spectrometry 2010, 24, 2035-2045.*
Miura, D. et al, Analytical Chemistry 2010, 82, 5887-5891.*
Ibsen, A. et al, Analytical Chemistry 2010, 82, 7319-7328.*
Weber, R. J. M. et al, Analytical Chemistry 2011, 83, 3737-3743.*
Thiele, H. et al, Monatshefte fur Chemie 2011, 142, 717-730.*
Rojas-Cherto, M. et al, Bioinformatics 2011, 27, 2376-2383.*
Stanstrup, J. et al, Analytical and Bioanalytical Chemistry 2013, 405, 5037-5048.*

(Continued)

*Primary Examiner* — Arlen Soderquist

(57) ABSTRACT

Methods of identification of at least one most likely elemental composition of at least one species of molecules contained in a sample and/or originated from a sample by at least one ionisation process are provided. The method includes measuring a mass spectrum of the sample and may include reducing the measured mass spectrum to a neutral mass spectrum. The method further includes determining for a peak of interest a set of candidate species of molecules which have an expected peak with a peak position within a peak position tolerance range in the corresponding measured mass spectrum or neutral mass spectrum. An identification mass spectrum is identified for each candidate species and a range of peak positions is determined of all peaks of the identification mass spectrum. Two subscores of candidate species are determined by comparing the identification spectra with the measured or neutral mass spectrum and final scores are calculated from the subscores. An elemental composition of the candidate species is determined having calculated final scores of the highest values.

16 Claims, 7 Drawing Sheets

(56) References Cited

OTHER PUBLICATIONS

Meringer, M. et al, Metabolites 2013, 3, 440-462.*
Duhrkop, K. et al, Metabolites 2013, 3, 506-516.*
Baran, B. et al, Analytical Chemistry 2013, 85, 9777-9784.*
Duhrkop, K. et al, Mass Spectrometry (Tokyo) 2014, 3, paper S0037, 6 pages.*
Loos, M. et al, Analytical Chemistry 2015, 87, 5738-5744.*
Ruff, M. et al, Water Research 2015, 87, 145-154.*
Treutler, H. et al, Metabolites 2016, 6, paper 37, 21 pages.*
Thermo FreeStyle User Guide Software Version 1.2 XCALI-97891 Revision A Dec. 2016 pp. iii-viii, 1-2, 83-140 and 177-190.*
Kaltenbach et al., SAMPI: Protein Identification with Mass Spectra Alignments, BMC Bioinformatics, 2007, 1471-2105, 8:102.
Martens et al., "Algorithms and Databases," Methods in Molecular Biology, Humana Press, Inc., 245-259, Jan. 1, 2009.
Meringer et al., "MS/MS Data Improves Automated Determination of Molecular Formulas by Mass Spectrometry," MATCH Commun. Math. Comput. Chem., 65, 259-290, 2011.
Pluskal et al., "Highly Accurate Chemical Formula Prediction Tool Utilizing High-Resolution Mass Spectra, MS/MS Fragmentation, Heuristic Rules, and Isotope Pattern Matching," Anal. Chem., 84, 4396-4403, 2012.
Tenhosaari, "Computer-assisted Composition Analysis of Unknown Compounds by Simultaneous Analysis of the Intensity Ratios of Isotope Patterns of the Molecular Ion and Daughter Ions in low-resolution Mass Spectra," Organic Mass Spectrometry, 23, 236-239, 1988.
Zhang et al., "Predicting Molecular Formulas of Fragment Ions with Isotope Patterns in Tandem Mass Spectra," IEEE/ACM Transactions on Computational Biology and Bioinformatics, 2(3), 217-230, Jul.-Sep. 2005.

* cited by examiner

METHOD FOR IDENTIFICATION OF THE ELEMENTAL COMPOSITION OF SPECIES OF MOLECULES

TECHNICAL FILED OF THE INVENTION

The invention provides methods of identification of one or more most likely elemental compositions of at least one species of molecules M, particularly only the most likely elemental composition of at least one species of molecules M. The method includes using a mass spectrometer to measure a mass spectrum of a sample. With the methods, one or more most likely elemental compositions of species of molecules M, which are contained in the sample investigated by the mass spectrometer or originated from the sample investigated by the mass spectrometer by at least one ionization process, can be identified.

BACKGROUND OF THE INVENTION

Methods to identify one or more most likely elemental compositions of one species of molecules, mostly various species of molecules, are in general available. Preferably these methods are used to identify the most likely elemental composition of species of molecules like herbicides, insecticides, other pesticides, lipids, soluble or suspended solids in leachates, metabolites, drugs, narcotics, molecules in extracts having typically a mass of up to 400 u, preferably up to 500 u and particularly preferably up to 600 u.

These methods are used to investigate samples. By these methods an elemental composition is identified for species of molecules contained the investigated sample.

A species of molecules is defined as a class of molecules having the same molecular formula (e.g. water has the molecular formula $H_2O$ and benzene the molecular formula $C_6H_6$.) By the molecular formula of a species of molecules is the elemental composition of the species of molecules described. The molecular formula is listing all elements which are contained in the molecule by indicating the symbol of the elements according to the periodic table of chemical elements of IUPAC and is listing by the index on the right side of the symbol of the element the number of atoms of the element which the molecule is consisting of. So for a simple example a benzene molecule, which is having the molecular formula $C_6H_6$, is consisting of 6 carbon atoms (symbol C) and 6 hydrogen atoms (symbol H). Molecules having the same moelcular formula may have different structural formulas due to different isomeric forms, which may have different enantiomeric structures resulting in different physical, chemical and biological properties.

There are much more complicated molecules of bigger molecular formulas, e.g. in organic matters. For example there is the herbicide sulfentrazone, which is having the molecular formula: $C_{11}H_{10}Cl_2F_2N_4O_3S$. Pesticides like sulfentrazone are not allowed to be used in many countries. Sulfentrazone may bear e.g. a greater risk to aquatic species and honey bees.

Sometimes the investigated sample can be better understood by ions which are originated from the sample by at least an ionization process and the elemental composition of the ions. The ions may be preferably generated by electrospray ionization (ESI), matrix-assisted laser desorption ionization (MALDI), plasma ionization, electron ionization (EI), chemical ionization (CI) and atmospheric pressure chemical ionization (APCI). The generated ions are charged particles mostly having a molecular geometry and a corresponding molecular formula. In the context of this patent application the term "species of molecules originated from a sample by at least an ionisation process" shall be understood is referring to the molecular formula of an ion which is originated from a sample by at least an ionization process. So the elemental composition of a species of molecules contained in a sample can be deduced from its ion which is originated from the sample by at least an ionization process ionizing the species of molecules by looking for the elemental composition of the ion and then reducing the charge of the ion to zero and changing the elemental composition accordingly to the ionisation process as described below.

So the methods to identify a most likely elemental composition of one species of molecules can be also used to identify the elemental composition of ions which are originated from a sample by at least an ionization process.

In the species of molecules all molecules have the same composition of atoms according to the molecular formula. But most atoms of the molecule can occur as different isotopes. For example the basic element of the organic chemistry, the carbon atom occurs in two stable isotopes, the $^{12}C$ isotope with a natural probability of occurrence of 98.9% and an isotope mass of 12 u and the $^{13}C$ isotope (having one more neutron in its atomic nucleus) with a natural probability of occurrence of 1.1% and an isotope mass of 13.003355 u. Due to these probabilities of occurrence of the isotopes particularly complex molecules of higher mass consisting of a higher number of atoms have a lot of isotopomers, in which the atoms of the molecule exist as different isotopes. In the whole context of the patent application these isotopomers of a species of molecule designated as the "isotopes of the species of molecule". These isotopes have different masses resulting in a mass distribution of the isotopes of species of molecules, named in the content of this patent application isotope distribution (short term: ID) of the species of molecules. Each species of molecules therefore can have different masses but for a better understanding and identification of a species of molecules to each molecule is assigned a monoisotopic mass. This is the mass of a molecule when each atom of the molecule exists as the most abundant naturally occurring stable isotope. For example a methane molecule has the molecular formula $CH_4$ and hydrogen has the isotopes $^1H$ having on a proton in its nucleus with a natural probability of occurrence of 99.985% and an isotope mass of 1.007825 u and $^2H$ (deuterium) having an additional neutron in its nucleus with a natural probability of occurrence of 0.015% and an isotope mass of 2.014102 u. So the most abundant naturally occurring stable isotope of carbon is $^{12}C$ and the most abundant naturally occurring stable isotope of hydrogen is $^1H$. Accordingly the monoisotopic mass of methane is 16.031300 u, which is the mass of the methane isotope consisting of one $^{12}C$ isotope and four $^1H$ isotopes. But there is a small probability of other methane isotopes having the masses 17.034655 u (comprising a $^{13}C$ isotope) and 17.037577 u (comprising one $^2H$ isotope), 18.040932 u (comprising a $^{13}C$ isotope and one $^2H$ isotope) and 18.043854 u (comprising two $^2H$ isotopes), 19.047209 u (comprising a $^{13}C$ isotope and two $^2H$ isotopes) and 19.050131 u (comprising three $^2H$ isotopes), 20.053486 u (comprising a $^{13}C$ isotope and three $^2H$ isotopes) and 20.056408 u (comprising four $^2H$ isotopes) and 21.059763 u (consisting of a $^{13}C$ isotope and four $^2H$ isotopes). All these other isotopes belong to the isotope distribution of methane and can be visible in the mass spectrum of methane in a mass spectrometer.

The identification of the most likely elemental composition of at least one species of molecules is particularly possible by measuring a mass spectrum of the investigated sample with a mass spectrometer. In general every kind of mass spectrometer can be used known to a person skilled in the art to measure a mass spectrum of the sample. In particular it is preferred to use a mass spectrometer of high resolution like a mass spectrometer having an Orbitrap® mass analyzer or other electrostatic ion traps as mass analyzer, a Fourier transform (FT) mass spectrometer, an ion cyclotron (ICR) mass spectrometer or a multi reflection time of flight (MR-TOF) mass spectrometer. Other mass spectrometers for which the inventive method can be applied are particularly time of flight (TOF) mass spectrometer, magnetic sector mass spectrometer and mass spectrometer with a high resolution (HR) quadrupole mass analyzer.

Molecules already present in the sample are set free e.g. by evaporation and spraying and charged or are only charged by the ionization process. The molecules may be charged e.g. by the reception and/or emission of electrons or the receptions of ions to form an adduct ion. The method of the invention is able to assign to these species of molecules contained in the sample its most likely elemental composition due to their ions which are detected in the mass spectrum of the mass spectrometer.

The ionization process can change the molecules contained in the sample by fragmentation to smaller charged particles which are charged due to the process. Also by an ionization process the matrix of a sample can be split into molecules which are charged. So all these ions are originated from the sample by a described ionization process. So for these ions their species of the molecules originated from the sample have to be investigated by a method for identification of elemental composition of the species of molecules.

Ultra-high resolution mass spectrometry, such as is achievable using a Fourier transform ion cyclotron resonance mass spectrometer (FT-ICR-MS), or an Orbitrap™ mass spectrometer, enables the identification of thousands of different molecular formulas in organic matter. Coupled with liquid chromatography (LC), accurate mass determination of components of complex mixtures can be made on a routine basis. Applications include, amongst others, screening combinatorial chemistry libraries and identifying metabolites related to drug discovery, screening for anabolic steroids in illegal cocktails and fungal metabolites in culture extracts, and elucidating unknown compounds in environmental water.

The output from the mass spectrometer must be interpreted before samples can be characterised, and this presents technical problems. Molecular formula assignment from mass data is most critical and time-consuming. Accurate mass measurement by mass spectrometry is a common technique to determine elemental composition, facilitated by ultra high resolution mass spectrometers. Despite technological advances and improved mass accuracy, often the mass accuracy alone does not provide unequivocal identification. In many cases, several different structural formulae can be identified for the same molecular mass. The number of candidate formulae increases exponentially with mass, making high mass molecular determination particularly challenging. Therefore, automated procedures are required for an efficient exploitation of the extensive data sets produced by mass spectrometry, when characterising samples.

Typically the species of molecules for which the elemental composition has to be identified are composed from a specific set of elements. For each element is defined how much atoms of the element might be contained in the species of molecules. For each element X the number of atoms contained in the species of molecules may be limited. There is a minimum number $Min_x$ of atoms of the element X and a maximum number $Max_x$ of atoms of the element X in the species of molecules.

Various methods of determining the elemental composition of species of molecules contained in a sample and/or originated from a sample by at least an ionization process have been proposed, yet there remains a need for a method that identifies the elemental composition with further inproved correctness taking into account all information made available by a measured mass spectrum.

The well-known method to identify the most likely composition of species of molecules is the method to calculate a pattern spectral distance (PSD) described in the U.S. Pat. No. 8,831,888 B2. With this method a measured mass spectrum is compared with expected mass spectra of molecules belonging to a set of candidate molecules. Peaks in the measured spectrum and the expected spectrum are assigned to each other by calculating a spectral distance value SD. By this value the positional difference and the intensity difference is taken into account and for each expected peak the measured peak with the smallest spectral distance is assigned. If no peak can be identified within an expected positional error and an expected intensity error, no peak identification was possible. When the pattern spectral distance value is calculated for the whole expected mass spectrum of a molecule according to its isotope distribution any non-identified peak in the calculation gets a penalty value. There are two modes described for the pattern spectral distance value. One time the penalty is given for any non-identified expected peak, in the other mode the penalty is given for any non-identified measured peak.

Another method is described by Pluskal et al., Anal. Chem. 2012, 84, 4396-4403, to identify the elemental composition of molecules. In this method a score is defined to identify the best matching expected mass spectrum of a candidate species molecule with a measured mass spectrum, which is taking into account the intensity difference of measured and expected peaks in a mass tolerance range. Further a comparison of a measured $MS^2$ mass spectrum with the expected $MS^2$ mass spectrum after fragmentation of the candidate species molecule is used to exclude candidate species molecule.

A further method to identify the elemental composition of molecules is described by Meringer et al., Commun. Math, Comput. Chem. 65, 259-290 (2011). In this method a score is defined to identify the best matching expected mass spectrum of a candidate species molecule with a measured mass spectrum, which is taking into account the intensities of measured and expected peaks. Further from a comparison of a measured $MS^2$ mass spectrum with the expected $MS^2$ mass spectrum after fragmentation of the candidate species molecule a second score is derived and then both scores are used in a combined score to identify an elemental composition of a molecule.

Also in Tenhosaari, Organic Mass Spectrometry, Vol. 23, 236-239 (1988) and Zhang et al., IEEE/ACM Transactions on Computational Biology and Bioinformatics, Vol. 2, No. 3, 217-230 (2005) two scores are derived from a comparison of a measured mass spectrum with an expected mass spectrum and a comparison of an $MS^2$ mass spectrum with an expected $MS^2$ mass spectrum and then used in an combined score to identify an elemental composition of a molecule.

It is the object of the invention to find a method of identification which is able to improve the correctness of the identified elemental composition of species of molecules further, when the elemental composition shall be identified based on measured mass spectra. It is one object of the invention to take into account as much information as possible of a measured mass spectrum. This is particularly important if mass spectra of high resolution or ultra high resolution are available which are increasing the amount of usable information. A further object of the invention is that the method of high correctness shall determine one or more most likely elemental compositions of the investigated species of molecules in a manner which does not need too much time and capacities. A further object is that the method shall be able to be adapted to any class of investigated molecules and shall be able to provide procedures to improve the correctness and/or reduce the effort of the method further.

SUMMARY OF THE INVENTION

The above mentioned objects are solved by a new method of identification of one or more most likely elemental compositions of at least one species of molecules M contained in a sample and/or originated from a sample by at least an ionization process according to—embodiments of the present invention and mass spectrometers able to execute these methods of identification.

One embodiment of the inventive method according to claim 1 comprises the following steps:

(i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;

(ii) determine for a peak of interest $C_{int}$ of the measured mass spectrum $I_{meas}(p)$ or neutral mass spectrum $I_{neut}(p)$ a set $S_{cand}$ of candidate species of molecules $M_{cand}$ from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;

(iii) determining for each candidate species $M_{cand}$ of the set $S_{cand}$ of candidate species of molecules $M_{cand}$ an identification mass spectrum $I_{id,M\_cand}(p)$ corresponding to the measured mass spectrum $I_{meas}(p)$ or the neutral mass spectrum $I_{neut}(p)$ and determining a range of peak positions $\Delta p$ comprising the peak positions $p_{id,M\_cand,i}$ of all peaks $C_{id,M\_cand,i}$ of the identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;

(iv) comparing the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,I}$ in the neutral mass spectrum $I_{neut}(p)$, which are not identified in the identification mass spectrum $I_{id,M\_cand}(p)$ of the candidate species $M_{cand}$ calculating for each candidate species $M_{cand}$ of the set $S_{cand}$ of candidate species of molecules $M_{cand}$ a final score $fs_{M\_cand}$ from the subscores $s_{i,M\_cand}$ or calculating for each candidate species $M_{cand}$ of the set $S_{cand}$ of candidate species of molecules $M_{cand}$ a final score $f_{M\_cand}$ from the subscores $s_{i,M}$ cand, for which one of both of the subscores of the first method and the second method $s_{1,M\_cand}$ and $s_{1,M\_cand}$ are higher than an assigned threshold value $s_{i,th,fs}$ for calculating the final score $fs_{M\_cand}$; i;

(v) determining one or more calculated final scores $fs_{high,k}$ having the highest values;

(vi) determining the elemental composition of the candidate species $M_{cand,high\_k}$ of the set $S_{cand}$ of candidate species of molecules $M_{cand}$ which have the one or more calculated final scores $fs_{high,\ k}$ of the highest values.

In step (i) of inventive method for identification of the elemental composition of molecules M a mass spectrum $I_{meas}(p)$ of a sample is measured with a mass spectrometer. The molecule M, for which its elemental composition shall be identified is contained in the sample or is originated from the sample by at least one ionization process. A measured mass spectrum $I_{meas}(p)$ is any mass spectrum, which is detected by a detection system of mass spectrometer and may be after the detecting processed by any kind of correcting and calculation process like e.g. a convolution process.

If a mass spectrum of a sample shall be measured with a mass spectrometer, it is necessary to ionize the material of the sample, in particular the molecules $M_0$ contained in the sample, if the sample is liquid and/or gaseous. By this ionization of the molecule $M_0$ ions are resulting depending on the process of ionization like e.g. $[M_0]^+$, $[M_0]^-$, $[M_0+H]^+$, $[M_0+I_{ad}]$ and $[M_0-M_{frag}]^+$. The ions may be multicharged with a charge of n*e, wherein n is number of charges and e is the elementary charge ($1.6021766208*10^{-19}$ C), resulting e.g. in the ion $[M_0]^{n+}$. During the ionization an ion like $I_{ad}^+$ may by be added to the molecule $M_0$ forming the adduct $[M_0+I_{ad}]^+$, which might be a molecule or an element like e.g. Na or K resulting in the ions $[M_0+Na]^+$ or $[M_0+K]^+$.

If the elemental composition of a species of molecules M shall be identified by the inventive method, which is originated from the sample by an ionization process, the elemental composition of the ion resulting from the ionization process shall be identified by the inventive method. If the resulting ion is e.g. $[M_0+H]^+$, then the elemental composition of a species of molecules $M=[M_0+H]^+$ shall be identified. The measured mass spectrum $I_{meas}(p)$ shows the abundance of the ionized ions given by a measured intensity I depending on their mass to charge ratio m/z, whereby this ratio is similar or related to the peak position p of the measured mass spectrum $I_{meas}(p)$. So the measured mass spectrum $I_{meas}(p)$ contains the information about the mass to charge ratio m/z of the species of molecules M, which shall be investigated. In particular it contains the information about the mass to charge ratio m/z of all isotopes of the species of molecules M. By this information the inventive method is able to identify the most like elemental composition of the species of molecules M, if it is originated from the sample by an ionization process.

Depending on the used mass analyser the peak position in an measured mass spectrum may be the mass to charge ratio m/z of the investigated ions, the mass of ions, if the ions have only one charge state, the flight time t in time of flight mass spectrometers or a frequency ω e.g. when using an Orbitrap® mass analyser, an ion cyclotron (ICR) mass spectrometer or another Fourier transform (FT) mass spectrometer. The flight time t and frequency $\omega$ have a clearly defined relation to the mass to charge ratio m/z according to the fundamental rules of the different mass analyzer technologies well known to a skilled person.

If the elemental composition of a species of molecules M shall be identified by the inventive method, which is contained in a sample, so that $M=M_0$, in some embodiments of the inventive method the measured mass spectrum $I_{meas}(p)$ has to be reduced to a neutral mass spectrum $I_{neut}(p)$ according to the ionization process. As already mentioned before, it is necessary to ionize to material of the sample to measure with the ions originated a mass spectrum of a sample with a mass spectrometer. The measured mass spectrum $I_{meas}(p)$ shows then the abundance of the ionized ions given by a measured intensity I depending on their peak position p, in particular the mass to charge ratio m/z. To get the information about the peak position p, in particular the mass to charge ratio m/z or mass m, of the species of molecules $M=M_0$ the measured mass spectrum $I_{meas}(p)$ has to be reduced to a neutral mass spectrum $I_{neut}(p)$ by changing the peak position p, in particular the mass to charge ratio m/z, according to the mass shift, which has happened to the molecules $M_0$ contained in the sample due to the ionization process. If for example during the ionization an adduct $M_{ad}$ has been added to molecules $M_0$ contained in the sample resulting in the ion $[M_0+M_{ad}]^+$ the mass of the adduct $M_{ad}^+$ has to be subtracted from the mass measured in the measured mass spectrum $I_{meas}(p)$ (realize that for this ion is z=1 and therefore the measured mass to charge m/z is similar to the mass of the measured ions) to get the mass of the neutral molecule $M_0$ contained in the sample. A skilled person knows how to reduce a measured mass spectrum $I_{meas}(p)$ of the ions to the neutral mass spectrum $I_{neut}(p)$ of the neutral molecules $M_0$ contained in the sample according to the used ionization process.

So the neutral mass spectrum $I_{neut}(p)$ contains the information about the mass to charge ratio m/z of the species of molecules $M_0$, contained in the sample. In particular it contains the information about the mass to charge ratio m/z of all isotopes of the species of molecules $M=M_0$. By this information the inventive method is able to identify the most like elemental composition of the species of molecules M, if contained in the sample.

Preferably the neutral mass spectrum $I_{neut}(m)$ may contain the information about the mass m of the species of molecules $M_0$ contained in the sample. In particular it may contain the information about the mass m of all isotopes of the species of molecules $M=M_0$.

In step (ii) of the inventive method at first a peak of interest $C_{int}$ in the measured mass spectrum $I_{meas}(p)$ or neutral mass spectrum $I_{neut}(p)$ is identified. This can be done manually by a user or according to some defined criteria like the intensity of the peak and the position of the peak. Particularly the peak of interest $C_{int}$ might be the peak of highest intensity in the whole mass spectrum or in a range of the position of the mass spectrum or a peak with an intensity which is higher than a specific value. If the peak position $p_{int}$ is the criteria to define the peak of interest $C_{int}$ it can be required that the peak of interest $C_{int}$ has a peak position $p_{int}$ in a range around an expected value. This expected value of the peak position can be defined for example by the expected peak position of the highest peak of the isotope distribution of an species of molecules M which shall be analysed, particularly because this species of molecules M shall be identified in the sample if it existing in the sample. The peak of interest $C_{int}$ can be also defined to be positioned in a range of peak positions which are assigned to specific class of molecules which shall be identified in the investigated sample. The peak of interest $C_{int}$ can also be defined by two criteria like the intensity of the peak $I_{int}$ and the position of the peak $p_{int}$. Here a combination of the criteria described before can be used.

Further on a set $S_{inv}$ of species of molecules $M_{inv}$ has to be defined, for which molecules $M_{inv}$ it has to be investigated if their isotope distribution occurs in the measured mass spectrum $I_{meas}(p)$ or neutral mass spectrum $I_{neut}(p)$. This set $S_{inv}$ of species of molecules $M_{inv}$ can be defined by a lot of criteria as described below and according to the expectation which kind of species of molecules can be present in the investigated sample.

In step (ii) of the inventive method it is determined a set $S_{cand}$ of candidate species of molecules $M_{cand}$ from the defined set $S_{inv}$ of species of molecules $M_{inv}$ which have an expected peak $C_{ex,inv}$ in a mass spectrum corresponding to the measured mass spectrum $I_{meas}(p)$ or neutral mass spectrum $I_{neut}(p)$ with a peak position $p_{ex,inv}$ within a peak position within the tolerance range $\Delta p_{tol}$ assigned to the peak of interest $C_{int}$ in the corresponding measured mass spectrum $I_{meas}(p)$ or neutral mass spectrum $I_{neut}(p)$. It is the intention of step (ii) to reduce to number of investigated species of molecules $M_{inv}$ of the set $S_{inv}$ to a smaller number of candidate species of molecules $M_{cand}$ of the set $S_{cand}$ by the criterion that an expected peak $C_{ex,inv}$ of the candidate species of molecules $M_{cand}$ has a peak position $p_{ex,inv}$ in the tolerance range $\Delta p_{tol}$ assigned to the peak of interest $C_{int}$. The candidate species of molecules $M_{cand}$ might have one or more expected peaks $C_{ex,inv,i}$ which have a peak position $p_{ex,inv,i}$ in the tolerance range $\Delta p_{tol}$ assigned to the peak of interest $C_{int}$. So only investigated species of molecules $M_{inv}$, for which is known that they have a peak, the expected peak $C_{ex,inv}$, with nearly the same peak position as the peak of interest $C_{int}$, will be investigated further in the inventive method as candidate species of molecules $M_{cand}$ to be identified. The allowed deviation of the peak positions of the expected peak $C_{ex,inv}$ and the peak of interest $C_{int}$ is defined by the peak position tolerance range $\Delta p_{tol}$.

The peak position $p_{ex,inv}$ of the expected peak $C_{ex,inv}$ has to be given by a mass spectrum which corresponds the mass spectrum in which the peak of interest $C_{int}$ is identified. So if the peak of interest $C_{int}$ is identified in the measured mass spectrum $I_{meas}(p)$ the peak position $p_{ex,inv}$ of the expected peak $C_{ex,inv}$ has to be defined for a mass spectrum corresponding to the measured mass spectrum $I_{meas}(p)$.

If the peak position p in the measured mass spectrum is given by the mass to charge ratio m/z, then the peak position $p_{ex,inv}$ of the expected peak $C_{ex,inv}$ has a mass to charge value $m/z_{ex,inv}$ to be defined for a mass spectrum corresponding to the measured mass spectrum $I_{meas}(m/z)$. In particular in this case only the mass to charge value $m/z_{ex,inv}$ of the expected peak $C_{ex,inv}$ has to be known. If the mass to charge value $m/z_{ex,inv}$ of a species of molecules $M_{inv}$ is within the mass to charge tolerance range $\Delta m/z_{tol}$ of the peak of interest $C_{int}$ then the species of molecules $M_{inv}$ is a candidate species of molecules $M_{cand}$ which will be investigated further.

If the peak position p in the measured mass spectrum is given by the flight time t in a mass spectrum measured by a TOF mass analyzer, then the peak position $p_{ex,inv}$ of the expected peak $C_{ex,inv}$ has a flight time value $t_{ex,inv}$ to be defined for a mass spectrum corresponding to the measured time of flight mass spectrum $I_{meas}(t)$ by assuming the parameters of the measurement. So from a known mass to charge value $m/z_{ex,inv}$ of the expected peak $C_{ex,inv}$ the corresponding flight time value $t_{ex,inv}$ of the expected peak $C_{ex,inv}$ can be deduced. If the mass to flight time $t_{ex,inv}$ of a species of molecules $M_{inv}$ is within the flight time tolerance range $\Delta t_{tol}$ of the peak of interest $C_{int}$ then the species of molecules $M_{inv}$ is a candidate species of molecules $M_{cand}$ which will be investigated further.

For each species of molecules $M_{inv}$ their expected peaks $C_{ex,inv,i}$ are available or can be deduced from theory or experiments which might be executed before.

If the expected peaks $C_{ex,inv,I}$ of species of molecules $M_{inv}$ are deduced from experiments, they can be deduced from mass spectra measured from standard samples or samples containing the species of molecules $M_{inv}$. In standard sample the species of molecules $M_{inv}$ may be enriched to measure a mass spectra with peaks of high intensity of the isotope distribution of the species of molecules $M_{inv}$. A lot of mass spectra measured from standard samples or samples containing the species of molecules $M_{inv}$ can be compared, evaluated e.g. by summing up to identify a standard mass spectrum of the standard samples or average mass spectrum of samples containing the species of molecules $M_{inv}$, which can be assigned to the species of molecules $M_{inv}$.

The so achieved mass spectra can be stored in a database and used later to determine if a species of molecules $M_{inv}$ belongs to the set $S_{cand}$ of the candidate species $M_{cand}$ by taking into account one, some or all peaks of the mass spectra.

If the expected peaks $C_{ex,inv,I}$ of species of molecules $M_{inv}$ are deduced from theory, it is possible to calculate a theoretical mass spectrum $I_{th,M\_inv}$. Methods to do these calculations are well known.

The theoretical mass spectrum $I_{th,M\_inv}(p)$ can be a mass spectrum corresponding to the measured mass spectrum $I_{meas}(p)$ or the neutral mass spectrum $I_{neut}(p)$. It can be a calculated mass spectrum according to the expected isotope distribution of the molecule $M_{inv}$. During the calculation the resolving power of the mass spectrometer measuring the measured mass spectrum $I_{meas}(p)$ can be taken into account. Also the other instrumental parameters or the instrumental characteristic of the mass spectrometer measuring the measured mass spectrum $I_{meas}(p)$ can be taken into account. Also only the expected centroid of an isotope of the candidate species $M_{inv}$ can be taken into account, which is a peak pattern or only the expected centroid of the peaks $C_{th,M\_inv,i}$ of an theoretical mass spectrum $I_{th,M\_inv}(p)$. The theoretical mass spectrum $I_{th,M\_inv}(p)$ can be also be a mass spectrum of the species of molecules $M_{inv}$, which is stored in a database after it has been calculated. If the elemental composition of species of molecules M contained in the sample shall be identified, which is a uncharged and therefore neutral molecule, then a theoretical mass spectrum $I_{th,M\_inv}(p)$ of the species of molecules $M_{inv}$ is used, which corresponds a the neutral mass spectrum $I_{neut}(p)$, which is achieved by the reduction of the measured mass spectrum $I_{meas}(p)$. If the elemental composition of species of molecules M originated from the investigated sample by at least one ionization process shall be identified, which is therefore an ion and a charged molecule, then a theoretical mass spectrum $I_{th,M\_inv}(p)$ of the species of molecules M is used, which corresponds to the measured mass spectrum $I_{meas}(p)$.

In the step (ii) of the inventive method it is not necessary to know the mass spectrum $I_{M\_inv}(p)$ of the species of molecules $M_{inv}$ of the set $S_{inv}$. The candidate species of molecules $M_{cand}$ have a peak position $p_{ex,inv}$ within the tolerance range $\Delta p_{tol}$ assigned to the peak of interest $C_{int}$. Therefore it is only necessary to know the portion of the mass spectrum $I_{M\_inv}(p)$ of the species of molecules $M_{inv}$ of the set $S_{inv}$ within the tolerance range $\Delta p_{tol}$ assigned to the peak of interest $C_{int}$.

It is also possible that for the species of molecules $M_{inv}$ the isotope distribution is deduced from a theoretical mass spectrum or mass spectrum deduced for the species of molecules $M_{inv}$ from experiments. By the peak pattern of the isotope distribution for each isotope n is identified in the mass spectrum a peak $C_{ID,inv,n}$ having a peak position $p_{ID,inv,n}$, in particularly the mass to charge ratio $m/z_{ID,inv,n}$, and mass $m_{ID,inv,n}$ and an intensity $I_{ID,inv,n}$ correlated to the abundance of the isotope n. Then the peaks $C_{ID,inv,n}$ of the isotope distribution of the species of molecules $M_{inv}$ can be used as expected peaks $C_{ex,inv}$ of the species of molecules $M_{inv}$ in step (ii) of the inventive method.

It is also possible that for the species of molecules $M_{inv}$ a list of isotope masses $m_n$ is deduced from a theoretical mass spectrum or mass spectrum deduced for the species of molecules $M_{inv}$ from experiments. For each isotope n a mass $m_n$ is identified in the mass spectrum, which might be listed and/or stored in a table. Then the list of masses $m_n$ are used to determine the candidate species of molecules $M_{cand}$ which have an expected peak $C_{ex,n}$ of the isotope n in a mass spectrum corresponding to the measured mass spectrum $I_{meas}(p)$ or the neutral mass spectrum $I_{neut}(p)$ with the mass $m_n$ within a mass tolerance range $\Delta p_{tol}$ assigned to the peak of interest $C_{int}$ in the corresponding measured mass spectrum $I_{meas}(p)$ or neutral mass spectrum $I_{neut}(p)$.

It is also possible that for the species of molecules $M_{inv}$ a list of isotope masses $m_n$ is deduced from a theoretical mass spectrum or mass spectrum deduced for the species of molecules $M_{inv}$ from experiments. For specific isotopes n is identified in the mass spectrum an mass $m_n$, which might be listed and/or stored in a table. The specific isotope n for which their mass is listed in the list of isotope masses $m_n$, may be e.g. selected by having an intensity in a mass spectrum higher than a threshold value, having a mass in a specific mass range, belonging to the x isotopes having the highest intensity in the mass spectrum and/or belonging to the x isotopes having the lowest mass in the mass spectrum. Then the list of masses $m_n$ are used to determine the candidate species of molecules $M_{cand}$ which have an expected peak $C_{ex,n}$ of the isotope n in a mass spectrum corresponding to the measured mass spectrum $I_{meas}(p)$ or the neutral mass spectrum $I_{neut}(p)$ with the mass $m_n$ within a mass tolerance range $\Delta p_{tol}$ assigned to the peak of interest $C_{int}$ in the corresponding measured mass spectrum $I_{meas}(p)$ or neutral mass spectrum $I_{neut}(p)$.

It is also possible that for the species of molecules $M_{inv}$ a list of single masses $m_{inv}$ is deduced from a theoretical mass spectrum or mass spectrum deduced for the species of molecules $M_{inv}$ from experiments. The single mass $m_{inv}$ may be e.g. the monoisotopic mass of the molecule $M_{inv}$ or the most abundant mass of molecule $M_{inv}$, which may be listed and/or stored in a database. Then the single masses $m_{inv}$ is used to determine the candidate species of molecules $M_{cand}$ which have an expected peak $C_{ex}$ in a mass spectrum corresponding to the measured mass spectrum $I_{meas}(p)$ or the neutral mass spectrum $I_{neut}(p)$ with the single mass $m_{inv}$ within a mass tolerance range $\Delta p_{tol}$ assigned to the peak of interest $C_{int}$ in the corresponding measured mass spectrum $I_{meas}(p)$ or neutral mass spectrum $I_{neut}(p)$.

The expected peaks $C_{ex,inv,i}$ of a species of molecules $M_{inv}$ can be available or can be deduced from theory which may be executed before also in the following way:

It can be used in step (ii) an algorithm which is able define all molecules $M_{cand}$ of the set of molecules which have at least one expected peak $C_{ex,n}$ of an isotope n of the molecule $M_{cand}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$. From the set $S_{inv}$ of investigated species of molecules $M_{inv}$ the algorithm is excluding all molecules which do not have an expected peak $C_{ex,n}$ with a peak position $p_{ex,inv}$ within the peak position tolerance range $\Delta p_{tol}$.

It can be used in step (ii) an algorithm to determine to set $S_{cand}$ of candidate species $M_{cand}$ which is able define all molecules $M_{cand}$ of the set of molecules which have a monoisotopic mass or a most abundant mass in a mass spectrum corresponding to the measured mass spectrum $I_{meas}(p)$ or the neutral mass spectrum $I_{neut}(p)$ within a mass tolerance range $\Delta p_{tol}$ assigned to the peak of interest $C_{int}$ in the corresponding measured mass spectrum $I_{meas}(p)$ or neutral mass spectrum $I_{neut}(p)$.

A theoretical mass spectrum $I_{th,M\_inv}(p)$ can be a calculated mass spectrum according to the expected isotope distribution of the molecule $M_{inv}$. This calculation can be done for a complete expected isotope distribution or only for a part of the isotope distribution. The calculation can be limited to isotopes having an abundance higher than a threshold value. The calculation can be limited to a specific number of isotopes having the highest abundance and/or having the lowest mass in the mass spectrum.

The tolerance range $\Delta p_{tol}$ assigned to the peak of interest $C_{int}$ is defined in the mass spectrum which is corresponding to the mass spectrum in which the expected peaks $C_{ex,inv}$ of the species of molecules $M_{inv}$ used in step (ii) are known. If the elemental composition of species of molecules $M_{cand}$ contained in the sample shall be identified with the inventive method, then tolerance range $\Delta p_{tol}$ assigned to the peak of interest $A_{int}$ is defined in the neutral mass spectrum $I_{neut}(p)$.

If the peak of interest $C_{int}$ is identified in the neutral mass spectrum $I_{neut}(p)$, the peak of interest $C_{int}$ has a peak position $p_{int,neut}$ in the neutral mass spectrum $I_{neut}(p)$ and the tolerance range $\Delta p_{tol}$ is assigned to the peak of interest $C_{int}$ by a range around the peak position $p_{int,neut}$ of the peak of interest $C_{int}$. Preferably the tolerance range $\Delta p_{tol}$ is symmetrically to the peak position $p_{int,neut}$ of the peak of interest $C_{int}$, so that the distance between lower endpoint of the tolerance range $\Delta p_{tol}$ and the peak position $p_{int,neut}$ of the peak of interest $C_{int}$ is equal to the distance between higher endpoint of the tolerance range $\Delta p_{tol}$ and the peak position $p_{int,neut}$ of the peak of interest $C_{int}$.

If the peak of interest $C_{int}$ is identified in the measured mass spectrum $I_{meas}(p)$, at first the peak position $p_{int,meas}$ of the peak of interest $C_{int}$ in the measured mass spectrum $I_{meas}(p)$ is identified and then reduced to the peak position $p_{int,neut}$ of the peak of interest $C_{int}$ in the neutral mass spectrum $I_{neut}(p)$ due to the knowledge of the at least one ionization process applied to the investigated sample in the mass spectrometer before the measured mass spectrum $I_{meas}(p)$ has been measured. Then the tolerance range $\Delta p_{tol}$ is assigned to the peak of interest $C_{int}$ by a range around the peak position $p_{int,neut}$ of the peak of interest $C_{int}$ as described before.

If the elemental composition of species of molecules $M_{cand}$ originated from the sample by at least one ionization process shall be identified with the inventive method, then in an preferred embodiment the tolerance range $\Delta p_{tol}$ assigned to the peak of interest $C_{int}$ is defined in the measured mass spectrum $I_{meas}(p)$.

The peak of interest $C_{int}$ has a peak position $p_{int,meas}$ in the measured mass spectrum $I_{meas}(p)$ and the tolerance range $\Delta p_{tol}$ is assigned to the peak of interest $C_{int}$ by a range around the peak position $p_{int,meas}$ of the peak of interest $C_{int}$. Preferably the tolerance range $\Delta p_{tol}$ is symmetrically to the peak position $p_{int,meas}$ of the peak of interest $C_{int}$, so that the distance between the lower endpoint of the tolerance range $\Delta p_{tol}$ and the peak position $p_{int,meas}$ of the peak of interest $C_{int}$ is equal to the distance between higher endpoint of the tolerance range $\Delta p_{tol}$ and the peak position $p_{int,meas}$ of the peak of interest $C_{int}$.

The range of peak position tolerance $\Delta p_{tol}$ is preferably correlated with the mass accuracy of the mass spectrometer measuring the mass spectrum in step (i) in that way that with higher mass accuracy the range of the peak position tolerance $\Delta p_{tol}$ can be reduced. Preferably the range of peak position tolerance $\Delta p_{tol}$ should be reduced with higher resolving power of the mass spectrometer measuring the mass spectrum in step (i) to avoid to identify a neighbour peak of the peak corresponding to the peak of interest $C_{int}$ as the expected peak $C_{ex,inv}$.

Preferably the peak position tolerance $\Delta p_{tol}$ is symmetrical to the peak position $p_{int,meas}$ of the peak of interest $C_{int}$ and is given by or deduced from the mass tolerance ratio $R_{m\_tol}$ of the distance between the endpoints $m_{min}$ or $m_{max}$ of the mass tolerance range $\Delta m_{tol}$ and the mass $m_{int,meas}$ of the peak of interest $C_{int}$. The mass tolerance ratio $R_{m\_tol}$ can be typically expressed by a ppm value.

$$R_{m_{tol}}[\text{ppm}] = \frac{m_{max} - m_{int,meas}}{m_{int,meas}} * 1{,}000{,}000 = \frac{m_{int,meas} - m_{min}}{m_{int,meas}} * 1{,}000{,}000$$

Typically a mass tolerance ratio $R_{m\_tol}$ to determine the candidate species of molecules $M_{cand}$ is used between 0.5 ppm and 30 ppm, preferably between 2 ppm and 10 ppm and particularly preferably between 3 ppm and 7 ppm.

Also preferably the peak position tolerance $\Delta P_{tol}$ is symmetrically to the peak position $p_{int,meas}$ of the peak of interest $C_{int}$ and is given by or deduced from the mass to charge tolerance ratio $R_{m/z\_tol}$ of the distance between the endpoints $m/z_{min}$ or $m/z_{max}$ of the mass to charge tolerance range $\Delta m/z_{to}$ and the mass to charge value $m/z_{int,meas}$ of the peak of interest $C_{int}$. The mass to charge tolerance ratio $R_{m/z\_tol}$ can be typically expressed by a ppm value.

$$R_{\frac{m}{z}_{tol}}[\text{ppm}] = \frac{m/z_{max} - m/z_{int,meas}}{m/z_{int,meas}} * 1{,}000{,}000 = \frac{m/z_{int,meas} - m/z_{min}}{m/z_{int,meas}} * 1{,}000{,}000$$

Typically a mass to charge tolerance ratio $R_{m/z\_tol}$ to determine the candidate species of molecules $M_{cand}$ in step (ii) of the inventive method is used between 0.5 ppm and 30 ppm, preferably between 2 ppm and 10 ppm and particularly preferably between 3 ppm and 7 ppm. In step (iii) of the inventive method for each candidate species $M_{cand}$ of the set $S_{cand}$ of candidate species of molecules $M_{cand}$ determined before in step (ii) an identification mass spectrum $I_{id,M\_cand}(p)$ is determined, which is for each candidate species $M_{cand}$ corresponding to the measured mass spectrum $I_{meas}(p)$ or for each candidate species $M_{cand}$ corresponding to the neutral mass spectrum $I_{neut}(p)$.

The identification mass spectra $I_{id,M\_cand}(p)$ can be theoretical mass spectra $I_{th,M\_cand}(p)$ of the candidate species of molecules. The theoretical mass spectra $I_{th,M\_cand}(p)$ can be calculated during the execution of the method or can be calculated before and stored in a database. This database may be available in a storage of the used mass spectrometer or available via an internet connection in an external storage or a cloud system.

It is possible that in both steps (ii) and (iii) for the candidate species $M_{cand}$ of the set $S_{cand}$ of candidate species of molecules $M_{cand}$ theoretical mass spectra $I_{th,M\_cand}(p)$ are calculated which correspond to the measured mass spectrum $I_{meas}(p)$ and the theoretical mass spectra $I_{th,M\_cand}(p)$ are used in step (iii) as identification mass spectrum $I_{id,M\_cand}(p)$. Particularly the same theoretical mass spectra $I_{th,M\_cand}(p)$ may be used in both steps.

It is also possible that in both steps (ii) and (iii) for the candidate species $M_{cand}$ of the set $S_{cand}$ of candidate species of molecules $M_{cand}$ theoretical mass spectra $I_{th,M\_cand}(p)$ are calculated which correspond to the neutral mass spectrum $I_{neut}(p)$ and the theoretical mass spectra $I_{th,M\_cand}(p)$ are used in step (iii) as identification mass spectrum $I_{id,M\_cand}(p)$. Particularly the same theoretical mass spectra $I_{th,M\_cand}(p)$ may be used in both steps.

In other embodiments of the inventive method in one step of the steps (ii) and (iii) for the candidate species $M_{cand}$ of the set $S_{cand}$ of candidate species of molecules $M_{cand}$ theoretical mass spectra $I_{th,M\_cand}(p)$ are calculated which correspond to the measured mass spectrum $I_{meas}(p)$ and in the other step for the candidate species $M_{cand}$ of the set $S_{cand}$ of candidate species of molecules $M_{cand}$ theoretical mass spectra $I_{th,M\_cand}(p)$ are calculated which correspond to the neutral mass spectrum $I_{neut}(p)$ wherein one kind of theoretical mass spectra $I_{th,M\_cand}(p)$ are used in step (iii) as identification mass spectrum $I_{id,M\_cand}(p)$.

The identification mass spectra $I_{id,M\_cand}(p)$ can be deduced from experiments. They can be mass spectra measured from standard samples or samples containing the species of molecules $M_{inv}$. In standard sample the species of molecules $M_{inv}$ may be enriched to measure a mass spectra with peaks of high intensity of the isotope distribution of the species of molecules $M_{inv}$. A lot of mass spectra measured from standard samples or samples containing the species of molecules $M_{inv}$ can be compared, evaluated e.g. by summing up to identify a standard mass spectrum of the standard samples or average mass spectrum of samples containing the species of molecules $M_{inv}$, which can be assigned to the species of molecules $M_{inv}$.

The so achieved mass spectra can be stored in a database and used later. This database may be available in a storage of the used mass spectrometer, in a local storage of a data processing system or available via an internet connection in an external storage or a cloud system.

So the determination of identification mass spectra $I_{id,M\_cand}(p)$ in step (iii) can be done by the calculation of theoretical mass spectra $I_{th,M\_cand}(p)$, the deduction from experiments or the identification of the identification mass spectra $I_{id,M\_cand}(p)$ in databases.

The identification mass spectra $I_{id,M\_cand}(p)$ may be complete mass spectra of the candidate species of molecules $M_{cand}$ showing the whole isotope distribution of the molecule only limited by the resolution and signal-to-noise ratio S/N under which the identification mass spectra $I_{id,M\_cand}(p)$ are calculated or deduced from experiments.

The identification mass spectra $I_{id,M\_cand}(p)$ may be also only a part of a complete mass spectrum of the candidate species of molecules $M_{cand}$.

The identification mass spectra $I_{id,M\_cand}(p)$ may be comprise only peaks of isotopes having an abundance higher than a threshold value.

The identification mass spectra $I_{id,M\_cand}(p)$ may be limited to a specific number of peaks of isotopes having the highest abundance and/or having the lowest mass in the mass spectrum.

In step (iii) of the inventive method further a range of peak positions $\Delta p$ is determined in which the determined identification mass spectra $I_{id,M\_cand}(p)$ of all candidate species $M_{cand}$ of the set $S_{cand}$ of candidate species of molecules $M_{cand}$ are arranged. The range of peak positions $\Delta p$ is determined by identifying a range of peak positions which is comprising the peak positions $p_{th,i}$ of all peaks $C_{th,M\_cand,i}$ of the complete identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$. So in the range of peak positions $\Delta p$ all peaks $C_{th,M\_cand,i}$ of the identification mass spectra $I_{id,M\_cand}(p)$ of all candidate species $M_{cand}$ of the set $S_{cand}$ of candidate species of molecules $M_{cand}$ are positioned in the range of peak positions $\Delta p$. The lower endpoint of the range of peak positions $\Delta p$ is similar or below the lowest value of a peak position $p_{th,i}$ of any peak $C_{th,M\_cand,I}$ of all candidate species $M_{cand}$ of the set $S_{cand}$ of candidate species of molecules $M_{cand}$ and the highest endpoint of the range of peak positions $\Delta p$ is similar or above the highest value of a peak position $p_{th,i}$ of any peak $C_{id,M\_cand,I}$ of all candidate species $M_{cand}$ of the set $S_{cand}$ of candidate species of molecules $M_{cand}$. So if the identification mass spectra $I_{id,M\_cand}(p)$ are complete mass spectra of the candidate species of molecules $M_{cand}$ it is guaranteed that in the range of peak positions $\Delta p$ all isotope distributions of all candidate species $M_{cand}$ of the set $S_{cand}$ of candidate species of molecules $M_{cand}$ are completely encompassed. In the range of peak positions $\Delta p$ each identification mass spectrum $I_{id,M\_cand}(p)$ of a candidate species of molecules $M_{cand}$ can be compared with the corresponding measured mass spectrum $I_{meas}(p)$ or the neutral mass spectrum $I_{neut}(p)$ without missing any peak of the candidate species of molecules $M_{cand}$ existing in its identification mass spectrum $I_{id,M\_cand}(p)$.

In step (iv) of the inventive method this comparison of the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ is executed in the determined range of peak positions $\Delta p$. In specific embodiments of the inventive method the execution of the comparison of the measured mass spectrum $I_{meas}(p)$ or the neutral mass spectrum $I_{neut}(p)$ with an identification mass spectrum $I_{id,M\_cand}(p)$ of the candidate species $M_{cand}$ can be executed in the determined range of peak positions $\Delta p$, wherein the comparison is not executed in an subrange of the determined range of peak positions $\Delta p$. This subrange is then excluded from the comparison, because in the subrange are no peaks of the measured mass spectrum $I_{meas}(p)$ or the neutral mass spectrum $I_{neut}(p)$ or in the subrange are only peaks $C_{meas,i}$ of the measured mass spectrum $I_{meas}(p)$ or only peaks $C_{neut,i}$ the neutral mass spectrum $I_{neut}(p)$, which do not belong to the same isotope distribution as the peak of interest $C_{int}$. In particular these peaks may be the peaks of a contamination in the sample, which shall not be investigated.

In a preferred embodiment of the invention for each candidate species $M_{cand}$ of the set $S_{cand}$ of candidate species of molecules $M_{cand}$ determined before its identification mass spectrum $I_{id,M\_cand}(p)$ corresponding to the measured mass spectrum $I_{meas}(p)$ is compared with the measured mass spectrum $I_{meas}(p)$.

In another preferred embodiment of the invention for each candidate species $M_{cand}$ of the set $S_{cand}$ of candidate species of molecules $M_{cand}$ determined before its identification mass spectrum $I_{id,M\_cand}(p)$ corresponding to the neutral mass spectrum $I_{neut}(p)$) is compared with the neutral mass spectrum $I_{neut}(p)$.

For the candidate species $M_{cand}$, preferably all candidate species $M_{cand}$ this comparison is done with at least two different methods, a first method and a second method, having a different focus on the features of measured mass spectrum $I_{meas}(p)$ or the neutral mass spectrum $I_{neut}(p)$ derived from the measured mass spectrum $I_{meas}(p)$ and the identification mass spectra $I_{id,M\_cand}(p)$ of the candidate species of molecules $M_{cand}$.

It is also possible to use more than these two methods of comparison in step (iv) of the inventive method.

By the first method to compare the identification mass spectra $I_{id,M\_cand}(p)$ of the candidate species of molecules $M_{cand}$ with measured mass spectrum $I_{meas}(p)$ or the neutral mass spectrum $I_{neut}(p)$ is determined a first subscore $s_{1,M\_cand}$ for each candidate species $M_{cand}$. This first subscore $s_{1,M\_cand}$ of the first method is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$. So the first method is in particular sensitive in its subscore $s_{1,M\_cand}$ for peaks $C_{id,M\_cand,i}$ of an identification mass spectrum $I_{id,M\_cand}(p)$ of a candidate species $M_{cand}$, which cannot be identified in the measured mass spectrum $I_{meas}(p)$ or neutral mass spectrum $I_{neut}(p)$.

For simplification of the further explanation it is assumed that a high subscore $s_{i,M\_cand}$ of a candidate species $M_{cand}$ in a method to compare the identification mass spectra $I_{id,M\_cand}(p)$ of the candidate species of molecules $M_{cand}$ with measured mass spectrum $I_{meas}(p)$ or the neutral mass spectrum $I_{neut}(p)$ and also a high final score $fs_{M\_cand}$ of a candidate species $M_{cand}$ indicates that an elemental composition of the candidate species $M_{cand}$ is more likely the elemental composition of a molecule M contained in an investigated sample or a molecule M originated from an investigated sample by at least one ionization process. Nevertheless by the described inventive method it is also encompassed that a low subscore $s_{i,M\_cand}$ of a candidate species $M_{cand}$ in a method to compare the identification mass spectra $I_{id,M\_cand}(p)$ of the candidate species of molecules $M_{cand}$ with measured mass spectrum $I_{meas}(p)$ or the neutral mass spectrum $I_{neut}(p)$ and also a low final score $fs_{M\_cand}$ of a candidate species $M_{cand}$ indicates that an elemental composition of the candidate species $M_{cand}$ is more likely the elemental composition of a molecule M contained in a investigated sample or a molecule M originated from a investigated sample by at least one ionization process. In the same way as the description the patent claims of this patent application should be understood.

When the first method recognizes that a peak $C_{id,M\_cand,i}$ of an identification mass spectrum $I_{id,M\_cand}(p)$ of a candidate species $M_{cand}$ cannot been identified in the measured mass spectrum $I_{meas}(p)$ or neutral mass spectrum $I_{neut}(p)$, the subscore $s_{1,M\_cand}$ of the method is reduced. In particular for each peak $C_{id,M\_cand,i}$ of an identification mass spectrum $I_{id,M\_cand}(p)$ of a candidate species $M_{cand}$ which cannot be identified in the measured mass spectrum $I_{meas}(p)$ or neutral mass spectrum $I_{neut}(p)$ the subscore $s_{1,M\_cand}$ of the first method is reduced. The reduction can be for every not identified peak $C_{id,M\_cand,I}$ in the same way and particular be the same. The reduction can depend also on the intensity of the not identified peak $C_{id,M\_cand,I}$ expected in the identification mass spectrum $I_{id,M\_cand}(p)$. The reduction may be proportional to the intensity of the not identified peak $C_{id,M\_cand,I}$ expected in the identification mass spectrum $I_{id,M\_cand}(p)$ or stepwise depending on the intensity of the not identified peak $C_{id,M\_cand,I}$ expected in the identification mass spectrum $I_{id,M\_cand}(p)$. It may be possible that there is no reduction if the intensity of the not identified peak $C_{id,M\_cand,i}$ is below a threshold value. In general, the first method is taking care if expected peaks the identification mass spectrum $I_{id,M\_cand}(p)$ are found in the measured mass spectrum. If expected peaks are missing and in particular expected peaks of high intensity are missing or a lot of expected peaks are missing this is an indicator that the candidate species $M_{cand}$ is not abundant which is resulting in a lower score $s_{1,M\_cand}$.

In a preferred embodiment of the first method to compare the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ the method described in the U.S. Pat. No. 8,831,888 B2 can be used. Then the first subscore $S_{1,M\_cand}$ is the pattern spectral distance (PSD) calculated for the elemental composition of the candidate species of molecules $M_{cand}$. In the calculation of the pattern spectral distance (PSD) any non-identified peak $C_{id,M\_cand,i}$ of the identification mass spectrum $I_{id,M\_cand}(p)$ is penalized.

In another preferred embodiment as the first method to compare the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ a method is used which is determining an identification mass spectrum coverage score $s_{2,M\_cand}$. There score is given by the ratio, how much of the intensity of the peaks $C_{id,M\_cand,i}$ in the identification mass spectra $I_{id,M\_cand}(p)$ in the in the range of peak positions $\Delta p$ is identified by the measured mass spectrum $I_{meas}(p)$ or neutral mass spectrum $I_{neut}(p)$. This is done by assigning to each peaks $C_{id,M\_cand,i}$ in the identification mass spectra $I_{id,M\_cand}(p)$ its centroid intensity $I_{id,M\_cand,i}$.

For example, if in an identification mass spectra $I_{id,M\_cand}(p)$ in the range of peak positions $\Delta p$ 7 peaks are identified, the peaks $C_{id,M\_cand,1}, C_{id,M\_cand,2} \cdots C_{id,M\_cand,7}$ having the centroid intensities $I_{id,M\_cand,1}, I_{id,M\_cand,2} \cdots I_{id,M\_cand,7}$ and only a subset of these peaks $C_{id,M\_cand,a}$ is identified by the measured mass spectrum $I_{meas}(p)$ or neutral mass spectrum $I_{neut}(p)$, at first the centroid intensities of these subset is summed up and then divided by the summed up centroid intensities $I_{id,M\_cand,1} I_{id,M\_cand,2} \cdots I_{id,M\_cand,7}$ of all peaks $C_{id,M\_cand,1}, C_{id,M\_cand,2} \cdots C_{id,M\_cand,7}$ identified in the measured mass spectrum $I_{meas}(p)$.

In can be already defined by the second method to compare the identification mass spectra $I_{id,M\_cand}(p)$ with the measured mass spectrum $I_{meas}(p)$, which $C_{id,M\_cand,i}$ in the range of peak positions are identified by the measured mass spectrum $I_{meas}(p)$ or neutral mass spectrum $I_{neut}(p)$. But the measured peaks $C_{id,M\_cand,i}$ in the range of peak positions can be also identified by the measured mass spectrum $I_{meas}(p)$ or neutral mass spectrum $I_{neut}(p)$, if the peak position an measured peak $C_{meas,j}$ deviates not more of than a peak position tolerance value $\Delta p_{cov}$ from a peak position of the peak $C_{id,M\_cand,i}$ of the identification mass spectra $I_{id,M\_cand}(p)$. Typical relative peak position tolerance values are between 1 ppm and 20 ppm, preferably between 2 ppm and 10 ppm and particularly preferably between 3 ppm and 7 ppm.

By the second method to compare the identification mass spectra $I_{id,M\_cand}(p)$ of the candidate species of molecules $M_{cand}$ with measured mass spectrum $I_{meas}(p)$ or the neutral mass spectrum $I_{neut}(p)$ it is determined a second subscore $s_{2,M\_cand}$ for each candidate species $M_{cand}$, wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$. So the second method is in particular sensitive in its subscore $s_{2,M\_cand}$ for peaks $C_{meas,i}$ in the measured mass spectrum $I_{meas}(p)$ or peaks $C_{neut,i}$ in the neutral mass spectrum $I_{neut}(p)$, which cannot be identified in the identification mass spectra $I_{id,M\_cand}(p)$ of the candidate species of molecules $M_{cand}$.

When the second method recognizes that a peak $C_{meas,i}$ in the measured mass spectrum $I_{meas}(p)$ or a peak $C_{neut,i}$ in the neutral mass spectrum $I_{neut}(p)$ cannot be identified in the identification mass spectra $I_{id,M\_cand}(p)$ of the candidate species of molecules $M_{cand}$, the subscore $s_{2,M\_cand}$ of the method is reduced. In particular for each peak $C_{meas,i}$ in the measured mass spectrum $I_{meas}(p)$ or each peak $C_{neut,i}$ in the neutral mass spectrum $I_{neut}(p)$ which cannot been identified in the identification mass spectra $I_{id,M\_cand}(p)$ of the candidate species of molecules $M_{cand}$ the subscore $s_{2,M\_cand}$ of the second method is reduced. The reduction can be for every not identified peak $C_{meas,i}$ or $C_{neut,i}$ the same way and particular be the same. The reduction can depend also on the intensity of the not identified peak $C_{meas,i}$ or $C_{neut,i}$ found in the measured mass spectrum $I_{meas}(p)$ or neutral mass spectrum $I_{neut}(p)$. The reduction may be proportional to the intensity of the not identified peak $C_{meas,i}$ or $C_{neut,i}$ found in the measured mass spectrum $I_{meas}(p)$ or neutral mass spectrum $I_{neut}(p)$ or stepwise depending on the intensity of the not identified peak $C_{meas,i}$ or $C_{neut,i}$ found in the measured mass spectrum $I_{meas}(p)$ or neutral mass spectrum $I_{neut}(p)$. It may be possible that there is no reduction if the intensity of the not identified peak $C_{meas,i}$ or $C_{neut,i}$ is below a threshold value. In general, the second method is taking care if measured peaks in the measured mass spectrum $I_{meas}(p)$ or neutral mass spectrum $I_{neut}(p)$ are explained by the identification mass spectrum $I_{id,M\_cand}(p)$ of a candidate species $M_{cand}$. If measured peaks are missing and in particular measured peaks of high intensity are missing or a lot of measured peaks are missing this is an indicator that the candidate species $M_{cand}$ is not abundant which is resulting in a lower score $s_{2,M\_cand}$.

In a preferred embodiment as the second method to compare the measured mass spectrum $I_{meas}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ a method is used which is determining a measured mass spectrum coverage score $s_{2,M\_cand}$. There score is given by the ratio, how much of the intensity of the measured peaks $C_{meas,i}$ in the measured mass spectrum $I_{meas}(p)$ in the range of peak positions $\Delta p$ is identified by an identification mass spectra $I_{id,M\_cand}(p)$. This is done by assigning to each measured peaks $C_{meas,i}$ in the measured mass spectrum $I_{meas}(p)$ its centroid intensity $I_{meas,i}$.

For example, if in an measured mass spectrum $I_{meas}(p)$ in the range of peak positions 7 peaks are identified, the peaks $C_{meas,1}$, $C_{meas,2}$ ... $C_{meas,7}$ having the centroid intensities $I_{meas,1}$, $I_{meas,2}$ ... $I_{meas,7}$ and only a subset $C_{m1,a}$ of these peaks $C_{meas,a}$ is identified by an identification mass spectra $I_{id,M\_cand}(p)$ of an candidate species $M_{cand}$, at first the centroid intensities of these subset is summed up and then divided by the summed up centroid intensities $I_{meas,1}$, $I_{meas,2}$ ... $I_{meas,7}$ of all peaks $C_{meas,1}$, $C_{meas,2}$ ... $C_{meas,7}$ identified in the measured mass spectrum $I_{meas}(p)$.

In can be already defined by the first method to compare the identification mass spectra $I_{id,M\_cand}(m/z)$ with the measured mass spectrum $I_{meas}(p)$, which measured peaks $C_{meas,i}$ in the range of peak positions are identified by an identification mass spectra $I_{id,M\_cand}(p)$. But the measured peaks $C_{meas,i}$ in the range of peak positions can be also identified by an identification mass spectra $I_{id,M\_cand}(p)$, if the peak position the measured peak $C_{meas,i}$ deviates not more of than a peak position tolerance value $\Delta p_{cov}$ from a peak position of a peak $C_{id,j}$ of the identification mass spectra $I_{id,M\_cand}(p)$. Typical relative peak position tolerance values are between 1 ppm and 20 ppm, preferably between 2 ppm and 10 ppm and particularly preferably between 3 ppm and 7 ppm. For example if for a measured mass spectrum $I_{meas}(p)$ in the range of peak positions $\Delta p$ 7 peaks are identified and if for a species of molecules $M_{ex}$ only the measured peaks $C_{meas,1}$, $C_{meas,3}$, $C_{meas,4}$ and $C_{meas,6}$ are identified by its identification mass spectra $I_{id,M\_ex}(p)$, then the measured mass spectrum coverage score $s_{2,M\_ex}$ is calculated by the formula:

$$s_{2,M\_ex} = \frac{I_{m1,1} + I_{m1,3} + I_{m1,4} + I_{m1,6}}{\sum_{k=1}^{7} I_{m1,k}}$$

In a further embodiment as the second method to compare the neutral mass spectrum $I_{meas}(p)$ with each identification mass spectrum $I_{id,M\_cand}(p)$ of the candidate species $M_{cand}$ of the set $S_{cand}$ of candidate species of molecules $M_{cand}$ corresponding to the neutral mass spectrum $I_{neut}(p)$ a method is used which is determining a neutral mass spectrum coverage score $s_{2,M\_cand}$. There score is given by the ratio, how much of the intensity of the peaks $C_{neut,i}$ in the neutral mass spectrum $I_{neut}(p)$ in the range of peak positions $\Delta p$ is identified by an identification mass spectra $I_{id,M\_cand}(p)$. This is done by assigning to each of the peaks $C_{neut,i}$ in the neutral mass spectrum $I_{neut}(p)$ its centroid intensity $I_{neut,i}$.

For example, if in an neutral mass spectrum $I_{neut}(p)$ in the range of peak positions 7 peaks are identified, the peaks $C_{neut,1}$, $C_{neut,2}$ ... $C_{neut,7}$ having the centroid intensities $I_{neut,1}$, $I_{neut,2}$ ... $I_{neut,7}$ and only a subset $C_{m1,a}$ of these peaks $C_{neut,a}$ is identified by an identification mass spectra $I_{id,M\_cand}(p)$ of an candidate species $M_{cand}$, at first the centroid intensities of these subset is summed up and then divided by the summed up centroid intensities $I_{neut,1}$, $I_{neut,2}$ ... $I_{neut,7}$ of all peaks $C_{neut,1}$, $C_{neut,2}$ ... $C_{neut,7}$ identified in the neutral mass spectrum $I_{neut}(p)$.

In can be already defined by the first method to compare the identification mass spectra $I_{id,M\_cand}(p)$ with the neutral mass spectrum $I_{neut}(p)$, which neutral peaks $C_{neut,i}$ in the range of peak positions are identified by an identification mass spectra $I_{id,M\_cand}(p)$. But the neutral peaks $C_{neut,i}$ in the range of peak positions can be also identified by an identification mass spectra $I_{id,M\_cand}(p)$, if the peak position neutral peak $C_{neut,i}$ deviates not more of than a peak position tolerance value $\Delta p_{cov}$ from a peak position of a peak $c_{id,j}$ of the identification mass spectra $I_{id,M\_cand}(p)$. Typical relative peak position tolerance values are between 1 ppm and 20 ppm, preferably between 2 ppm and 10 ppm and particularly preferably between 3 ppm and 7 ppm.

In another preferred embodiment as the second method to compare the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ the method described in the U.S. Pat. No. 8,831,888 B2 can be used. Then the first subscore $S_{1,M\_cand}$ is the pattern spectral distance (PSD) calculated for the elemental composition of the candidate species of molecules $M_{cand}$. In the calculation of the pattern spectral distance (PSD) any non-identified peak $C_{meas,i}$ of the measured mass spectrum $I_{meas}(p)$ or any non-identified peak $C_{neut,i}$ of the neutral mass spectrum $I_{neut}(p)$ is penalized.

For candidate species $M_{cand}$ of the set $S_{cand}$ of candidate species of molecules $M_{cand}$, preferably all candidate species $M_{cand}$ of the set $S_{cand}$ of candidate species of molecules $M_{cand}$, further in step (iv) of the inventive method a final score $fs_{M\_cand}$ is calculated from the subscores $s_{i,M\_cand}$, when these subscores $s_{i,M\_cand}$ have been determined.

In one embodiment of the inventive method in step (iv) of the inventive method a final score $fs_{M\_cand}$ is calculated from the subscores $s_{i,M\_cand}$ only for all candidate species $M_{cand}$, for which one of both of the subscores of the first method and the second method $s_{1,M\_cand}$ and $s_{1,M\_cand}$ are higher than an assigned threshold value $s_{i,th,fs}$ for calculating the final score $fs_{M\_cand}$. By this criteria the calculation of final scores $fs_{M\_cand}$ is avoided, which due to the value of one subscore have no chance to belong to the final scores $fs_{high,k}$ having the highest values. The threshold values $s_{i,th,fs}$ may be fixed values or derived from a ranking of the candidate species $M_{cand}$ according to a subscore $s_{i,M\_cand}$. Then the value of the subscore $s_{i,M\_cand}$ of the candidate species $M_{cand}$ on a specific rank is defining the threshold values $s_{i,th,fs}$.

In particular the final score $fs_{M\_cand}$ can be calculated from a summation of functions only depending on one subscore $s_{i,M\_cand}$ and functions depending on more than one subscore $s_{i,M\_cand}$. If only the subscores $s_{1,M\_cand}$ and $s_{2,M\_cand}$ are used then the final score $fs_{M\_cand}$ is given by:

$$fs_{M\_cand} = f(s_{1,M_{cand}}) + g(s_{2,M_{cand}}) + h(s_{1,M_{cand}}, s_{2,M_{cand}}) + V$$

f, g and h are functions and V is a constant offset value.

In another embodiment of the inventive method the final score $fs_{M\_cand}$ can be calculated from a summation of only functions, which depend only on one subscore $s_{i,M\_cand}$. If only the subscores $s_{1,M\_cand}$ and $s_{2,M\_cand}$ are used then the final score $fs_{M\_cand}$ is given by:

$$fs_{M\_cand} = f(s_{1,M_{cand}}) + g(s_{2,M_{cand}})$$

In preferred embodiment of the inventive method the final score $fs_{M\_cand}$ can be calculated from a summation of only polynomial functions $(pf_i)$, which depend only on one subscore $s_{i,M\_cand}$. Preferably the polynomial functions are only of degree 2. If only the subscores $s_{1,M\_cand}$ and $s_{2,M\_cand}$ are used then the final score $fs_{M\_cand}$ is given by:

$$fs_{M\_cand} = pf_1(s_{1,M_{cand}}) + pf_2(s_{2,M_{cand}})$$

In a particular preferred embodiment of the inventive method the final score $fs_{M\_cand}$ can be calculated from a summation of linear functions of the subscores $s_{i,M\_cand}$. Each function is defined by a weighting factor fi assigned to each subscore $s_{i,M\_cand}$. If only the subscores $s_{1,M\_cand}$ and $s_{2,M\_cand}$ are used then the final score $fs_{M\_cand}$ is given by:

$$fs_{M\_cand} = f_1 * s_{1,M_{cand}} + f_2 * s_{2,M_{cand}}$$

If one of the subscores $s_i$ is a pattern spectral distance and the other is a mass spectrum coverage score, either an identification mass spectrum coverage score or a measured mass spectrum coverage score or a neutral mass spectrum coverage score, the factor $f_{PSD}$ of the subscore being a pattern spectral distance has typically a value between 0.01 and 0.2, preferably a value between 0.03 and 0.1 and particularly preferably a value between 0.045 and 0.07 and the factor $f_{cov}$ of the mass spectrum coverage score $f_{cov}$ has typically a value between 0.8 and 0.99, preferably a value between 0.9 and 0.97 and particularly preferably a value between 0.093 and 0.955 These values are used when normalizes scores are used. That means that either each single subscore $s_i$ and also the final score fs can reach a maximum value for a best fit of the peaks $C_{id,M\_cand,i}$ of the identification mass spectrum $I_{id,M\_cand}(p)$ with the measured peaks $C_{meas,i}$ of the measured mass spectrum $I_{meas}(p)$ or the peaks $C_{neut,i}$ of the neutral mass spectrum $I_{neut}(p)$, which is preferably 1. It has been found that the combination of both methods to compare the measured mass spectrum $I_{meas}(p)$ or the peaks $C_{neut,i}$ of the neutral mass spectrum $I_{neut}(p)$ with identification mass spectra $I_{id,M\_cand}(p)$ results in an identification of the elemental composition of species of molecules detected by its isotope distribution in a mass spectrum with best results, when the final score fs in the inventive method is calculated by the summation of linear functions of the two subscores $s_{i,M\_cand}$ having the weighting factors $f_{PSD}$ and $f_{cov}$ as mentioned before.

If both subscores $s_1$ and $s_2$ are pattern spectral distance values one time penalizing the non-identified peaks $C_{id,M\_cand,i}$ of the identification mass spectrum $I_{id,M\_cand}(p)$ and the other time penalizing the non-identified measured peaks $C_{meas,i}$ of the measured mass spectrum $I_{meas}(p)$ or the peaks $C_{neut,i}$ of the neutral mass spectrum $I_{neut}(p)$ or both subscores $s_1$ and $s_2$ are mass spectrum coverage scores, one time the identification mass spectrum coverage score or the other time the measured mass spectrum coverage score or the neutral mass spectrum coverage score, the weighting factor $f_1$ and $f_2$ of the subscores being a pattern spectral distance have typically a values between 0.3 and 0.7, preferably a value between 0.4 and 0.6 and particularly preferably a value between 0.45 and 0.55. These values are used when normalizes scores are used. That means that either each single subscore $s_i$ and also the final score fs can reach a maximum value for a best fit of the peaks $C_{id,M\_cand,i}$ of the identification mass spectrum $I_{id,M\_cand}(p)$ with the measured peaks $C_{meas,i}$ of the measured mass spectrum $I_{meas}(p)$ or the peaks $C_{neut,i}$ of the neutral mass spectrum $I_{neut}(p)$, which is preferably 1. It has been found that the combination of both methods to compare the measured mass spectrum $I_{meas}(p)$ or the peaks $C_{neut,i}$ of the neutral mass spectrum $I_{neut}(p)$ with identification mass spectra $I_{id,M\_cand}(p)$ results in an identification of the elemental composition of species of molecules detected by its isotope distribution in a mass spectrum with best results, when the final score fs in the inventive method is calculated by the summation of linear functions of the two subscores $s_{i,M\_cand}$ having the weighting factors $f_1$ and $f_2$ as mentioned before.

In general, if a score is used which is penalizing every missing peak in the same way, this score is addressing only the quality of the fit of the peaks $C_{id,M\_cand,i}$ of the identification mass spectrum $I_{id,M\_cand}(p)$ with the measured peaks $C_{meas,i}$ of the measured mass spectrum $I_{meas}(p)$. If a score is used which is penalizing every missing peak depending on its missing intensity, this score is addressing more the quantity of the fit of the peaks $C_{id,M\_cand,i}$ of the identification mass spectrum $I_{id,M\_cand}(p)$ with the measured peaks $C_{meas,i}$ of the measured mass spectrum $I_{meas}(p)$. For that reason subscores which are penalizing every missing peak in the same way have much smaller weighting factor than subscores which are penalizing every missing peak depending on its missing intensity. The weighting factor fi of the subscores which are penalizing every missing peak in the same way has typically a value between 0.01 and 0.2, preferably a value between 0.03 and 0.1 and particularly preferably a value between 0.045 and 0.07 and the weighting factor of subscores which are penalizing every missing peak depending on its missing intensity has typically a value between 0.8 and 0.99, preferably a value between 0.9 and 0.97 and particularly preferably a value between 0.093 and 0.955. These values are used when normalizes scores are used. That means that either each single subscore $s_i$ and also the final score fs can reach a maximum value for a best fit of the peaks $C_{id,M\_cand,i}$ of the identification mass spectrum $I_{id,M\_cand}(p)$ with the measured peaks $C_{meas,i}$ of the measured mass spectrum $I_{meas}(p)$ or the peaks $C_{neut,i}$ of the neutral mass spectrum $I_{neut}(p)$, which is preferably 1.

All weighting factors and functions used to calculate the final score fs may be adapted to the kind of experiment done to investigate a sample and the kind of molecules which shall be identified. They may be set one time or by an user or by an optimization or learning process.

When the final score $fs_{M\_cand}$ has been calculated for the candidate species $M_{cand}$ of the set $S_{cand}$ of candidate species of molecules $M_{cand}$, in step (v) of the inventive method the final scores $fs_{high,k}$ from all final score $fs_{M\_cand}$ of the candidate species $M_{cand}$ of the set $S_{cand}$ of candidate species of molecules $M_{cand}$ are determined, which have the highest values. The number of final scores $fs_{high,k}$ having the highest values, which shall be determined, can be set manually by an user or by a set value which is defined as default value before the inventive method is used. So one or more final scores $fs_{high,k}$ having the highest values are determined.

Then in the next step (vi) of the inventive method the elemental composition of the candidate species $M_{cand,high\_k}$ of the set $S_{cand}$ of candidate species of molecules $M_{cand}$ is determined which have the one or more calculated final scores $fs_{high,k}$ of the highest values. This is done by looking up the elemental composition of the candidate species $M_{cand}$, if it is realised that the final scores $fs_{M\_cand}$ belongs to the final scores $fs_{high,k}$ of the highest values. The elemental compositions of these candidate species $M_{cand}$ can then be listed with or without their final score $fs_{M\_cand}$ in a table and shown on a display.

In a preferred inventive method for identification of a most likely elemental composition of at least one species of molecules M originated from a sample by at least one ionization process in step (i) a mass spectrum $I_{meas}(p)$ of the sample is measured with a mass spectrometer, in step (ii) for a peak of interest $C_{int}$ of the measured mass spectrum $I_{meas}(p)$ a set $S_{cand}$ of candidate species of molecules $M_{cand}$ from a set $S_{inv}$ of species of molecules $M_{inv}$ is determined which have an expected peak$_{ex,inv}$ in a mass spectrum corresponding to the measured mass spectrum $I_{meas}(p)$ with a peak position $p_{ex,inv}$ within a peak position tolerance range $\Delta p_{tol}$ of the peak of interest $C_{int}$ in the measured mass spectrum $I_{meas}(p)$, in step (iii) for each candidate species $M_{cand}$ of the set $S_{cand}$ of candidate species of molecules $M_{cand}$ a theoretical mass spectrum $I_{th,M\_cand}(p)$ corresponding to the measured mass spectrum $I_{meas}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the measured mass spectrum $I_{meas}(p)$ of all candidate species $M_{cand}$ of the set $S_{cand}$ of candidate species of molecules $M_{cand}$ is determined and in step (iv) the measured mass spectrum $I_{meas}(p)$ is compared with each theoretical mass spectrum $I_{th,M\_cand}(p)$ of the candidate species $M_{cand}$ of the set $S_{cand}$ of candidate species of molecules $M_{cand}$ corresponding to the measured mass spectrum $I_{meas}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate Species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the measured mass spectrum $I_{meas}(p)$, and wherein the second subscore $s_2$ is addressing all peaks $C_{meas,i}$ in the measured mass spectrum $I_{meas}(p)$, which are not identified in the theoretical mass spectrum $I_{th,M\_cand}(p)$ of the candidate species $M_{cand}$.

In this method the peak of interest $c_{int}$ is defined in the measured mass spectrum $I_{meas}(p)$ and then theoretical mass spectra$_{th,M\_cand}(p)$ corresponding to the measured mass spectrum $I_{meas}(p)$ are calculated for each candidate species $M_{cand}$ and compared with the measured mass spectrum $I_{meas}(p)$.

In another embodiment of the inventive method for identification of a most likely elemental composition of at least one species of molecules $M_s$ contained in a sample with the before described preferred method the most likely elemental composition of at least one species of molecules M originated from the sample by at least one ionization process is identified and then the most likely elemental composition of a species of molecules $M_s$ contained in a sample is derived from the identified most likely elemental composition of each of the at least one species of molecules M originated from the sample by the at least one ionization process according to the at least one ionization process.

In a further method for identification of a most likely elemental composition of at least one species of molecules contained in a sample in step (i) a mass spectrum $I_{meas}(p)$ of the sample is measured with a mass spectrometer and then the measured mass spectrum $I_{meas}(p)$ is reduced to a neutral mass spectrum $I_{neut}(p)$, in step (ii) for a peak of interest $C_{int}$ of the neutral mass spectrum $I_{neut}(p)$ a set $S_{cand}$ of candidate species of molecules $M_{cand}$ from a set $S_{inv}$ of species of molecules $M_{inv}$ is determined which have an expected peak$_{ex,inv}$ in a mass spectrum corresponding the neutral mass spectrum $I_{neut}(p)$, with a peak position $p_{ex,inv}$ within a peak position tolerance range $\Delta p_{tol}$ of the peak of interest $C_{int}$ in the neutral mass spectrum $I_{neut}(p)$, in step (iii) for each candidate species $M_{cand}$ of the set $S_{cand}$ of candidate species of molecules $M_{cand}$ a complete theoretical mass spectrum $I_{th,M\_cand}(p)$ corresponding to the neutral mass spectrum $I_{neut}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the neutral mass spectrum $I_{neut}(p)$ of all candidate species $M_{cand}$ of the set $S_{cand}$ of candidate species of molecules $M_{cand}$ is determined and in step (iv) the neutral mass spectrum $I_{neut}(p)$ is compared with each theoretical mass spectrum $I_{th,M\_cand}(p)$ of the candidate species $M_{cand}$ of the set $S_{cand}$ of candidate species of molecules $M_{cand}$ corresponding to the neutral mass spectrum $I_{neut}(p)$ in the determined range of peak positions $\Delta p$ with a first method, which is determining a first subscore $s_{1,M\_cand}$ for each candidate species $M_{cand}$, and with a second method, which is determining a second subscore $S_{2,M\_cand}$ for each candidate species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the neutral mass spectrum $I_{neut}(p)$, and wherein the second subscore $s_2$ is addressing all peaks $C_{neut,I}$ in the neutral mass spectrum $I_{neut}(p)$, which are not identified in the theoretical mass spectrum $I_{th,M\_cand}(p)$ of the candidate species $M_{cand}$.

In this method the peak of interest $c_{int}$ is defined in the neutral mass spectrum $I_{neut}(p)$ and then theoretical mass spectra$_{th,M\_cand}(p)$ corresponding to the neutral mass spectrum $I_{neut}(p)$ are calculated for each candidate species $M_{cand}$ and compared with the neutral mass spectrum $I_{neut}(p)$.

In a particular preferred embodiment of the inventive method for identification of a most likely elemental composition of at least one species of molecules M contained in a sample in step (i) a mass spectrum $I_{meas}(p)$ of the sample is measured with a mass spectrometer, in step (ii) for a peak of interest $C_{int}$ of the measured mass spectrum $I_{meas}(p)$ a set $S_{cand}$ of candidate species of molecules $M_{cand}$ from a set $S_{inv}$ of species of molecules $M_{inv}$ is determined which have an expected peak$_{th,int}$ in a mass spectrum corresponding to a neutral mass spectrum $I_{neut}(p)$ derived by reduction of the measured mass spectrum $I_{meas}(p)$ with a peak position $p_{ex,inv}$ within a peak position tolerance range $\Delta P_{tol}$ assigned to the peak of interest $C_{int}$ in the neutral mass spectrum $I_{neut}(p)$ derived by reduction of the measured mass spectrum $I_{meas}(p)$, in step (iii) for each candidate species $M_{cand}$ of the set $S_{cand}$ of candidate species of molecules $M_{cand}$ a complete theoretical mass spectrum $I_{th,M\_cand}(p)$ corresponding the measured mass spectrum $I_{meas}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the measured mass spectrum $I_{meas}(p)$ of all candidate species $M_{cand}$ of the set $S_{cand}$ of candidate species of molecules $M_{cand}$ is determined and in step (iv) the measured mass spectrum $I_{meas}(p)$ is compared with each theoretical mass spectrum $I_{th,M\_cand}(p)$ of the candidate species $M_{cand}$ of the set $S_{cand}$ of candidate species of molecules $M_{cand}$ corresponding to the measured mass spectrum $I_{meas}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the measured mass spectrum $I_{meas}(p)$, and wherein the second subscore $s_2$ is addressing all peaks $C_{meas,i}$ in the measured mass spectrum $I_{meas}(p)$, which are not identified in the theoretical mass spectrum $I_{th,M\_cand}(p)$ of the candidate species $M_{cand}$.

In this method the peak of interest $C_{int}$ is first identified in the measured mass spectrum $I_{meas}(p)$ and afterwards defined in the neutral mass spectrum $I_{neut}(p)$ and then theoretical mass spectra$_{th,M\_cand}(p)$ corresponding to the measured mass spectrum $I_{meas}(p)$ are calculated for each candidate species $M_{cand}$ and compared with the measured mass spectrum $I_{meas}(p)$. In this method the candidate species $M_{cand}$ may be contained in the sample and for the candidate species of molecules $M_{cand}$ the theoretical mass spectra$_{th,M\_cand}(p)$ of their ions is calculated.

Preferably in this method in step (ii) the position $p_{meas,int}$ of the peak of interest $C_{int}$ of the measured mass spectrum is reduced to its position $p_{neutral,int}$ in the neutral mass spectrum $I_{neut}(p)$ derived by reduction of the measured mass spectrum $I_{meas}(p)$ and the mass spectrum of candidate species of molecules $M_{cand}$ has an expected peak $C_{ex,inv}$ with a peak position $p_{ex,inv}$ within a peak position tolerance range $\Delta p_{tol}$ of the position $p_{neutral,int}$ of the peak of interest $C_{int}$ in the neutral mass spectrum $I_{neut}(p)$. So this method has the advantage, that known peak positions $p_{ex,inv}$ of candidate species of molecules $M_{cand}$ can be which may be available already in tables, particularly of databases. Mostly the peak positions $p_{ex,inv}$ are known as masses $m_{M\_cand}$ or mass to charge ratios $m/z_{M\_cand}$ of candidate species $M_{cand}$.

Further preferably in this method before the measurement of the mass spectrum $I_{meas}(p)$ in step (i) the sample is ionized by at least one ionization process and in step (iii) for each candidate species $M_{cand}$ is determined an assigned ion $I_{cand}$ which is originated by at least one ionization process of the sample before the measurement of the mass spectrum $I_{meas}(p)$ and based on this assigned ions $I_{cand}$ for each candidate species $M_{cand}$ the complete theoretical mass spectrum $I_{th,M\_cand}(p)$ corresponding the measured mass spectrum $I_{meas}(p)$ is calculated.

The above mentioned objects are also solved by embodiments of the new method of identification of one or more most likely elemental compositions of at least one species of molecules M contained in a sample and/or originated from a sample by at least an ionization process according to claim 12, which comprise the following steps:

(i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;

(ii) determine for a peak of interest $C_{int}$ of the measured mass spectrum $I_{meas}(p)$ or neutral mass spectrum $I_{neut}(p)$ a set $S_{cand}$ of candidate species of molecules $M_{cand}$ from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;

(iii) determining for each candidate species $M_{cand}$ of the set $S_{cand}$ of candidate species of molecules $M_{cand}$ an identification mass spectrum $I_{id,M\_cand}(p)$ corresponding to the measured mass spectrum $I_{meas}(p)$ or the neutral mass spectrum $I_{neut}(p)$ and determining a range of peak positions $\Delta p$ comprising the peak positions $p_{id,M\_cand,i}$ of all peaks $C_{id,M\_cand,i}$ of the identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;

(iv) comparing the measured mass spectrum $I_{meas}(p)$ or the neutral mass spectrum $I_{neut}(p)$ with the identification mass spectrum $I_{id,M\_cand}(p)$ of candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for the candidate species $M_{cand}$, and with a second method, which is determining a second subscore $s_{2,M\_cand}$ for the candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$ and wherein at first the comparison is done with one method for each candidate species $M_{cand}$ and only if the subscore $s_{i,M\_cand}$ of this method is higher than a threshold value $s_{th,2.cal}$ the comparison with the other method is done and calculating for each candidate species $M_{cand}$ of the set $S_{cand}$ of candidate species of molecules $M_{cand}$ a final score $fs_{M\_cand}$ from the subscores $S_{i,M\_cand}$, for which both subscores of the first method and the second method $S_{1,M\_cand}$ and $S_{1,M\_cand}$ have been calculated or for which both subscores of the first method and the second method $s_{1,M\_cand}$ and $s_{1,M\_cand}$ have been calculated and one of both of the subscores of the first method and the second method $s_{1,M\_cand}$ and $s_{1,M\_cand}$ are higher than an assigned threshold value $s_{i,th,fs}$ for calculating the final score $fs_{M\_cand}$;

(v) determining one or more calculated final scores $fs_{high,k}$ having the highest values;

(vi) determining the elemental composition of the candidate species $M_{cand,high\_k}$ of the set $S_{cand}$ of candidate species of molecules $M_{cand}$ which have the one or more calculated final scores $fs_{high,k}$ of the highest values.

In this inventive method the comparison is done for each candidate species $M_{cand}$ at first with one method only if the resulting subscore $s_{i,M\_cand}$ is higher than a threshold value $s_{th,2.cal}$ then the other method of comparison is used for a candidate species $M_{cand}$.

The above mentioned objects are also solved by embodiments of the new method of identification of one or more most likely elemental compositions of at least one species of molecules M contained in a sample and/or originated from a sample by at least an ionization process according to claim 13, which comprise the following steps:

(i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;

(ii) determine for a peak of interest $C_{int}$ of the measured mass spectrum $I_{meas}(p)$ or neutral mass spectrum $I_{neut}(p)$ a set $S_{cand}$ of candidate species of molecules $M_{cand}$ from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;

(iii) determining for each candidate species $M_{cand}$ of the set $S_{cand}$ of candidate species of molecules $M_{cand}$ an identification mass spectrum $I_{id,M\_cand}(p)$ corresponding to the measured mass spectrum $I_{meas}(p)$ or the neutral mass spectrum $I_{neut}(p)$ and determining a range of peak positions $\Delta p$ comprising the peak positions $p_{id,M\_cand,i}$ of all peaks $C_{id,M\_cand,i}$ of the identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;

(iv) comparing the measured mass spectrum $I_{meas}(p)$ or the neutral mass spectrum $I_{neut}(p)$ with the identification mass spectrum $I_{id,M\_cand}(p)$ of candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for the candidate species $M_{cand}$, and with a second method, which is determining a second subscore $s_{2,M\_cand}$ for the candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$ and wherein at first the comparison is done for each candidate species $M_{cand}$ only with one method of the first method and the second method and only for candidate species $M_{cand}$ whose subscore $M_{i,M\_cand}$ has a subscore within a specific number of subscores having the highest values, the comparison with the other method is done and calculating for each candidate species $M_{cand}$ of the set $S_{cand}$ of candidate species of molecules $M_{cand}$ a final score $fs_{M\_cand}$ from the subscores $s_{i,M\_cand}$, for which both subscores of the first method and the second method $S_{1,M\_cand}$ and $S_{1,M\_cand}$ have been calculated or for which both subscores of the first method and the second method $s_{1,M\_cand}$ and $s_{1,M\_cand}$ have been calculated and one of both of the subscores of the first method and the second method $s_{1,M\_cand}$ and $s_{1,M\_cand}$ are higher than an assigned threshold value $s_{i,th,fs}$ for calculating the final score $fs_{M\_cand}$;

(v) determining one or more calculated final scores $fs_{high,k}$ having the highest values;

(vi) determining the elemental composition of the candidate species $M_{cand,high\_k}$ of the set $S_{cand}$ of candidate species of molecules $M_{cand}$ which have the one or more calculated final scores $fs_{high,k}$ of the highest values.

In this inventive method the comparison is done for each candidate species $M_{cand}$ at first the comparison is done for each candidate species $M_{cand}$ only with one method of the first method and the second method and only for candidate species $M_{cand}$ whose subscore $M_{i,M\_cand}$ has a subscore within a specific number of subscores having the highest values, the comparison with the other method is done.

In an embodiment of the inventive method for identification of one or more most likely elemental compositions of at least one species of molecules contained in a sample according and/or originated from a sample by at least an ionisation process for some of the species of molecules contained in the sample and/or originated from the sample by at least an ionisation process the elemental composition can be deduced from two or more isotope distributions of their ions having a different specific charge z which are deduced from different fractions of the at least one range of measured m/z values.

In this embodiment the inventive method makes use of information from related isotope distributions of a species of molecules, which increases the accuracy of the identification of the one or more most likely elemental compositions. Poorly resolved or completely unresolved IDs (i.e., IDs the isotopic peaks of which are not or only partly resolved) are handled dynamically by determining the maximally resolvable isotope distribution.

To improve the assignment of the measured peaks to the expected peaks an optional process can be applied to the inventive method, a dynamic recalibration.

In this process the mean value of the difference $\Delta p_{recal}$ of the peak positions of expected peaks and the measured peaks or the peaks of the neutral mass spectrum, which are assigned to each other by the method of comparison, is determined for each candidate molecule. The difference $\Delta p_{recal}$ is then added to each peak position value of the whole measured mass spectrum or neutral mass spectrum and then for the so shifted measured mass spectrum $I_{meas\_shift}(p)=I_{meas}(P+\Delta p_{recal})$ of shifted neutral mass spectrum $I_{neut\_shift}(p)=I_{neut}(P+\Delta p_{recal})$ the comparison method is repeated resulting in improved scores $s_{i,shift,M\_cand}$. It is an option, that before the repetition of comparison with the comparison method, the set of candidate species of molecules $M_{cand}$ is determined again using now a smaller peak position tolerance $\Delta p_{tol}$ from all candidate species of molecules $M_{cand}$ determined before. Typically the peak position tolerance $\Delta p_{tol}$ is reduced to a value between 25% and 75% of his former value, preferably to a value between 30% and 70% of his former value and particularly preferably to a value between 40% and 60% of his former value. Due to the shift of the measured mass spectrum there should be a better fit of the peak of interest $C_{int}$ with the expected peaks for molecules and therefore only species of molecules $M_{cand}$ having a peak in a reduced peak position tolerance $\Delta p_{tol}$ are reasonable candidate species of molecules $M_{cand}$ which may be contained in the sample. The shift of the measured spectrum may be then a parameter, which can have an influence on subscore $s_i$ determined after the dynamic recalibration. Preferably a big shift results in a lower subscore value $s_i$.

In the inventive method an option can be used to further distinguish candidate species of molecules $M_{cand}$ to find the candidate species of molecules $M_{cand}$ with the most likely elemental composition. A third subscore $s_{3,M\_cand}$ is determined for each candidate species of molecules $M_{cand}$ by a further fragmentation experiment. The ions having the mass to charge ratio of the peak of interest $C_{int}$ are isolated and fragmented by a known fragmentation process in the fragmentation experiment of then the mass spectrum ($MS^2$ spectrum) of the fragments is detected.

Then the fragments shown in this measured $MS^2$ spectrum are compared with an $MS^2$ identification spectrum of each candidate species of molecules $M_{cand}$ resulting in the subscore $s_3$. This $MS^2$ identification spectrum of each candidate species of molecules $M_{cand}$ is given due to the theoretical knowledge about the fragmentation during the used fragmentation process.

Methods to compare measured $MS^2$ spectrum with an $MS^2$ identification spectrum of a candidate species of molecules $M_{cand}$ and subscores $s_3$ identifying the candidate species of molecules $M_{cand}$ having the best fit of the measured $MS^2$ spectrum and the $MS^2$ identification spectrum are well known from the prior art.

Preferably in the inventive method a method to compare measured $MS^2$ spectrum with an $MS^2$ identification spectrum of an candidate species of molecules $M_{cand}$ is used, which is determining a measured $MS^2$ spectrum coverage score $s_{3,M\_cand}$, which is the same as the measured mass spectrum coverage score, but now applied to the $MS^2$ spectrum. There score is given by the ratio, how much of the intensity of the measured peaks of the measured $MS^2$ spectrum is identified by $MS^2$ identification spectra $I_{id\_M2,M\_cand}(p)$ of candidate species of molecules $M_{cand}$. This is done by assigning to each measured $MS^2$ peak $C_{MS2,i}$ its centroid intensity $I_{MS2,i}$.

When for the measured $MS^2$ mass spectrum $I_{MS2}(p)$ only a subset $C_{MS2,a}$ of the measured $MS^2$ peaks $C_{MS2,i}$ is identified by an $MS^2$ identification mass spectrum $I_{id\_MS2,M\_cand}$ of an candidate species $M_{cand}$, at first the centroid intensities of these subset is summed up and then divided by the summed up centroid intensities $I_{MS2,i}$ of all peaks $C_{MS2,i}$ identified in the measured $MS^2$ mass spectrum $I_{MS2}(p)$.

Typically the weighting factor of the measured $MS^2$ spectrum coverage score $s_{3,M\_cand}$ in the final score $fs_{M\_cand}$ of the candidate species of molecules $M_{cand}$ is between 0.01 and 0.2, preferably between 0.025 and 0.1 and particular preferably between 0.04 and 0.07, if the final score $fs_{M\_cand}$ is calculated from a summation of linear functions of the subscores $s_{i,M\_cand}$. By using this calculation of the final score $fs_{M\_cand}$ the identification of the most likely elemental compositions was done in the best way.

Typically with the inventive method the elemental composition has to be identified for a specific set $S_{inv}$ of species of molecules $M_{inv}$, which are composed from a specific set of elements. Typically the investigated molecules $M_{inv}$ are consisting of the elements C (carbon), H (hydrogen), O (oxygen) and N (nitrogen). Preferably the investigated molecules $M_{inv}$ may only comprise additionally the elements S (sulphur) P (phosphor), B (boron) and/or Si (silicon). In another preferred embodiment of the inventive method the investigated molecules $M_{inv}$ may only comprise additionally one or more elements of the halogen group like Cl (chlorine), I (iodine), Br (bromine) and F (fluorine). In an particular preferred embodiment of the inventive method the investigated molecules $M_{inv}$ may only comprise additionally the elements S (sulphur) and/or P (phosphor) and/or B (boron) and/or Si (silicon) and one or more elements of the halogen group like Cl (chlorine), I (iodine), Br (bromine) and F (fluorine).

For each element, which may be contained in species of molecules $M_{inv}$, it is defined how much atoms of the element might be contained in the species of molecules. For each element X the number of atoms contained in the species of molecules may be limited. There is a minimum number $Min_x$ of atoms of the element X and a maximum number $Max_x$ of atoms of the element X in the species of molecules.

For the element H the minimum number $Min_H$ typically between 0 and 20, the maximum number $Max_H$ typically between 50 and 300. Preferably for the element H the minimum number $Min_H$ is between 2 and 10, the maximum number $MaX_H$ between 100 and 250. Particular preferably for the element H the minimum number $Min_H$ is between 4 and 8, the maximum number $Max_H$ between 150 and 220.

For the element C the minimum number $Min_C$ typically between 0 and 10, the maximum number $Max_c$ typically between 20 and 180. Preferably for the element C the minimum number $Min_C$ is between 1 and 8, the maximum number $Max_c$ between 40 and 130. Particular preferably for the element C the minimum number $Min_C$ is between 2 and 6, the maximum number $Max_C$ between 60 and 100.

For the element N the minimum number $Min_N$ typically between 0 and 10, the maximum number $Max_N$ typically between 10 and 60. Preferably for the element N the minimum number $Min_N$ is between 1 and 7, the maximum number $Max_N$ between 15 and 45. Particular preferably for the element N the minimum number $Min_N$ is between 2 and 5, the maximum number $Max_H$ between 25 and 35.

For the element O the minimum number $Min_O$ typically between 0 and 10, the maximum number $Max_O$ typically between 10 and 60. Preferably for the element O the minimum number $Min_O$ is between 1 and 7, the maximum number $Max_O$ between 15 and 45. Particular preferably for the element O the minimum number $Min_O$ is between 2 and 5, the maximum number $Max_O$ between 25 and 35.

For the element S the minimum number $Min_S$ typically between 0 and 2, the maximum number $Max_S$ typically between 2 and 15. Preferably for the element S the the maximum number $Max_S$ is between 3 and 10. Particular preferably for the element S the maximum number $Max_S$ is between 4 and 7.

For the element Cl the minimum number $Min_{Cl}$ typically between 0 and 2, the maximum number $Max_{Cl}$ typically between 2 and 15. Preferably for the element Cl the the maximum number $Max_{Cl}$ is between 3 and 10. Particular preferably for the element Cl the maximum number $Max_c$ is between 4 and 7.

For the element F the minimum number $Min_{Cl}$ typically between 0 and 2, the maximum number $Max_F$ typically between 4 and 20. Preferably for the element F the the maximum number $Max_F$ is between 6 and 15. Particular preferably for the element F the maximum number $Max_F$ is between 8 and 12.

For the element Br the minimum number $Min_{Br}$ typically between 0 and 1, the maximum number $Max_{Br}$ typically between 1 and 8. Preferably for the element Br the the maximum number $Max_{Br}$ is between 2 and 6. Particular preferably for the element Br the maximum number $Max_{Br}$ is between 3 and 4.

For the element P the minimum number $Min_{Br}$ typically between 0 and 1, the maximum number $Max_p$ typically between 1 and 6. Preferably for the element P the the maximum number $Max_p$ is between 2 and 4. Particular preferably for the element Br the maximum number $Max_p$ is between 2 and 3.

For the element Si the minimum number $Min_{Si}$ typically between 0 and 1, the maximum number $Max_{Si}$ typically between 1 and 3.

DETAILED DESCRIPTION OF PREFERRED EMBODIMENTS

Figure 1:
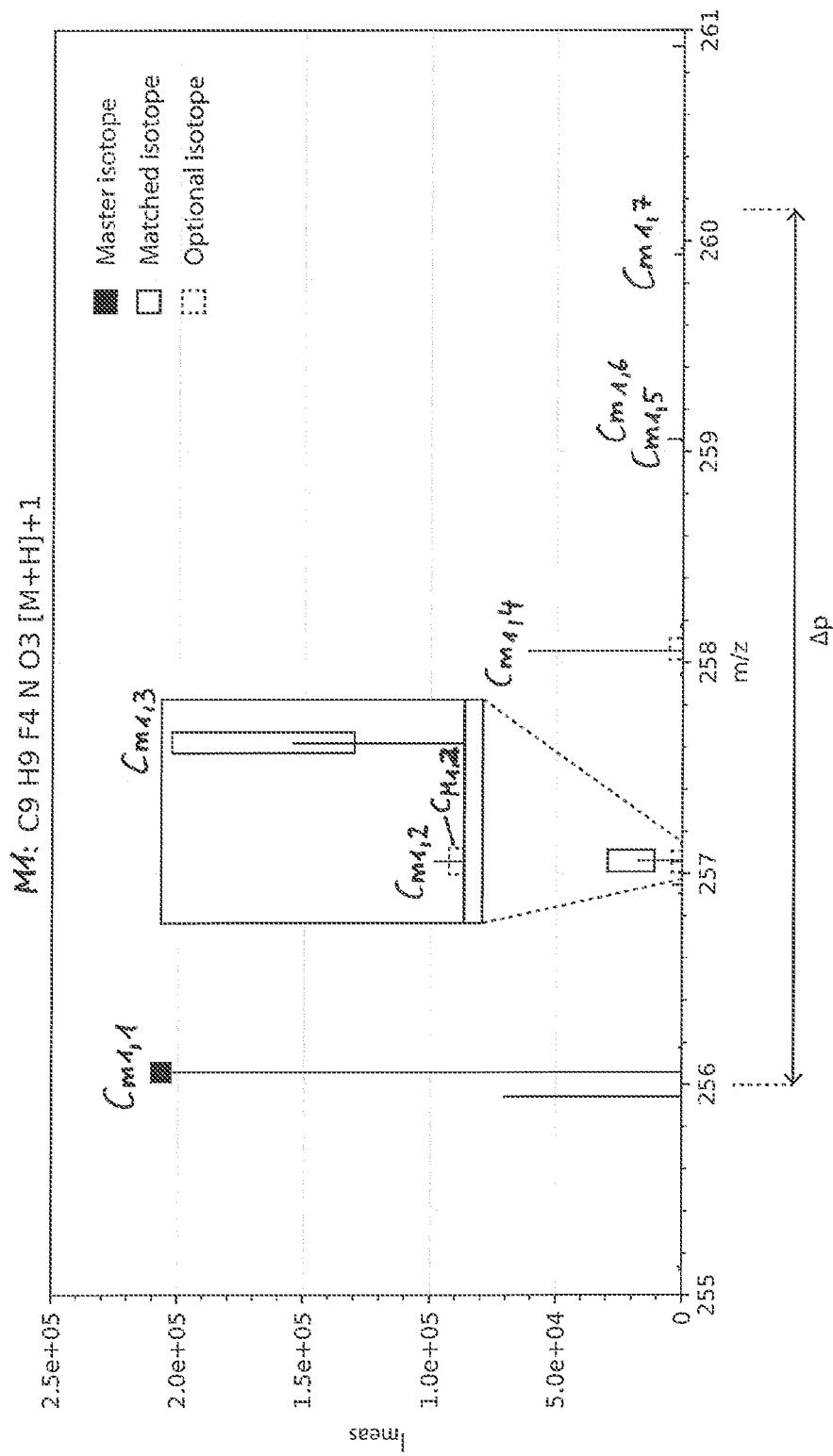
FIG. 1 shows a measured mass spectrum $I_{meas\_1}(m/z)$ and the comparison of the measured mass spectrum $I_{meas\_1}(m/z)$ with a theoretical mass spectrum $I_{th,M1}(m/z)$ of a first candidate species M1 with two different methods.

The method of invention is used for identification of a most likely elemental composition of at least one species of molecules M contained in a sample and/or originated from a sample by at least an ionization process.

Preferably the method is used to identify the most likely elemental composition of molecules like herbicides, insecticides, other pesticides, lipids, soluble or suspended solids in leachates, metabolites, drugs, narcotics, pharmaceuticals, toxins, molecules in extracts and in particular metabolites derived from drugs, narcotics, pharmaceuticals and toxins having typically a mass of typically between 50 u and 2,000 u, preferably between 200 u and 700 u and particularly preferably between 300 u and 500 u. If only for specific class of species of molecules like herbicides, insecticides, pesticides, lipids, metabolites, drugs, or narcotics the elemental composition of a species of molecules shall be identified with the inventive method, then the mass range, in which the identification is possible can be wider. Then the mass range is typically between 50 u and 3,000 u, preferably between 200 u and 1,000 u and particularly preferably between 300 u and 600 u.

The method of the invention is used to investigate samples. These samples may contain species of molecules which can be identified by their elemental composition.

The investigated sample can be also understood by ions which are generated from the sample by at least an ionization process and their elemental composition described by their molecular formula. The ions may be preferably generated by electrospray ionization (ESI), matrix-assisted laser desorption ionization (MALDI), plasma ionization, electron ionization (EI), chemical ionization (CI) and atmospheric pressure chemical ionization (APCI). A particular preferred method of ionization is electrospray ionization. The generated ions are charged particles mostly having a molecular geometry and a corresponding molecular formula. In the context of this patent application the term "species of molecules originated from a sample by at least an ionisation process" shall be understood is referring to the molecular formula of an ion which is originated from a sample by at least an ionisation process. So just if ions which are originated from a sample by at least an ionisation process have one common molecular formula which is describing the elemental composition, the elemental composition of their species of the molecule, they may have a different molecular geometry.

The elemental composition of a species of molecules originated from a sample by at least an ionization process is correlated with the elemental composition of the species of molecule contained in the sample by reducing the charge of the ion has to zero and changing the elemental composition accordingly to the ionization process.

In detail, if a species of molecule $M_0$ is contained in the sample and during the ionization an ion $I_{ad}^q$ having an elemental composition of the molecule $I_{ad}$ and a charge q is added, then the resulting adduct is the ion $[M_0+I_{ad}]^q$. So by subtracting the charge q and the elemental composition from the ion $[M_0+I_{ad}]^q$ the elemental composition species of molecule contained in the sample can be deduced.

When the molecule $M_0$ which is contained in the sample has for example the formula $C_xH_yO_z$ and by the ionization process an electron is added, the resulting ion has the elemental formula $C_xH_yO_z$.

When the molecule $M_0$ which is contained in the sample has for example the formula $C_xH_yO_z$ and by the ionization process an proton $H^+$ is added, the resulting ion has the elemental formula $C_xH_{y+1}O_z^+$.

When the molecule $M_0$ which is contained in the sample has for example the formula $C_xH_yO_z$ and by the ionization process a potassium ion $K^+$ is added, the resulting ion has the elemental formula $C_xH_yO_zK^+$.

When the molecule $M_0$, which is contained in the sample, has for example the formula $C_xH_yO_z$, and by the ionization process a double charged calcium ion $Ca^{2+}$ is added, the resulting ion has the elemental formula $C_xH_yO_zCa^{2+}$.

In the species of molecules all molecules have the same composition of atoms according to the molecular formula. But each atom of the molecule can occur as different isotopes. So the basic element of the organic chemistry, the carbon atom occurs in two stable isotopes, the $^{12}C$ isotope with a natural probability of occurrence of 98.9% and the $^{13}C$ isotope (having one more neutron in its atomic nucleus) with a natural probability of occurrence of 1.1%. Due to this probabilities of occurrence of the isotope particularly complex molecules of higher mass consisting of a higher number of atoms have a lot of isotopes. These isotopes have different masses resulting in a mass distribution of the isotopes, named in the content of this patent application isotope distribution (short term: ID) of the species of molecules. Each species of molecules therefore can have different masses. The different masses of the isotopes of a species of molecules and the mass distribution of the isotopes—the abundance of the isotopes of different masses—can be visible in the mass spectrum of a mass spectrometer. Depending on the resolution of the mass analyser which is used to measure the mass spectrum more or less peaks of different isotopes can be found in the measured mass spectrum. Preferably the resolution is the difference in the mass to charge ratio m/z of two peaks Δm/z for which the two peaks can be separated in the mass spectrum. Accordingly the resolving power R of the mass analyser is defined for e peak having the mass to charge ratio m/z by the ratio:

$$R(m/z) = \frac{m/z}{\Delta m/z}$$

Preferably it is assumed that two peaks should be separated at the half maximum height of a peak, so that the resolution Δm/z is FWHM (full width at half maximum) of the peak. Accordingly the resolving power R of the mass analyser is then:

$$R(m/z) = \frac{m/z}{FWHM}$$

Mass analyzers have typically a resolving power R of 500 to 10,000. Mass analyzers of increased resolution have typically a resolving power R of 10,000 to 50,000. High resolution mass analyzers have typically a resolving power R of 50,000 to 200,000 and ultra high resolution mass analysers have a resolving power R between 200,000 and 10,000,000.

In a first step of the inventive method a mass spectrum of the sample has to be measured by a mass spectrometer. In general every kind of mass spectrometer can be used known to a person skilled in the art to measure a mass spectrum of a sample. In particular it is preferred to use a mass spectrometer of high resolution like a mass spectrometer having an Orbitrap® mass analyser, a FT-mass spectrometer, an ICR mass spectrometer or an MR-TOF mass spectrometer. Other mass spectrometers for which the inventive method can be applied are particularly TOF mass spectrometer, mass spectrometer with a HR quadrupole mass analyser, and mass spectrometer with an ion trap mass analyzer.

Mass spectrometer with a HR quadrupole mass analyser may have a resolving power R between up to 10.000. TOF mass spectrometer typically have a resolving power R between 2,000 and 20,000. Mass spectrometer with an Orbitrap® mass analyser have typically a resolving power R between 5,000 and 1,000,000. FT-mass spectrometer have typically a resolving power R between 100,000 and 5,000,000. MR-TOF mass spectrometer have typically a resolving power R between 20,000 and 100,000. ICR mass spectrometer have typically a resolving power R between 1,000,000 and 5,000,000.

Typically a mass to charge ratio tolerance ratio $R_{m/z\_tol}$ or a mass tolerance ratio $R_{m\_tol}$ to determine the candidate species of molecules $M_{cand}$ in step (ii) is used between 3 ppm and 30 ppm, preferably between 5 ppm and 20 ppm and particularly preferably between 8 ppm and 15 ppm for mass spectrometers without high resolution.

Mass spectrometer of high resolution with a resolving power R of 50,000 and higher have typically a mass to charge ratio tolerance ratio $R_{m/z\_tol}$ or a mass tolerance ratio $R_{m\_tol}$ to determine the candidate species of molecules $M_{cand}$ in step (ii) is used between 1 ppm and 15 ppm, preferably between 2 ppm and 10 ppm and particularly preferably between 3 ppm and 7 ppm.

Mass spectrometer of ultra high resolution with a resolving power R of 200,000 and higher have typically a mass to charge ratio tolerance ratio $R_{m/z\_tol}$ or a mass tolerance ratio $R_{m\_tol}$ to determine the candidate species of molecules $M_{cand}$ in step (ii) is used between 0.5 ppm and 10 ppm, preferably between 1.5 ppm and 7 ppm and particularly preferably between 2.5 ppm and 5 ppm.

The definition of the mass tolerance ratio $R_{m\_tol}$ is the same as the mass to charge ratio tolerance ratio $R_{m/z\_tol}$, when the charge z is set to 1.

In the following examples of the inventive method are described in detail:

With the first example of the inventive method one or more most likely elemental composition of at least one species of molecules M are identified, which are originated from an investigated sample by an ionization process.

In step (i) of the method of the first example a mass spectrum $I_{meas}(p)$ of a sample is measured with a mass spectrometer. The species of molecules M, for which its elemental composition shall be identified, is originated from the sample by the ionization of the mass spectrometer and is therefore an ion.

In step (ii) of the inventive method at first a peak of interest $C_{int}$ is identified in the measured mass spectrum $I_{meas}(p)$. It is the task of the inventive method to identify the elemental composition of that species of molecules M, which has generated the peak of interest $C_{int}$ in the measured mass spectrum $I_{meas}(p)$. This is done manually by an user who wants to know from which species of molecules M the peak of interest $C_{int}$ is originated. The inventive methods can identify the most likely elemental composition of the species of molecules M using not only the information of the peak of interest $C_{int}$ but also the information of other peaks originated from the species of molecules M.

Further on a set $S_{inv}$ of species of molecules $M_{inv}$ has to be defined, for which molecules $M_{inv}$ it has to be investigated if their isotope distribution occurs in the measured mass spectrum $I_{meas}(p)$ or neutral mass spectrum $I_{neut}(p)$. This set $S_{inv}$ of species of molecules $M_{inv}$ can be defined by a lot of criteria.

Typical criteria for the set $S_{inv}$ of investigated species of molecules $M_{inv}$ being applicable to all methods encompassed by this invention are:

The type of the elements X contained in the species of molecules $M_{inv}$.

The minimum number $Min_x$ of atoms of each element X contained in the species of molecules $M_{inv}$.

The maximum number $Max_x$ of atoms of each element X contained in the species of molecules $M_{inv}$.

A minimum value for the ratio between the number of atoms of two elements contained in the species of molecule M, e.g. the ratio H/C between the number hydrogen atoms (H) and the number of carbon atoms (C) contained in the species of molecule $M_{inv}$.

A maximum value for the ratio between the number of atoms of two elements contained in the species of molecule M, e.g. the ratio H/C between the number hydrogen atoms (H) and the number of carbon atoms (C) contained in the species of molecule $M_{inv}$.

A minimum value for a degree of unsaturation of the molecule $M_{inv}$, in particular a minimum value of double-bond equivalents of the molecule $M_{inv}$ and/or a minimum value of rings-plus-double-bond equivalents (RDBE) of the molecule $M_{inv}$.

A maximum value for a degree of unsaturation of the molecule $M_{inv}$, in particular a maximum value of double-bond equivalents of the molecule $M_{inv}$ and/or a maximum value of rings-plus-double-bond equivalents (RDBE) of the molecule $M_{inv}$.

Values for these criteria applicable to all methods encompassed by this invention are:

The type of the elements X which may be contained in the species of molecules $M_{inv}$, have been already described before. Also their minimum number $Min_x$ of atoms and their maximum number $Max_x$ of atoms.

Typically the minimum value for the ratio H/C between the number hydrogen atoms (H) and the number of carbon atoms (C) contained in the species of molecule $M_{inv}$ is between 0.02 and 1.0, preferably between 0.05 and 0.5 and particularly preferably between 0.05 and 0.2.

Typically the maximum value for the ratio H/C between the number hydrogen atoms (H) and the number of carbon atoms (C) contained in the species of molecule $M_{inv}$ is between 2.0 and 10.0, preferably between 3.0 and 7.5 and particularly preferably between 3.5 and 5.0.

When the rings-plus-double-bond equivalents (RDBE) may be calculated according to Watson, Sparkman Introduction of Mass Spectrometry, Fourth Edition, Chapter 5, IV.F. then typically the minimum value of rings-plus-double-bond equivalents (RDBE) of the molecule $M_{inv}$ is between 0 and 6, preferably between 0 and 4 and particularly preferably between 0 and 2 and typically the maximum value of rings-plus-double-bond equivalents (RDBE) of the molecule $M_{inv}$ is between 20 and 80, preferably between 28 and 60 and particularly preferably between 34 and 50.

In step (ii) of the inventive method it is determined a set $S_{cand}$ of candidate species of molecules $M_{cand}$ from the defined set $S_{inv}$ of species of molecules $M_{inv}$ which have an expected peak $C_{ex,inv}$ in a mass spectrum corresponding to the measured mass spectrum $I_{meas}(p)$ with a peak position $p_{ex,inv}$ within the tolerance range $\Delta p_{tol}$ assigned to the peak of interest $C_{int}$ in the corresponding measured mass spectrum $I_{meas}(p)$.

The peak position $p_{ex,inv}$ of the expected peak $C_{ex,inv}$ has to be given by a mass spectrum which corresponds to the mass spectrum in which the peak of interest $C_{int}$ is identified. So if the peak of interest $C_{int}$ is identified in the measured mass spectrum $I_{meas}(p)$ the peak position $p_{ex,inv}$ of the expected peak $C_{ex,inv}$ has to be defined for a mass spectrum corresponding to the measured mass spectrum $I_{meas}(p)$.

Preferably the peak position p in the measured mass spectrum is given by the mass to charge ratio m/z, then the peak position $p_{ex,inv}$ of the expected peak $C_{ex,inv}$ has a mass to charge value $m/z_{ex,inv}$ to be defined for a mass spectrum corresponding to the measured mass spectrum $I_{meas}(m/z)$. In particular in this case only the mass to charge value $m/z_{ex,inv}$ of the expected peak $C_{ex,inv}$ has to be known. If the mass to charge value $m/z_{ex,inv}$ of an expected peak $C_{ex,inv}$ of a species of molecules $M_{inv}$ is within the mass to charge tolerance range $\Delta m/z_{tol}$ of the peak of interest $C_{int}$ then the species of molecules $M_{inv}$ is a candidate species of molecules $M_{cand}$ which will be investigated further.

The tolerance range $\Delta p_{tol}$ assigned to the peak of interest $C_{int}$ is defined in that mass spectrum which is corresponding to the mass spectrum in which the expected peaks $C_{ex,inv}$ of the species of molecules $M_{inv}$ used in step (ii) are known.

In the inventive method of this first example is the tolerance range $\Delta p_{tol}$ assigned to the peak of interest $C_{int}$ defined in the measured mass spectrum $I_{meas}(p)$.

The peak of interest $C_{int}$ has a peak position $p_{int,meas}$ in the measured mass spectrum $I_{meas}(p)$ and the tolerance range $\Delta p_{tol}$ is assigned to the peak of interest $C_{int}$ by a range around the peak position $p_{int,meas}$ of the peak of interest $C_{int}$. Preferably the tolerance range $\Delta p_{tol}$ is symmetrically to the peak position $p_{int,meas}$ of the peak of interest $C_{int}$, so that the distance between the lower endpoint of the tolerance range $\Delta p_{tol}$ and the peak position $p_{int,meas}$ of the peak of interest $C_{int}$ is equal to the distance between higher endpoint of the tolerance range $\Delta p_{tol}$ and the peak position $p_{int,meas}$ of the peak of interest $C_{int}$.

In step (iii) of the inventive method for each candidate species $M_{cand}$ of the set $S_{cand}$ of candidate species of molecules $M_{cand}$ determined before in step (ii) an identification mass spectrum $I_{id,M\_cand}(p)$ is determined, which is a theoretical mass spectrum $I_{th,M\_cand}(p)$, which is for each candidate species $M_{cand}$ corresponding to the measured mass spectrum $I_{meas}(p)$.

The theoretical mass spectra $I_{th,M\_cand}(p)$ are calculated during the execution of the method.

It is possible that in both steps (ii) and (iii) for the candidate species $M_{cand}$ of the set $S_{cand}$ of candidate species of molecules $M_{cand}$ theoretical mass spectra $I_{th,M\_cand}(p)$ are calculated which correspond to the measured mass spectrum $I_{meas}(p)$ and the theoretical mass spectra $I_{th,M\_cand}(p)$ are used in step (iii) as identification mass spectrum $I_{id,M\_cand}(p)$. Particularly the same theoretical mass spectra $I_{th,M\_cand}(p)$ may be used in both steps.

The theoretical mass spectra $I_{th,M\_cand}(p)$ comprise the complete mass spectra of the candidate species of molecules $M_{cand}$ showing the whole isotope distribution of the molecule $M_{cand}$ only limited by the resolving power and signal-to-noise ratio S/N under which the identification mass spectra $I_{id,M\_cand}(p)$ are calculated. The resolving power and signal-to-noise ratio S/N used for the calculating have values equal or very similar to the values of the mass spectrometer used to measure the measured mass spectrum $I_{meas}(p)$ in step (i).

In step (iii) of the inventive method of this first example a range of peak positions $\Delta p$ is determined in which the determined theoretical mass spectra $I_{th,M\_cand}(p)$ of all candidate species $M_{cand}$ of the set $S_{cand}$ of candidate species of molecules $M_{cand}$ are arranged. The range of peak positions $\Delta p$ is determined by identifying a range of peak positions which is comprising the peak positions $p_{th,i}$ of all peaks $C_{th,M\_cand,i}$ of the complete theoretical mass spectra $I_{th,M\_cand}(p)$ corresponding to the measured mass spectrum $I_{meas}(p)$ of all candidate species $M_{cand}$ of the set $S_{cand}$ of candidate species of molecules $M_{cand}$. So in the range of peak positions $\Delta p$ all peaks $C_{th,M\_cand,i}$ of the theoretical mass spectra $I_{th,M\_cand}(p)$ of all candidate species $M_{cand}$ of the set $S_{cand}$ of candidate species of molecules $M_{cand}$ are positioned in the range of peak positions $\Delta p$. The lower endpoint of the range of peak positions $\Delta p$ is similar or below the lowest value of a peak position $p_{th,i}$ of any peak $C_{th,M\_cand,I}$ of all candidate species $M_{cand}$ of the set $S_{cand}$ of candidate species of molecules $M_{cand}$ and the highest endpoint of the range of peak positions $\Delta p$ is similar or above the highest value of a peak position $p_{th,i}$ of any peak $C_{id,M\_cand,I}$ of all candidate species $M_{cand}$ of the set $S_{cand}$ of candidate species of molecules $M_{cand}$. So it is guaranteed that in the range of peak positions $\Delta p$ all isotope distributions of all candidate species $M_{cand}$ of the set $S_{cand}$ of candidate species of molecules $M_{cand}$ are completely encompassed. In the range of peak positions $\Delta p$ each theoretical mass spectra $I_{th,M\_cand}(p)$ of a candidate species of molecules $M_{cand}$ can be compared with the corresponding measured mass spectrum $I_{meas}(p)$ without missing any peak of the candidate species of molecules $M_{cand}$ existing in its theoretical mass spectra $I_{th,M\_cand}(p)$.

In step (iv) of the inventive method of the first example this comparison of the measured mass spectrum $I_{meas}(p)$ with each theoretical mass spectra $I_{th,M\_cand}(p)$ of the candidate species $M_{cand}$ of the set $S_{cand}$ of candidate species of molecules $M_{cand}$ corresponding to the measured mass spectrum $I_{meas}(p)$ is executed in the determined range of peak positions $\Delta p$.

For all candidate species $M_{cand}$ this comparison is done with two different methods, a first method and a second method, having a different focus on the features of measured mass spectrum $I_{meas}(p)$ and the theoretical mass spectra $I_{th,M\_cand}(p)$ of the candidate species of molecules $M_{cand}$.

It is also possible to use more than this two methods of comparison in step (iv) of the inventive method.

By the first method to compare the theoretical mass spectra $I_{th,M\_cand}(p)$ of the candidate species of molecules $M_{cand}$ with the measured mass spectrum $I_{meas}(p)$ a first subscore $s_{1,M\_cand}$ is determined for each candidate species $M_{cand}$. This first subscore $s_{1,M\_cand}$ of the first method is addressing all peaks $C_{id,M\_cand,i}$ in the theoretical mass spectra $I_{th,M\_cand}(p)$ of the candidate species $M_{cand}$, which are not identified in the measured mass spectrum $I_{meas}(p)$. So the first method is in particular sensitive with its subscore $s_{1,M\_cand}$ for peaks $C_{id,M\_cand,i}$ of a theoretical mass spectra $I_{th,M\_cand}(p)$ of a candidate species $M_{cand}$, which cannot be identified in the measured mass spectrum $I_{meas}(p)$.

When the first method recognizes that is a peak $C_{id,M\_cand,i}$ of a candidate species $M_{cand}$ cannot be identified in the measured mass spectrum $I_{meas}(p)$, the subscore $s_{1,M\_cand}$ of the method is reduced. In particular for each peak $C_{id,M\_cand,i}$ of a theoretical mass spectrum $I_{th,M\_cand}(p)$ of a candidate species $M_{cand}$ which cannot be identified in the measured mass spectrum $I_{meas}(p)$ the subscore $s_{1,M\_cand}$ of the first method is reduced. The reduction is the same for every identified peak $C_{id,M\_cand,I}$. There is no reduction if the intensity of the not identified peak $C_{id,M\_cand,i}$ is below a threshold value. In general, the first method is taking care if expected peaks of the theoretical mass spectra $I_{th,M\_cand}(p)$ are found in the measured mass spectrum. If expected peaks are missing and in particular many expected peaks are missing this is an indicator that the candidate species $M_{cand}$ is not abundant which is resulting in a lower score $s_{1,M\_cand}$.

In a preferred embodiment of the first method to compare the measured mass spectrum $I_{meas}(p)$ with each theoretical mass spectra $I_{th,M\_cand}(p)$ of the candidate species $M_{cand}$ of the set $S_{cand}$ of candidate species of molecules $M_{cand}$ corresponding to the measured mass spectrum $I_{meas}(p)$ the method described in the U.S. Pat. No. 8,831,888 B2 can be used. Then the first subscore $S_{1,M\_cand}$ is the pattern spectral distance (PSD) calculated for the elemental composition of the candidate species of molecules $M_{cand}$. A preferred use of this method will be described below for the third example, which can be applied in the same way in all inventive methods, in particular in the inventive method of this first example.

By the second method to compare the theoretical mass spectra $I_{th,M\_cand}(p)$ of the candidate species of molecules $M_{cand}$ with measured mass spectrum $I_{meas}(p)$ a second subscore $s_{2,M\_cand}$ is determined for each candidate species $M_{cand}$, wherein the second subscore $s_{2,M\_cand}$ is addressing all peaks $C_{meas,i}$ in the measured mass spectrum $I_{meas}(p)$, which are not identified in the theoretical mass spectrum $I_{th,M\_cand}(P$ of the candidate species $M_{cand}$. So the second method is in particular sensitive in its subscore $s_{2,M\_cand}$ for peaks $C_{meas,i}$ in the measured mass spectrum $I_{meas}(p)$, which cannot be identified in the theoretical mass spectra $I_{th,M\_cand}(p)$ of the candidate species of molecules $M_{cand}$.

When the second method recognizes that a peak $C_{meas,i}$ in the measured mass spectrum $I_{meas}(p)$ cannot be identified in the theoretical mass spectra $I_{th,M\_cand}(p)$ of the candidate species of molecules $M_{cand}$, the subscore $s_{2,M\_cand}$ of the method is reduced. In particular for each peak $C_{meas,i}$ in the measured mass spectrum $I_{meas}(p)$ which cannot been identified in the theoretical mass spectra $I_{th,M\_cand}(p)$ of the candidate species of molecules $M_{cand}$ the subscore $s_{2,M\_cand}$ of the second method is reduced. The reduction is in the same way for every not identified peak $C_{meas,i}$ or $C_{neut,i}$. The reduction depends on the intensity of the not identified peak $C_{meas,i}$ found in the measured mass spectrum $I_{meas}(p)$. There is no reduction if the intensity of the not identified peak $C_{meas,i}$ is below a threshold value. In general, the second method is taking care if measured peaks in the measured mass spectrum $I_{meas}(p)$ are explained by in the theoretical mass spectrum $I_{th,M\_cand}(p)$ of a candidate species $M_{cand}$. If measured peaks are missing and in particular measured peaks of high intensity are missing this is an indicator that the candidate species $M_{cand}$ is not abundant which is resulting in a lower score $s_{2,M\_cand}$.

For all candidate species $M_{cand}$ of the set $S_{cand}$ of candidate species of molecules $M_{cand}$, preferably all candidate species $M_{cand}$ of the set $S_{cand}$ of candidate species of molecules $M_{cand}$, further in step (iv) of the inventive method a final score $fs_{M\_cand}$ is calculated from the subscores $s_{i,M\_cand}$.

In inventive method of this first example in step (iv) of the inventive method a final score $fs_{M\_cand}$ is calculated from the subscores $s_{i,M\_cand}$ only for all candidate species $M_{cand}$, for which one of both of the subscores of the first method and the second method $s_{1,M\_cand}$ and $s_{1,M\_cand}$ are higher than an assigned threshold value $s_{i,th,fs}$ for calculating the final score $fs_{M\_cand}$. By this criteria the calculation of final scores $fs_{M\_cand}$ is avoided, which due to the value of one subscore have no chance to belong to the final scores $fs_{high,k}$ having the highest values. The threshold values $s_{i,th,fs}$ can have fixed values or can be derived from a ranking of the candidate species $M_{cand}$ according to a subscore $s_{i,M\_cand}$. Then the value of the subscore $s_{i,M\_cand}$ of the candidate species $M_{cand}$ on a specific rank is defining the threshold values $s_{i,th,fs}$.

The final score $fs_{M\_cand}$ is calculated in the first example from a summation of functions which are only depending on one subscore $s_{i,M\_cand}$.

Because only the subscores $s_{1,M\_cand}$ and $s_{2,M\_cand}$ are used then the final score $fs_{M\_cand}$ of the first example is given by:

$$fs_{M\_cand} = f(s_{1,M_{cand}}) + g(s_{2,M_{cand}})$$

In a particular preferred embodiment of the inventive method of the first example the final score $fs_{M\_cand}$ is calculated by a summation of linear functions of the subscores $s_{i,M\_cand}$. Each function is defined by a weighting factor fi assigned to each subscore $s_{i,M\_cand}$. Then the final score $fs_{M\_cand}$ is given by:

$$fs_{M\_cand} = f_1 * s_{1,M_{cand}} + f_2 * s_{2,M_{cand}}$$

When the final score $fs_{M\_cand}$ has been calculated for all candidate species $M_{cand}$ of the set $S_{cand}$ of candidate species of molecules $M_{cand}$, in step (v) of the inventive method the final scores $fs_{high,k}$ from all final score $fs_{M\_cand}$ of all candidate species $M_{cand}$ of the set $S_{cand}$ of candidate species of molecules $M_{cand}$ are determined, which have the highest values. The number N of final scores $fs_{high,k}$ having the highest values is defined as default value before the inventive method is used. So at the end N final scores $fs_{high,k}$ having the highest values are identified.

Then in the nest step (vi) of the inventive method the elemental composition of the candidate species $M_{cand,high\_k}$ of the set $S_{cand}$ of candidate species of molecules $M_{cand}$ is determined which have the N calculated final scores $fs_{high,k}$ of the highest values. This done by looking up the elemental composition of the candidate species $M_{cand}$, if it is realised that the final scores $fs_{M\_cand}$ belongs to the final scores $fs_{high,k}$ of the highest values. The elemental compositions of these N candidate species $M_{cand}$ are then listed with their final score $fs_{M\_cand}$ in a table and shown on a display.

With the second example of the inventive method the most likely elemental composition of at least one species of molecules M is identified, which are contained in an investigated sample.

In step (i) of the method of the second example a mass spectrum $I_{meas}(p)$ of a sample is measured with a mass spectrometer. Because during this measurement only ions are detected and shown in the mass spectrum $I_{meas}(p)$ which have been originated by ab ionization process, the measured mass spectrum $I_{meas}(p)$ has to be reduced to a neutral mass spectrum $I_{neut}(p)$ according to the ionization process. In this neutral mass spectrum $I_{neut}(p)$ peaks $C_{meas,M,i}$ according the isotope distribution of the species of molecules M contained in the investigated sample can are identified.

In step (ii) of the inventive method at first a peak of interest $C_{int}$ is identified in the neutral mass spectrum $I_{neut}(p)$. It is the task of the inventive method to identify the elemental composition of that species of molecules M, which has generated the peak of interest $C_{int}$ in the neutral mass spectrum $I_{neut}(p)$. This is done manually by an user who wants to know from which species of molecules M the peak of interest $C_{int}$ is originated. The inventive methods can identify the most likely elemental composition of the species of molecules M using not only the information of the peak of interest $C_{int}$ but also the information of other peaks originated from the species of molecules M.

Further on a set $S_{inv}$ of species of molecules $M_{inv}$ has to be defined, for which has to be investigated if their isotope distribution occurs in the measured mass spectrum $I_{meas}(p)$ or neutral mass spectrum $I_{neut}(p)$. This set $S_{inv}$ of species of molecules $M_{inv}$ can be defined by a lot of criteria already explained above.

In step (ii) of the inventive method a set $S_{cand}$ of candidate species of molecules $M_{cand}$ is determined from the defined set $S_{inv}$ of species of molecules $M_{inv}$ which have an expected peak $C_{ex,inv}$ in a mass spectrum corresponding to the neutral mass spectrum $I_{neut}(p)$ with a peak position $p_{ex,inv}$ within the tolerance range $\Delta p_{tol}$ assigned to the peak of interest $C_{int}$ in the corresponding neutral mass spectrum $I_{neut}(p)$.

The peak position $p_{ex,inv}$ of the expected peak $C_{ex,inv}$ has to be given by a mass spectrum which corresponds the mass spectrum in which the peak of interest $C_{int}$ is identified. So if the peak of interest $C_{int}$ is identified in the neutral mass spectrum $I_{neut}(p)$ the peak position $p_{ex,inv}$ of the expected peak $C_{ex,inv}$ has to be defined for a mass spectrum corresponding to the neutral mass spectrum $I_{neut}(p)$.

Preferably the peak position p in the neutral mass spectrum $I_{neut}(p)$ is given by the mass to charge ratio m/z, then the peak position $p_{ex,inv}$ of the expected peak $C_{ex,inv}$ has a mass to charge value $m/z_{ex,inv}$ to be defined for a mass spectrum corresponding to the neutral mass spectrum $I_{neut}$ (m/z). In particular in this case only the mass to charge value $m/z_{ex,inv}$ of the expected peak $C_{ex,inv}$ has to be known. If the mass to charge value $m/z_{ex,inv}$ of an expected peak $C_{ex,inv}$ of a species of molecules $M_{inv}$ is within the mass to charge tolerance range $\Delta m/z_{tol}$ of the peak of interest $C_{int}$ then the species of molecules $M_{inv}$ is a candidate species of molecules $M_{cand}$ which will be investigated further.

The tolerance range $\Delta p_{tol}$ assigned to the peak of interest $C_{int}$ is defined in the mass spectrum which is corresponding to the mass spectrum in which the expected peaks $C_{ex,inv}$ of the species of molecules $M_{inv}$ used in step (ii) are known.

In the inventive method of this second example is the tolerance range $\Delta p_{tol}$ assigned to the peak of interest $C_{int}$ is defined in the neutral mass spectrum $I_{neut}(p)$.

The peak of interest $C_{int}$ has a peak position $p_{int,neut}$ in the neutral mass spectrum $I_{neut}(p)$ and the tolerance range $\Delta p_{tol}$ is assigned to the peak of interest $C_{int}$ by a range around the peak position $p_{int,neut}$ of the peak of interest $C_{int}$. Preferably the tolerance range $\Delta p_{tol}$ is symmetrically to the peak position $p_{int,neut}$ of the peak of interest $C_{int}$, so that the distance between the lower endpoint of the tolerance range $\Delta p_{tol}$ and the peak position $p_{int,neut}$ of the peak of interest $C_{int}$ is equal to the distance between higher endpoint of the tolerance range $\Delta p_{tol}$ and the peak position $p_{int,neut}$ of the peak of interest $C_{int}$.

In step (iii) of the inventive method for each candidate species $M_{cand}$ of the set $S_{cand}$ of candidate species of molecules $M_{cand}$ determined before in step (ii) an identification mass spectrum $I_{id,M\_cand}(p)$ is determined, which is a theoretical mass spectrum $I_{th,M\_cand}(p)$, which is for each candidate species $M_{cand}$ corresponding to the neutral mass spectrum $I_{neut}(p)$.

The theoretical mass spectra $I_{th,M\_cand}(p)$ is calculated during the execution of the method.

It is possible that in both steps (ii) and (iii) for the candidate species $M_{cand}$ of the set $S_{cand}$ of candidate species of molecules $M_{cand}$ theoretical mass spectra $I_{th,M\_cand}(p)$ are calculated which correspond to the neutral mass spectrum $I_{neut}(p)$ and the theoretical mass spectra $I_{th,M\_cand}(p)$ are used in step (iii) as identification mass spectrum $I_{id,M\_cand}(p)$. Particularly the same theoretical mass spectra $I_{th,M\_cand}(p)$ may be used in both steps.

The theoretical mass spectra $I_{th,M\_cand}(p)$ comprise the complete mass spectra of the candidate species of molecules $M_{\_cand}$ showing the whole isotope distribution of the molecule $M_{cand}$ only limited by the resolving power and signal-to-noise ratio S/N under which the identification mass spectra $I_{id,M\_cand}(p)$ are calculated. The resolving power and signal-to-noise ratio S/N used for the calculating have values equal or very similar to the values of the mass spectrometer used to measure the measured mass spectrum $I_{meas}(p)$ in step (i).

In step (iii) of the inventive method of this second example a range of peak positions $\Delta p$ is determined in which the determined theoretical mass spectra $I_{th,M\_cand}(p)$ of all candidate species $M_{cand}$ of the set $S_{cand}$ of candidate species of molecules $M_{cand}$ are arranged. The range of peak positions $\Delta p$ is determined by identifying a range of peak positions which is comprising the peak positions $p_{th,i}$ of all peaks $C_{th,M\_cand,i}$ of the complete theoretical mass spectra $I_{th,M\_cand}(p)$ corresponding to the neutral mass spectrum $I_{neut}(p)$ of all candidate species $M_{cand}$ of the set $S_{cand}$ of candidate species of molecules $M_{cand}$. So in the range of peak positions $\Delta p$ all peaks $C_{th,M\_cand,i}$ of the theoretical mass spectra $I_{th,M\_cand}(p)$ of all candidate species $M_{cand}$ of the set $S_{cand}$ of candidate species of molecules $M_{cand}$ are positioned in the range of peak positions $\Delta p$. The lower endpoint of the range of peak positions $\Delta p$ is similar or below the lowest value of a peak position $p_{th,i}$ of any peak $C_{th,M\_cand,I}$ of all candidate species $M_{cand}$ of the set $S_{cand}$ of candidate species of molecules $M_{cand}$ and the highest endpoint of the range of peak positions $\Delta p$ is similar or above the highest value of a peak position $p_{th,i}$ of any peak $C_{id,M\_cand,I}$ of all candidate species $M_{cand}$ of the set $S_{cand}$ of candidate species of molecules $M_{cand}$. So it is guaranteed that in the range of peak positions $\Delta p$ all isotope distributions of all candidate species $M_{cand}$ of the set $S_{cand}$ of candidate species of molecules $M_{cand}$ are completely encompassed. In the range of peak positions $\Delta p$ each theoretical mass spectra $I_{th,M\_cand}(p)$ of a candidate species of molecules $M_{cand}$ can be compared with the corresponding neutral mass spectrum $I_{neut}(p)$ without missing any peak of the candidate species of molecules $M_{cand}$ existing in its theoretical mass spectra $I_{th,M\_cand}(p)$.

In step (iv) of the inventive method of the second example this comparison of the neutral mass spectrum $I_{neut}(p)$ with each theoretical mass spectra $I_{th,M\_cand}(p)$ of the candidate species $M_{cand}$ of the set $S_{cand}$ of candidate species of molecules $M_{cand}$ corresponding to the neutral mass spectrum $I_{neut}(p)$ is executed in the determined range of peak positions $\Delta p$.

For all candidate species $M_{cand}$ this comparison is done with two different methods, a first method and a second method, having a different focus on the features of the neutral mass spectrum $I_{neut}(p)$ and the theoretical mass spectra $I_{th,M\_cand}(p)$ of the candidate species of molecules $M_{cand}$.

It is also possible to use more than these two methods of comparison in step (iv) of the inventive method.

By the first method to compare the theoretical mass spectra $I_{th,M\_cand}(p)$ of the candidate species of molecules $M_{cand}$ with neutral mass spectrum $I_{neut}(p)$ a first subscore $s_{1,M\_cand}$ is determined for each candidate species $M_{cand}$. This first subscore $S_{1,M\_cand}$ of the first method is addressing all peaks $C_{id,M\_cand,i}$ in the theoretical mass spectra $I_{th,M\_cand}(p)$ of the candidate species $M_{cand}$, which are not identified in the neutral mass spectrum $I_{neut}(p)$. So the first method is in particular sensitive in its subscore $s_{1,M\_cand}$ for peaks $C_{id,M\_cand,i}$ of a theoretical mass spectra $I_{th,M\_cand}(p)$ of a candidate species $M_{cand}$, which cannot be identified in the neutral mass spectrum $I_{neut}(p)$.

When the first method recognizes that a peak $C_{id,M\_cand,i}$ of a candidate species $M_{cand}$ cannot be identified in the neutral mass spectrum $I_{neut}(p)$, the subscore $s_{1,M\_cand}$ of the method is reduced. In particular for each peak $C_{id,M\_cand,i}$ of a theoretical mass spectra $I_{th,M\_cand}(p)$ of a candidate species $M_{cand}$ which cannot been identified in the neutral mass spectrum $I_{neut}(p)$ the subscore $s_{1,M\_cand}$ of the first method is reduced. The reduction is for every identified peak $C_{id,M\_cand,I}$ the same. There is no reduction if the intensity of the not identified peak $C_{id,M\_cand,i}$ is below a threshold value. In general, the first method is taking care if expected peaks the theoretical mass spectra $I_{th,M\_cand}(p)$ are found in the measured mass spectrum. If expected peaks are missing and in particular a lot of expected peaks are missing this is an indicator that the candidate species $M_{cand}$ is not abundant which is resulting in a lower score $s_{1,M\_cand}$.

In a preferred embodiment as the first method to compare the neutral mass spectrum $I_{neut}(p)$ with each theoretical mass spectra $I_{th,M\_cand}(p)$ of the candidate species $M_{cand}$ of the set $S_{cand}$ of candidate species of molecules $M_{cand}$ corresponding to the neutral mass spectrum $I_{neut}(p)$ the method described in the U.S. Pat. No. 8,831,888 B2 can be used. Then the first subscore $S_{1,M\_cand}$ is the pattern spectral distance (PSD) calculated for the elemental composition of the candidate species of molecules $M_{cand}$. A preferred use of this method will be described below for the third example, which can be applied in the same way in all inventive methods, in particularly in the inventive method of this second example.

By the second method to compare the theoretical mass spectra $I_{th,M\_cand}(p)$ of the candidate species of molecules $M_{cand}$ with neutral mass spectrum $I_{neut}(p)$ a second subscore $s_{2,M\_cand}$ is determined for each candidate species $M_{cand}$, wherein the second subscore $s_{2,M\_cand}$ is addressing all peaks $C_{meas,i}$ in the neutral mass spectrum $I_{neut}(p)$, which are not identified in the theoretical mass spectrum $I_{th,M\_cand}(p)$ of the candidate species $M_{cand}$. So the second method is in particular sensitive in its subscore $s_{2,M\_cand}$ for peaks $C_{meas,i}$ in the neutral mass spectrum $I_{neut}(p)$, which cannot be identified in the theoretical mass spectra $I_{th,M\_cand}(p)$ of the candidate species of molecules $M_{cand}$.

When the second method recognizes that a peak $C_{meas,i}$ in the neutral mass spectrum $I_{neut}(p)$ cannot be identified in the theoretical mass spectra $I_{th,M\_cand}(p)$ of the candidate species of molecules $M_{cand}$, the subscore $s_{2,M\_cand}$ of the method is reduced. In particular for each peak $C_{meas,i}$ in the neutral mass spectrum $I_{neut}(p)$ which cannot be identified in the theoretical mass spectra $I_{th,M\_cand}(p)$ of the candidate species of molecules $M_{cand}$ the subscore $s_{2,M\_cand}$ of the second method is reduced. The reduction is done for every not identified peak $C_{neut,i}$ in the same way. The reduction depends on the intensity of the not identified peak $C_{neut,i}$ found in the neutral mass spectrum $I_{neut}(p)$. There is no reduction if the intensity of the not identified peak $C_{neut,i}$ is below a threshold value. In general, the second method is taking care if measured peaks in the neutral mass spectrum $I_{neut}(p)$ are explained by in the theoretical mass spectrum $I_{th,M\_cand}(p)$ of a candidate species $M_{cand}$. If peaks are missing and in particular peaks of high intensity are missing this is an indicator that the candidate species $M_{cand}$ is not abundant which is resulting in a lower score $s_{2,M\_cand}$.

For all candidate species $M_{cand}$ of the set $S_{cand}$ of candidate species of molecules $M_{cand}$ further in step (iv) of the inventive method a final score $fs_{M\_cand}$ is calculated from the subscores $s_{i,M\_cand}$.

In inventive method of this second example in step (iv) of the inventive method a final score $fs_{M\_cand}$ is calculated from the subscores $s_{i,M\_cand}$ only for all candidate species $M_{cand}$, for which one of both of the subscores of the first method and the second method $s_{1,M\_cand}$ and $s_{1,M\_cand}$ are higher than an assigned threshold value $s_{i,th,fs}$ for calculating the final score $fs_{M\_cand}$. By this criteria the calculation of final scores $fs_{M\_cand}$ is avoided, which due to the value of one subscore have no chance to belong to the final scores $fs_{high,k}$ having the highest values. The threshold values $s_{i,th,fs}$ are derived from a ranking of the candidate species $M_{cand}$ according to a subscore $s_{i,M\_cand}$. Then the value of the subscore $s_{i,M\_cand}$ of the candidate species $M_{cand}$ on a specific rank is defining the threshold value $s_{i,th,fs}$.

The final score $fs_{M\_cand}$ is calculated in the first example from a summation of functions only depending on one subscore $s_{i,M\_cand}$.

Because only the subscores $s_{1,M\_cand}$ and $s_{2,M\_cand}$ are used then the final score $fs_{M\_cand}$ of the first example is given by:

$$fs_{M\_cand}=f(s_{1,M_{cand}})+g(s_{2,M_{cand}})$$

In a particular preferred embodiment of the inventive method of the first example the final score $fs_{M\_cand}$ is be calculated from a summation of linear functions of the subscores $s_{i,M\_cand}$. Each function is defined by a weighting factor fi assigned to each subscore $s_{i,M\_cand}$. Then the final score $fs_{M\_cand}$ is given by:

$$fs_{M\_cand}=f_1*s_{1,M_{cand}}+f_2*s_{2,M_{cand}}$$

When the final score $fs_{M\_cand}$ has been calculated for all candidate species $M_{cand}$ of the set $S_{cand}$ of candidate species of molecules $M_{cand}$, in step (v) of the inventive method the final scores $fs_{high}$ from all final score $fs_{M\_cand}$ of all candidate species $M_{cand}$ of the set $S_{cand}$ of candidate species of molecules $M_{cand}$ is determined, which has the highest value.

Then in the next step (vi) of the inventive method the elemental composition of the candidate species $M_{cand,high}$ of the set $S_{cand}$ of candidate species of molecules $M_{cand}$ is determined which has the final scores $fs_{high}$ of the highest value. This is done by looking up the elemental composition of the candidate species $M_{cand}$, if it is realised that the final scores $fs_{M\_cand}$ is the final scores $fs_{high}$ of the highest value. The elemental composition of this candidate species $M_{cand}$ is then listed in a table of all molecules M contained in the investigated sample, for which the elemental composition has been identified with the inventive method of the second example, and shown on a display.

A third example of the inventive method is identifying the most likely elemental compositions of at least one species of molecules M contained in an investigated sample.

In step (i) of the third example of the inventive method mass spectrum $I_{meas}(m/z)$ of the investigated sample is measured with a mass spectrometer. In this mass spectrum the peak position p is directly given by a mass to charge ratio of ions detected in a mass spectrometer.

If a mass spectrum of a sample shall be measured with a mass spectrometer, it is necessary to ionize to material of the sample, in particular the molecules M contained in the sample with an ionization process.

In step (ii) of the inventive method at first a peak of interest $C_{int}$ in the measured mass spectrum $I_{meas}(m/z)$ is identified. This can be done manually by a user or according to some defined criteria like the intensity of the peak and the mass to charge ratio of the peak.

Then the mass to charge ratio $m/z_{meas,int}$ of the peak of interest $C_{int}$ of the measured mass spectrum is reduced to its mass to charge ratio $m/z_{neutral,int}$ in the neutral mass spectrum $I_{neut}(m/z)$ derived by reduction of the measured mass spectrum $I_{meas}(m/z)$ according to the ionization process. To get the mass to charge ratio $m/z_{neutral,int}$ of the peak of interest $C_{int}$ in the neutral mass spectrum $I_{neut}(m/z)$ the mass to charge ratio m/z in the measured mass spectrum $I_{meas}(m/z)$ of ionized species of molecules M, the ions I, has to be shifted to its mass to charge ratio $m/z_{neutral,int}$ in the neutral mass spectrum $I_{neut}(m/z)$ of the neutral species of molecules M according to the mass shift, which has happened to the molecules M contained in the sample due to the ionization process.

Further on a set $S_{inv}$ of species of molecules $M_{inv}$ has to be defined, for which molecules $M_{inv}$ it has to be investigated if the isotope distribution of their ions $I_{in}$, occurs in the measured mass spectrum $I_{meas}(p)$. This set $S_{inv}$ of species of molecules $M_{inv}$ can be defined by a lot of criteria scribed above and according to the expectation which kind of species of molecules can be present in the investigated sample.

In step (ii) of the inventive method it is determined a set $S_{cand}$ of candidate species of molecules $M_{cand}$ from the defined set $S_{inv}$ of species of molecules $M_{inv}$ which have an expected peak $C_{ex,inv}$ in a mass spectrum corresponding to the neutral mass spectrum $I_{neut}(m/z)$ with a mass to charge ratio $m/z_{ex,inv}$ within a mass to charge tolerance range $\Delta m/z_{tol}$ assigned to the peak of interest $C_{int}$ in the corresponding neutral mass spectrum $I_{neut}(m/z)$.

The peak position $p_{ex,inv}$ of the expected peak $C_{ex,inv}$ has to be given by a mass spectrum which corresponds to the mass spectrum in which the peak of interest $C_{int}$ is identified.

If the peak position p is the neutral mass spectrum $I_{neut}(m/z)$ is given by the mass to charge ratio m/z, then the peak position $p_{ex,inv}$ of the expected peak $C_{ex,inv}$ has a mass to charge value $m/z_{ex,inv}$ to be defined for a mass spectrum corresponding to the neutral mass spectrum $I_{neut}(m/z)$. In particular in this case only the mass to charge value $m/z_{ex,inv}$ of the expected peak $C_{ex,inv}$ has to be known. If the mass to charge value $m/z_{ex,inv}$ of a species of molecules $M_{inv}$ is within the mass to charge tolerance range $\Delta m/z_{tol}$ of the peak of interest $C_{int}$ then the species of molecules $M_{inv}$ is a candidate species of molecules $M_{cand}$ which will be investigated further.

The expected peaks $C_{ex,inv,I}$ of species of molecules $M_{inv}$ are deduced from theory and it is possible to calculate a theoretical mass spectrum $I_{th,M\_inv}$. Methods to do these calculations are well known.

The theoretical mass spectrum $I_{th,M\_inv}(p)$ is a mass spectrum corresponding to a neutral mass spectrum $I_{neut}(m/z)$. It can be a calculated mass spectrum according to the expected isotope distribution of the molecule $M_{inv}$. During the calculation the resolving power of the mass spectrometer measuring the measured mass spectrum $I_{meas}(m/z)$ can be taken into account. But also the expected centroid of an isotope of the candidate species $M_{inv}$ can be taken into account, which is a peak pattern. The theoretical mass spectrum $I_{th,M\_inv}(m/z)$ can be also be a mass spectrum of the species of molecules $M_{inv}$, which is stored in a database after it has been calculated. Because the elemental composition of species of molecules M contained in the sample shall be identified, which is a uncharged and therefore neutral molecule, a theoretical mass spectrum $I_{th,M\_inv}(m/z)$ of the species of molecules $M_{inv}$ is used, which corresponds a the neutral mass spectrum $I_{neut}(m/z)$, which is achieved by the reduction of the measured mass spectrum $I_{meas}(m/z)$.

In the step (ii) of the inventive method it is not necessary to know the mass spectrum $I_{M\_inv}(p)$ of the species of molecules $M_{inv}$ of the set $S_{inv}$. The candidate species of molecules $M_{cand}$ must only have a peak position $p_{ex,inv}$ within the tolerance range $\Delta p_{tol}$ assigned to the peak of interest $C_{int}$. Therefore it is only necessary to know the mass spectrum $I_{M\_inv}(p)$ of the species of molecules $M_{inv}$ of the set $S_{inv}$ in the tolerance range $\Delta p_{tol}$ assigned to the peak of interest $C_{int}$.

It is also possible that for the species of molecules $M_{inv}$ the isotope distribution is deduced from a theoretical mass spectrum. By the peak pattern of the isotope distribution for each isotope n is identified in the mass spectrum a peak $C_{ID,inv,n}$ is given having a mass to charge ratio $m/z_{ID,inv,n}$ correlated to the abundance of the isotope n. Then the peaks $C_{ID,inv,n}$ of the isotope distribution of the species of molecules $M_{inv}$ can be used as expected peaks $C_{ex,inv}$ of the species of molecules $M_{inv}$ in step (ii) of the inventive method.

A theoretical mass spectrum $I_{th,M\_inv}(p)$ can be a calculated mass spectrum according to the expected isotope distribution of the molecule $M_{inv}$. This calculation can be done for a complete expected isotope distribution or only for a part if the isotope distribution. The calculation can be limited to isotopes having an abundance higher than a threshold value. The calculation can be limited to a specific number of isotopes having the highest abundance and/or having the lowest mass in the mass spectrum.

The tolerance range $\Delta m/z_{tol}$ assigned to the peak of interest $C_{int}$ is defined in the mass spectrum which is corresponding to the mass spectrum in which the expected peaks $C_{ex,inv}$ of the species of molecules $M_{inv}$ used in step (ii) are known. Because the elemental composition of species of molecules $M_{cand}$ contained in the sample shall be identified with the inventive method of the third example, the tolerance range $\Delta m/z_{tol}$ assigned to the peak of interest $C_{int}$ is defined in the neutral mass spectrum $I_{neut}(m/z)$.

If the peak of interest $C_{int}$ is identified in the neutral mass spectrum $I_{neut}(m/z)$, the peak of interest $C_{int}$ has a mass to charge ratio $m/z_{int,neut}$ in the neutral mass spectrum $I_{neut}(m/z)$ and the tolerance range $\Delta m/z_{tol}$ is assigned to the peak of interest $C_{int}$ by a range around the peak position $m/z_{int,neut}$ of the peak of interest $C_{int}$. Preferably the tolerance range $\Delta m/z_{to}$, is symmetrically to the peak position $m/z_{int,neut}$ of the peak of interest $C_{int}$, so that the distance between lower endpoint of the tolerance range $\Delta m/z_{tol}$ and the mass to charge ratio $m/z_{int,neut}$ of the peak of interest $C_{int}$ is equal to the distance between higher endpoint of the tolerance range $\Delta m/z_{tol}$ and the mass to charge ratio $m/z_{int,neut}$ of the peak of interest $C_{int}$.

Because the peak of interest $C_{int}$ is identified in the measured mass spectrum $I_{meas}(p)$, at first the mass to charge to charge ratio $m/z_{int,meas}$ of the peak of interest $C_{int}$ in the measured mass spectrum $I_{meas}(m/z)$ is identified and then reduced to the mass to charge ratio $m/z_{int,neut}$ of the peak of interest $C_{int}$ in the neutral mass spectrum $I_{neut}(m/z)$ due to the knowledge of the at least one ionization process applied to the investigated sample in the mass spectrometer before the measured mass spectrum $I_{meas}(m/z)$ has been measured. Then the tolerance range $\Delta m/z_{tol}$ is assigned to the peak of interest $C_{int}$ by a range around the peak position $m/z_{int,neut}$ of the peak of interest $C_{int}$ as described before.

The identification mass spectra $I_{id,M\_cand}(m/z)$ can be theoretical mass spectra $I_{th,M\_cand}(m/z)$ of the candidate species of molecules. The theoretical mass spectra $I_{th,M\_cand}(m/z)$ can be calculated during the execution of the method or can be calculated before and stored in a database. This database may be available in a storage of the used mass spectrometer or available via an internet connection in an external storage or a cloud system.

In the inventive method of the third example in step (iii) for the candidate species $M_{cand}$ of the set $S_{cand}$ of candidate species of molecules $M_{cand}$ theoretical mass spectra $I_{th,M\_cand}(m/z)$ are calculated which correspond to the measured mass spectrum $I_{meas}(m/z)$ and in step (ii) before for the candidate species $M_{cand}$ of the set $S_{cand}$ of candidate species of molecules $M_{cand}$ theoretical mass spectra $I_{th,M\_cand}(m/z)$ may be calculated which correspond to the neutral mass spectrum $I_{neut}(m/z)$ wherein the theoretical mass spectra $I_{th,M\_cand}(m/z)$ correspond to the measured mass spectrum $I_{meas}(m/z)$ are used in step (iii) as identification mass spectrum $I_{id,M\_cand}(m/z)$.

So the determination of identification mass spectra $I_{id,M\_cand}(m/z)$ in step (iii) is done by the calculation theoretical mass spectra $I_{th,M\_cand}(m/z)$ or the identification of the identification mass spectra $I_{id,M\_cand}(m/z)$ in databases.

in step (iii) for each candidate species $M_{cand}$ is determined an assigned ion $I_{cand}$ which is originated by at least one ionization process of the sample before the measurement of the mass spectrum $I_{meas}(m/z)$ and based on this assigned ions $I_{cand}$ for each candidate species $M_{cand}$ the complete theoretical mass spectrum $I_{th,M\_cand}(m/zp)$ corresponding the measured mass spectrum $I_{meas}(m/z)$ is calculated or identified in databases.

The identification mass spectra $I_{id,M\_cand}(m/z)$ are complete mass spectra of the candidate species of molecules $M_{\_cand}$ showing the whole isotope distribution of the molecule only limited by the resolution and signal-to-noise ratio S/N under which the identification mass spectra $I_{id,M\_cand}(m/z)$ are calculated.

The identification mass spectra $I_{id,M\_cand}(p)$ may be comprise only peaks of isotopes having an abundance higher than a threshold value.

In step (iii) of the inventive method further a range of mass to charge ratios $\Delta p$ is determined in which the determined identification mass spectra $I_{id,M\_cand}(m/z)$ of all candidate species $M_{cand}$ of the set $S_{cand}$ of candidate species of molecules $M_{cand}$ are arranged. The range of mass to charge ratios $\Delta p$ is determined by identifying a range of mass to charge ratios which is comprising the mass to charge ratios $m/z_{th,M\_cand,i}$ of all peaks $C_{th,M\_cand,i}$ of the complete identification mass spectra $I_{id,M\_cand}(m/z)$ corresponding to the measured mass spectrum $I_{meas}(m/z)$ of all candidate species $M_{cand}$ of the set $S_{cand}$ of candidate species of molecules $M_{cand}$. So in the range of mass to charge ratios $\Delta p$ all peaks $C_{th,M\_cand,i}$ of the identification mass spectra $I_{id,M\_cand}(m/z)$ of all candidate species $M_{cand}$ of the set $S_{cand}$ of candidate species of molecules $M_{cand}$ are positioned in the range of mass to charge ratios $\Delta p$. The lower endpoint of the range of mass to charge ratios $\Delta p$ is similar or below the lowest value of a mass to charge ratio $P_{th,M\_cand,i}$ of any peak $C_{th,M\_cand,i}$ of all candidate species $M_{cand}$ of the set $S_{cand}$ of candidate species of molecules $M_{cand}$ and the highest endpoint of the range of mass to charge ratios $\Delta p$ is similar or above the highest value of a mass to charge ratio $p_{th,M\_cand,i}$ of any peak $C_{id,M\_cand,I}$ of all candidate species $M_{cand}$ of the set $S_{cand}$ of candidate species of molecules $M_{cand}$. Because the identification mass spectra $I_{id,M\_cand}(m/z)$ are a complete mass spectra of the candidate species of molecules $M_{cand}$ it is guaranteed that in the range of mass to charge ratios $\Delta p$ all isotope distributions of all candidate species $M_{cand}$ of the set $S_{cand}$ of candidate species of molecules $M_{cand}$ are completely encompassed. In the range of mass to charge ratios $\Delta p$ each identification mass spectrum $I_{id,M\_cand}(m/z)$ of a candidate species of molecules $M_{cand}$ can be compared with the corresponding measured mass spectrum $I_{meas}(m/zp)$ without missing any peak of the candidate species of molecules $M_{cand}$ existing in its identification mass spectrum $I_{id,M\_cand}(m/z)$.

In step (iv) of the inventive method this comparison of the measured mass spectrum $I_{meas}(m/z)$ with each identification mass spectrum $I_{id,M\_cand}(m/z)$ of the candidate species $M_{cand}$ of the set $S_{cand}$ of candidate species of molecules $M_{cand}$ corresponding to the measured mass spectrum $I_{meas}(m/z)$ is executed in the determined range of mass to charge ratios $\Delta p$.

In the third example of the inventive method for each candidate species $M_{cand}$ of the set $S_{cand}$ of candidate species of molecules $M_{cand}$ determined before its identification mass spectrum $I_{id,M\_cand}(m/z)$ corresponding to the measured mass spectrum $I_{meas}(m/z)$ is compared with the measured mass spectrum $I_{meas}(m/z)$.

For all candidate species $M_{cand}$ this comparison is done with two different methods, a first method and a second method, having a different focus on the features of measured mass spectrum $I_{meas}(m/z)$ and the identification mass spectra $I_{id,M\_cand}(m/z)$ of the candidate species of molecules $M_{cand}$.

It is also possible to use more than this two methods of comparison in step (iv) of the inventive method.

By the first method to compare the identification mass spectra $I_{id,M\_cand}(m/z)$ of the candidate species of molecules $M_{cand}$ with measured mass spectrum $I_{meas}(m/z)$ it is determined a first subscore $s_{1,M\_cand}$ for each candidate species $M_{cand}$. This first subscore $s_{1,M\_cand}$ of the first method is addressing all peaks $C_{id,M\_cand,i}$ in the identification mass spectrum $I_{id,M\_cand}(m/z)$ of the candidate species $M_{cand}$, which are not identified in the measured mass spectrum $I_{meas}(m/z)$. So the first method is in particular sensitive in its subscore $s_{1,M\_cand}$ for peaks $C_{id,M\_cand,i}$ of an identification mass spectrum $I_{id,M\_cand}(m/z)$ of a candidate species $M_{cand}$, which cannot be identified in the measured mass spectrum $I_{meas}(m/z)$.

When the first method recognizes that is a peak $C_{id,M\_cand,i}$ of an identification mass spectrum $I_{id,M\_cand}(m/z)$ of a candidate species $M_{cand}$ cannot been identified in the measured mass spectrum $I_{meas}(m/z)$, the subscore $s_{1,M\_cand}$ of the method is reduced. In particular for each peak $C_{id,M\_cand,i}$ of an identification mass spectrum $I_{id,M\_cand}(m/z)$ of a candidate species $M_{cand}$ which cannot been identified in the measured mass spectrum $I_{meas}(m/z)$ the subscore $s_{1,M\_cand}$ of the first method is reduced. The reduction can be is for every not identified peak $C_{id,M\_cand,I}$ the same. There is no reduction if the intensity of the not identified peak $C_{id,M\_cand,i}$ is below a threshold value. In general, the first method is taking care if expected peaks the identification mass spectrum $I_{id,M\_cand}(m/z)$ are found in the measured mass spectrum. If expected peaks are missing and in particular a lot of expected peaks are missing this is an indicator that the candidate species $M_{cand}$ is not abundant which is resulting in a lower score $s_{1,M\_cand}$.

In a preferred embodiment as the first method to compare the measured mass spectrum $I_{meas}(m/z)$ with each identification mass spectrum $I_{id,M\_cand}(m/z)$ of the candidate species $M_{cand}$ of the set $S_{cand}$ of candidate species of molecules $M_{cand}$ corresponding to the measured mass spectrum $I_{meas}(m/z)$ the method described in the U.S. Pat. No. 8,831,888 B2 can be used. Then the first subscore $S_{1,M\_cand}$ is the pattern spectral distance (PSD) calculated for the elemental composition of the candidate species of molecules $M_{cand}$. More details how to use this method in a favourable manner to improve further the inventive manner are described below showing measurement examples and the use of the method of the third example.

By the second method to compare the identification mass spectra $I_{id,M\_cand}(m/z)$ of the candidate species of molecules $M_{cand}$ with measured mass spectrum $I_{meas}(m/z)$ it is determined a second subscore $s_{2,M\_cand}$ for each candidate species $M_{cand}$, wherein the second subscore $s_{2,M\_cand}$ is addressing all peaks $C_{meas,i}$ in the measured mass spectrum $I_{meas}(m/zp)$, which are not identified in the identification mass spectrum $I_{id,M\_cand}(m/z)$ of the candidate species $M_{cand}$. So the second method is in particular sensitive in its subscore $s_{2,M\_cand}$ for all peaks $C_{meas,i}$ in the measured mass spectrum $I_{meas}(p)$, which cannot be identified in the identification mass spectra $I_{id,M\_cand}(m/z)$ of the candidate species of molecules $M_{cand}$.

When the second method recognizes that is a peak $C_{meas,i}$ in the measured mass spectrum $I_{meas}(m/z)$ cannot been identified in the identification mass spectra $I_{id,M\_cand}(m/z)$ of the candidate species of molecules $M_{cand}$, the subscore $s_{2,M\_cand}$ of the method is reduced. For each peak $C_{meas,i}$ in the measured mass spectrum $I_{meas}(m/z)$ which cannot been identified in the identification mass spectra $I_{id,M\_cand}(m/z)$ of the candidate species of molecules $M_{cand}$ the subscore $s_{2,M\_cand}$ of the second method is reduced. The reduction is for every not identified peak $C_{meas,i}$ in the same way. The reduction depends on the intensity of the not identified peak $C_{meas,i}$ found in the measured mass spectrum $I_{meas}(m/z)$. There is no reduction if the intensity of the not identified peak $C_{meas,i}$ is below a threshold value. In general, the second method is taking care if measured peaks in the measured mass spectrum $I_{meas}(m/z)$ are explained by in the identification mass spectrum $I_{id,M\_cand}(m/z)$ of a candidate species $M_{cand}$. If measured peaks are missing and in particular measured peaks of high intensity are missing or a lot of measured peaks are missing this is an indicator that the candidate species $M_{cand}$ is not abundant which is resulting in a lower score $s_{2,M\_cand}$.

For all candidate species $M_{cand}$ of the set $S_{cand}$ of candidate species of molecules $M_{cand}$ further in step (iv) of the inventive method a final score $fs_{M\_cand}$ is calculated from the subscores $s_{i,M\_cand}$.

In the inventive method of the third example the final score $fs_{M\_cand}$ can be calculated from a summation of only functions (e.g. f and g), which depend only on one subscore $s_{i,M\_cand}$. If only the subscores $s_{1,M\_cand}$ and $s_{2,M\_cand}$ are used then the final score $fs_{M\_cand}$ is given by:

$$fs_{M\_cand} = f(s_{1,M_{cand}}) + g(s_{2,M_{cand}})$$

In an inventive method of the third example the final score $fs_{M\_cand}$ can be calculated from a summation of linear functions of the subscores $s_{i,M\_cand}$. Each function is defined by a weighting factor fi assigned to each subscore $s_{i,M\_cand}$. If only the subscores $s_{1,M\_cand}$ and $s_{2,M\_cand}$ are used then the final score $fs_{M\_cand}$ is given by:

$$fs_{M\_cand} = f_1 * s_{1,M_{cand}} + f_2 * s_{2,M_{cand}}$$

When the final score $fs_{M\_cand}$ has been calculated for the candidate species $M_{cand}$ of the set $S_{cand}$ of candidate species of molecules $M_{cand}$, in step (v) of the inventive method the final score $fs_{high}$ from the final score $fs_{M\_cand}$ of all candidate species $M_{cand}$ of the set $S_{cand}$ of candidate species of molecules $M_{cand}$ is determined, which has the highest value. So at the end the final score $fs_{high}$ having the highest values is identified.

Then in the nest step (vi) of the inventive method the elemental composition of the candidate species $M_{cand,high}$ of the set $S_{cand}$ of candidate species of molecules $M_{cand}$ is determined which has the final scores $fs_{high}$ of the highest value. This is done by looking up the elemental composition of the candidate species $M_{cand}$, if it is realised that the final scores $fs_{M\_cand}$ is the final scores $fs_{high}$ of the highest value. The elemental composition of this candidate species $M_{cand}$ can then be listed with or without their final score $fs_{M\_cand}$ in a table together with other candidate species $M_{cand}$ identified to be contained in the sample and shown on a display.

It will now be shown on the basis of two examples of the measured mass spectra, how the inventive method and in particular the inventive method of the third example works and identifies the most likely composition of species of molecules M contained in an investigated samples in a much better way. Further on by the examples more details of the inventive method are explained, which can be used in every inventive method encompassed by the described invention:

In the first measurement example a sample is investigated which is comprising the pesticide Imidachloprid as one of various pesticides. The species of molecules Imidachloprid has the molecular formula $C_9H_{10}ClN_5O_2$. The sample is introduced into a Orbitrap® Elite mass spectrometer and ionized by electrospray ionisation before measuring a mass spectrum.

Figure 2:
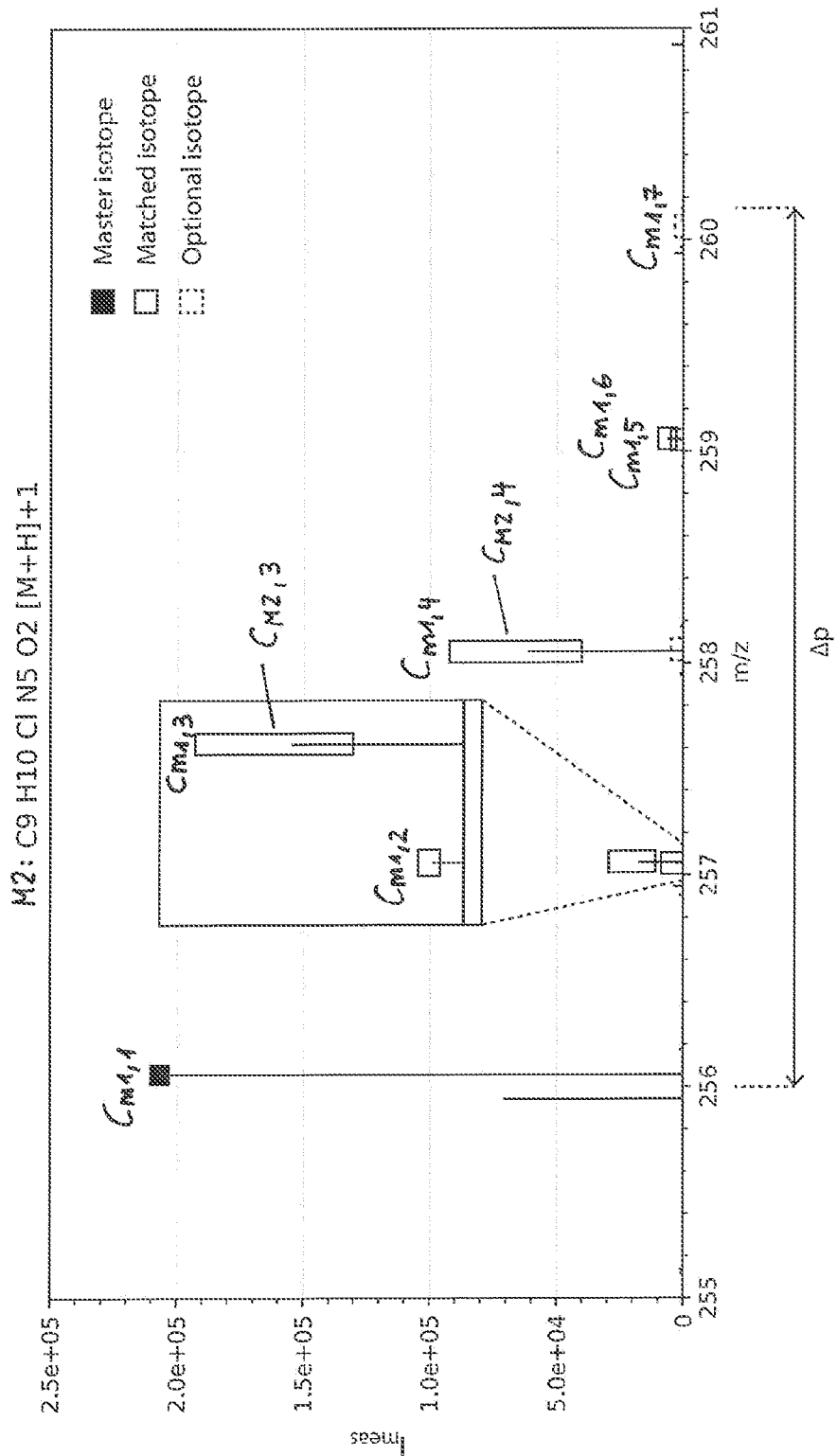
FIG. 2 shows the measured mass spectrum $I_{meas\_1}(m/z)$ also shown in FIG. 1 and the comparison of the measured mass spectrum $I_{meas\_1}(m/z)$ with a theoretical mass spectrum $I_{th,M2}(m/z)$ of a second candidate species M2 with two different methods.
Figure 3:
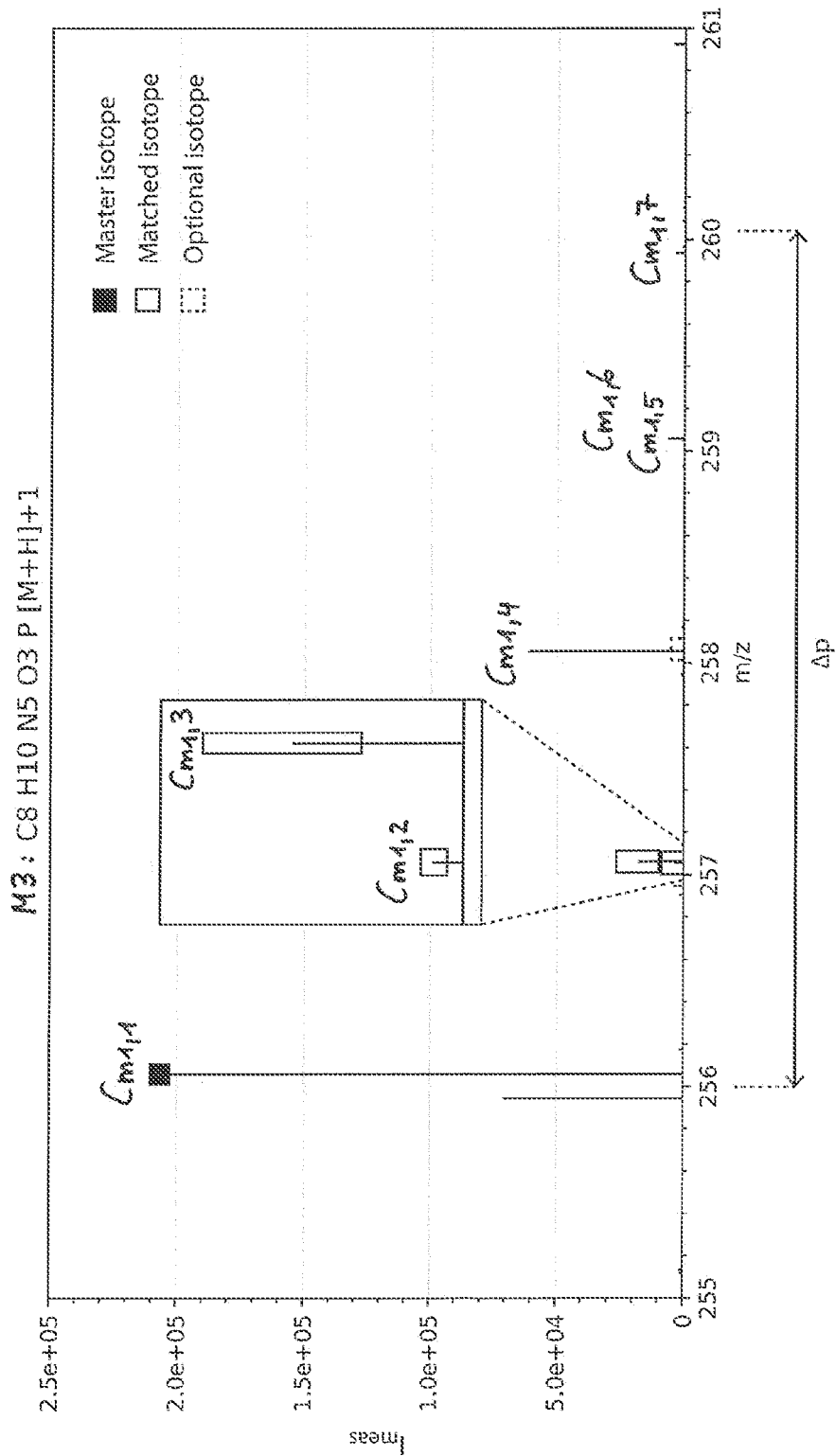
FIG. 3 shows the measured mass spectrum $I_{meas\_1}(m/z)$ also shown in FIG. 1 and the comparison of the measured mass spectrum $I_{meas\_1}(m/z)$ with a theoretical mass spectrum $I_{th,M3}(m/z)$ of a third candidate species M3 with two different methods.

A portion of the measured mass spectrum $I_{meas\_1}(m/z)$ is shown in the FIGS. 1 to 3. In a range of mass to charge ratio range Δp defined below 7 peaks are identified, the peaks $C_{m1,1}, C_{m1,2} \ldots C_{m1,7}$.

If now the inventive method of the third example is applied to identify species of molecules M, at first a peak of interest $C_{int}$ has to be identified for which the elemental composition of the corresponding molecule $M_{int}$ has to be identified. In this example the peak of interest $C_{int}$ is the highest peak of an expected isotope distribution, the measured peak $C_{m1,1}$. The set $S_{inv}$ of investigated species $M_{inv}$ is to limited by same criteria as described above when applying the inventive method of the third example: the used criteria are:

The molecule may contain only the elements: H, C, N, O, S, P, Cl, Br, F, Si, I

The minimum number of atoms contained in the molecule for all of these elements is 0.

Maximum number $Max_H$ of H atoms: 180
Maximum number $Max_C$ of C atoms: 80
Maximum number $Max_N$ of N atoms: 30
Maximum number $Max_O$ of O atoms: 30
Maximum number $Max_S$ of S atoms: 5
Maximum number $Max_P$ of P atoms: 2
Maximum number $Max_{Cl}$ of Cl atoms: 4
Maximum number $Max_{Br}$ of Br atoms: 3
Maximum number $Max_I$ of I atoms: 1
Maximum number $Max_F$ of F atoms: 10
Maximum number $Max_{Si}$ of Si atoms: 1
Minimum value of the R/C ratio: 0.1
Maximum value of the R/C ratio: 4.0
Minimum value of RDBE: 0
Maximum value of RDBE: 40

To determine the set $S_{cand}$ of candidate species of molecules $M_{cand}$ form the set $S_{inv}$ in step (ii) to the peak of interest $C_{m1,1}$ is assigned a mass to charge ratio range $\Delta m/z_{tol}$ which is correlated with a mass to charge tolerance of 5 ppm That means that every candidate species of molecules $M_{cand}$ has to have an expected peak $C_{ex,inv}$ within a mass to charge range tolerance of 5 ppm related to the mass to charge ratio value $m/z_{m1,1}$ of the peak of interest $C_{m1,1}$. Because the mass to charge ratio value $m/z_{m1,1}$ is roughly 256.1 u, the mass to charge ratio range $\Delta m/z_{to}$ has a value of 0.00256 u and because this range is symmetric every candidate species of molecules has to have a peak whose mass to charge ratio should not differ from that of the peak of interest $C_{m1,1}$ more than 0.00128 u.

For the identified candidate species of molecules $M_{cand}$ a theoretical mass spectrum is calculated as identification mass spectrum $I_{id,M\_cand}(m/z)$ taking into account the resolving power and peak shape of the used mass analyser and from the identification mass spectrum $I_{id,M\_cand}$ of all candidate species $M_{cand}$ of mass to charge ratio range Δm/z is determined comprising all peaks $C_{id,M\_cand,i}$ of the identification mass spectrum $I_{id,M\_cand}$ of all candidate species $M_{cand}$.

Then in step (iv) these identification mass spectra $I_{id,M\_cand}$ are compared with the measured mass spectrum $I_{meas\_1}(m/z)$ in this mass to charge ratio range Δm/z. The first method to compare both spectra of the method to calculate a pattern spectral distance described in the U.S. Pat. No. 8,831,888 B2 as subscore S1, M_cand. The method is applied by allowing an mass to charge ratio error of 5 ppm of the expected peaks of the identification mass spectra $I_{id,M\_cand}$ and an intensity error of 30% of the expected peak of the identification mass spectra $I_{id,M\_cand}$. The pattern spectral distance (PSD) is based on the assumption to identify the expected peaks of identification mass spectra $I_{id,M\_cand}$. Therefore a penalty value for the spectral distance (SD) of a non-identified expected peak of the identification mass spectra $I_{id,M\_cand}(m/z)$ is given, which is defined to be 1. Due to this penalty for expected peaks of the identification mass spectra $I_{id,M\_cand}(m/z)$ the method of the pattern spectral distance here is addressing to missing peaks in the identification mass spectra $I_{id,M\_cand}$ not identified in the measured spectrum mass spectrum $I_{meas\_1}(m/z)$ The results of the comparison with the method of the pattern spectral distance are shown in the FIGS. 1 to 3 for the candidate molecules $M_{cand}$:

FIG. 1 M1: $C_9H_9F_4NO_3$
FIG. 2 M2: $C_9H_{10}ClN_5O_2$
FIG. 3 M3: $CsH_{10}N_5O_3P$

For each expected peak of the identification mass spectra $I_{id,M\_cand}$ of these molecules there is given a rectangle identification box by the allowed mass to charge ratio error of 5 ppm of the expected peaks (x direction, no appropriate dimension used for clarity) and the intensity error of 30% of the expected peaks (y direction). In FIG. 2 for the expected peaks $C_{M2,3}$ and $C_{M2,4}$ of the molecule M2 the rectangle identification boxes are labelled. If no measured peak is lying in a rectangle identification box of an expected peak, the expected peak is missing and penalized in calculating the score $s_{1,M2}$. Only expected peaks which have an intensity of below a threshold of 3 times the S/N ratio of the measured mass spectrum I meas 1(m/z) are not penalized if they are missing.

Because the measured peaks $C_{m1,2}$ and $C_{m1,3}$ have nearly the same mass to charge ratio, the area around the mass to charge ratio 257 u is enlarged in all three figures to show in detail the rectangle identification boxes of the expected peaks of the identification mass spectra $I_{id,M\_cand}(m/z)$ at this mass to charge ratio.

In table 1 is shown the calculated results for the candidate species $M_{cand}$ having the highest PSD values as score $s_{1,M\_cand}$.

TABLE 1

| Rank | Molecular formula | Matched expected isotopes | Missed expected isotopes | Final score $s_1$ | PSD = Ssubcore $s_1$ |
|---|---|---|---|---|---|
| 1 | C9 H9 F4 N O3 | 2 | 0 | 70.06 | 70.06 |
| 2 | C7 H6 F N7 O3 | 3 | 0 | 67.62 | 67.62 |

TABLE 1-continued

| Rank | Molecular formula | Matched expected isotopes | Missed expected isotopes | Final score $s_1$ | PSD = Ssubcore $s_1$ |
|---|---|---|---|---|---|
| 3 | C8 H10 N5 O3 P | 3 | 0 | 59.90 | 59.90 |
| 4 | C9 H18 Cl N O S2 | 4 | 1 | 45.10 | 45.10 |
| →5 | C9 H10 Cl N5 O2 | 6 | 0 | 42.73 | 42.73 |
| 6 | C8 H18 N O2 P S2 | 2 | 1 | 40.95 | 40.95 |
| 7 | C7 H11 F6 N S | 2 | 1 | 40.67 | 40.67 |
| 8 | C3 H11 Cl N9 O P | 4 | 1 | 38.56 | 38.56 |
| 9 | C6 H12 F2 N5 P S | 3 | 1 | 37.22 | 37.22 |
| 10 | C6 H12 Cl F2 N5 Si | 4 | 2 | 34.07 | 34.07 |

Molecule M1 has rank 1, molecule M2 has rank 5 and molecule M3 has rank 3.

In the FIGS. 1 to 3 is shown at first the master isotope, which has to fit the peak of interest $C_{m1,1}$. The expected intensity of master isotope is set to be the same as the intensity of the peak of interest $C_{m1,1}$ to normalize the intensity of the measured mass spectrum $I_{meas\_1}(m/z)$ and the intensity of identification mass spectra $I_{id,M\_cand}(m/z)$. Further it is shown which measured peaks $C_{m1,i}$ match with an expected peak $C_{MX,j}$ of the identification mass spectra $I_{id,MX}$ of the molecule MX (X=1,2,3) and its rectangle identification box. When a measured peaks $C_{m1,i}$ match with an expected peak $C_{MX,j}$ then the rectangle identification box is shown with a continuous line showing that an theoretical expected isotope is matched by the measured mass spectrum. When the expected intensity of an expected peak $C_{MX,j}$ is below the threshold of 3 times of the S/N ratio the minimum allowed expected intensity of an expected peak $C_{MX,j}$ is extended to 0. If no measured peaks $C_{m1,i}$ matches with such an expected peak $C_{MX,j}$ by lying in the rectangle identification box, then the rectangle identification box is shown with a dotted line showing that there is an optional expected peak $C_{MX,j}$ which is not matched but also not penalized due to the small value of the expected intensity of an expected peak $C_{MX,j}$.

It can be seen in the FIGS. 1 to 3, that for all three molecules M1, M2 and M3 the measured peaks $C_{m1,i}$ match with all expected peak $C_{MX,j}$ of the identification mass spectra $I_{id,MX}$ of the molecule MX (X=1,2,3) and its rectangle identification box, which otherwise would be penalized. There are only optional expected peak $C_{MX,j}$ which are not matched. But the number of matched measured peaks $C_{m1,1}$ is different. 6 peaks $C_{m,1}$, $C_{m1,2}$, $C_{m1,3}$, $C_{m1,4}$, $C_{m1,5}$ and $C_{m1,6}$ of the measured mass spectrum $I_{meas\_1}(m/z)$ match the expected peak $C_{M2,j}$ of the identification mass spectra $I_{id,M2}(m/z)$ of the molecule M2. 3 peaks $C_{m1,1}$, $C_{m1,2}$ and $C_{m1,3}$ of the measured mass spectrum $I_{meas\_1}(m/z)$ match the expected peak $C_{M3,j}$ of the identification mass spectra $I(m/z)_{id,M3}$ of the molecule M3. Only the two peaks $C_{m1,1}$ and $C_{m1,3}$ of the measured mass spectrum $I_{meas\_1}(m/z)$ match the expected peak $C_{M1,j}$ of the identification mass spectra $I(m/z)_{id,M1}$ of the molecule M3. Particular the peak $C_{m1,2}$ of the measured mass spectrum $I_{meas\_1}(m/z)$ is not matching rectangle identification box of the expected peak $C_{M1,2}$ of the identification mass spectra $I_{id,M1}$ because the intensity of the measured peak $C_{m1,2}$ is too high, so that this measured peak cannot be identified by the identification mass spectra $I_{id,M1}$ of the molecule M1. Also the measured peaks $C_{m1,4}$, $C_{m1,5}$ and $C_{m1,6}$ are not identified by the identification mass spectra $I_{id,M1}(m/z)$ of the molecule M1, which was possible by the identification mass spectra $I_{id,M1}(m/z)$ of the molecule M2. This shows that despite the highest PSD value of the molecule M1 this molecule may not the species of molecules contained in the sample. To improve the assignment of the measured peaks to the expected peaks further in the example of the measured mass spectrum $I_{meas\_1}(m/z)$ an optional process of the inventive method is applied, a dynamic recalibration.

In this process the mean value of the difference $\Delta m/z_{recal}$ of the mass to charge value of the expected peaks $C_{M\_cand,i}$ and measured peaks $c_{m1,j}$, which are assigned to each other is determined for each candidate molecule. The difference $\Delta m/z_{recal}$ is then added to each mass to charge value of the whole measured mass spectrum $I_{meas\_1}(m/z)$ and then for the so shifted measured mass spectrum $I_{shift\_1}(m/z)=I_{meas\_1}(m/z+\Delta m/z_{recal})$ the pattern spectral distance is calculated again resulting in the score $s_{1,shift,M\_cand}$.

In table 2 is shown the calculated results for the candidate species $M_{cand}$ having the highest PSD values as score $s_{1,shift,M\_cand}$ after the dynamic recalibration.

TABLE 2

| Rank | Molecular formula | Matched expected isotopes | Missed expected isotopes | Final score $s_{1,\,shift}$ | PSD = Subcore $s_{1,\,shift}$ |
|---|---|---|---|---|---|
| 1 | C8 H10 N5 O3 P | 3 | 0 | 84.85 | 84.85 |
| 2 | C9 H9 F4 N O3 | 2 | 0 | 81.17 | 81.17 |
| →3 | C9 H10 Cl N5 O2 | 6 | 0 | 77.28 | 77.28 |
| 4 | C7 H6 F N7 O3 | 3 | 0 | 68.63 | 68.63 |
| 5 | C9 H18 Cl N O S2 | 4 | 1 | 48.33 | 48.33 |
| 6 | C7 H16 F N3 P2 S | 3 | 1 | 45.62 | 45.62 |
| 7 | C6 H12 F2 N5 P S | 3 | 1 | 42.55 | 42.55 |
| 8 | C8 H18 N O2 P S2 | 2 | 1 | 41.70 | 41.70 |
| 9 | C7 H11 F6 N S | 2 | 1 | 41.26 | 41.26 |
| 10 | C7 H16 Cl F N3 P Si | 4 | 2 | 40.00 | 40.00 |

Now molecule M1 has rank 2, molecule M2 has rank 3 and molecule M3 has rank 1.

But for molecule M3 the measured peaks $C_{m1,4}$, $C_{m1,5}$ and $C_{m1,6}$ are not identified by the identification mass spectra $I_{id,M3}(m/z)$.

Therefore in step (iii) of the third example of the inventive method the identification mass spectra $I_{id,M\_cand}(m/z)$ are compared with the measured mass spectrum $I_{meas\_1}(m/z)$ with a second method, which is addressing all those peaks $C_{m1,i}$, which are not identified in the identification mass spectra $I_{id,M\_cand}$.

The method is using an measured mass spectrum coverage score $s_{2,M\_cand}$. The score is given by the ratio, how much of the intensity of the measured peaks $C_{m1,i}$ in the mass to charge ratio range $\Delta m/z$ is identified by an identification mass spectrum $I_{id,M\_cand}(m/z)$. This is done by assigning to each measured peak $C_{m1,i}$ its centroid intensity $I_{m1,i}$.

For the measured mass spectrum $I_{meas\_1}(m/z)$ shown in the FIGS. 1 to 3. In the mass to charge ratio range $\Delta m/z$ 7 peaks are identified, the peaks $C_{m1,1}, C_{m1,2} \ldots C_{m1,7}$ having the centroid intensities $I_{m1,1}, I_{m1,2} \ldots I_{m1,7}$. If now only a subset $C_{m1,a}$ of these peaks $C_{m1,a}$ is identified by an identification mass spectra $I_{id,M\_cand}$ of a candidate species $M_{cand}$, at first the centroid intensities of these subset is summed up and then divided by the summed up centroid intensities $I_{m1,1}, I_{m1,2} \ldots I_{m1,7}$ of all peaks $C_{m1,1}, C_{m1,2} \ldots C_{m1,7}$ identified in the measured mass spectrum $I_{meas\_1}(m/z)$.

In this third example of the inventive method it is already defined by the first method to compare the identification mass spectra $I_{id,M\_cand}(m/z)$ with the measured mass spectrum $I_{meas\_1}(m/z)$, which measured peaks $C_{m1,i}$ in the mass to charge ratio range $\Delta m/z$ are identified by an identification mass spectra $I_{id,M\_cand}(m/z)$. If for example for a species of molecules $M_{ex}$ only the measured peaks $C_{m1,1}, C_{m1,3}, C_{m1,4}$ and $C_{m1,6}$ are identified by an identification mass spectra $I_{id,M\_ex}(m/z)$, then the measured mass spectrum coverage score $s_{2,M\_ex}$ is calculated by the formula:

$$s_{2,M\_ex} = \frac{I_{m1,1} + I_{m1,3} + I_{m1,4} + I_{m1,6}}{\sum_{k=1}^{7} I_{m1,k}}$$

In table 3 is shown the calculated results for the candidate species $M_{cand}$ having the highest final score $fs_{M\_cand}$ calculated from PSD values as score $s_{1,shift,M\_cand}$ after the dynamic recalibration and measured mass spectrum coverage (MS coverage) score $s_{2,M\_cand}$.

TABLE 3

| Rank | Molecular formula | Matched expected isotopes | Missed expected isotopes | Final score fs | PSD = Subscore $s_{1,\ shift}$ | MS coverage score $S_2$ |
|---|---|---|---|---|---|---|
| →1 | C9 H10 Cl N5 O2 | 6 | 0 | 91.47 | 77.28 | 92.26 |
| 2 | C9 H18 Cl N O S2 | 4 | 1 | 88.79 | 48.33 | 91.04 |
| 3 | C7 H16 Cl F N3 P Si | 4 | 2 | 88.35 | 40.00 | 91.04 |
| 4 | C6 H12 Cl F2 N5 Si | 4 | 2 | 88.21 | 37.28 | 91.04 |
| 5 | C8 H18 Cl N O2 S Si | 4 | 3 | 87.93 | 31.94 | 91.04 |
| 6 | C3 H11 Cl N9 O P | 4 | 1 | 82.52 | 38.40 | 84.97 |
| 7 | C8 H10 N5 O3 P | 3 | 0 | 71.63 | 84.85 | 70.90 |
| 8 | C7 H6 F N7 O3 | 3 | 0 | 70.78 | 68.63 | 70.90 |
| 9 | C9 H9 F4 N O3 | 2 | 0 | 70.54 | 81.17 | 69.95 |
| 10 | C7 H16 F N3 P2 S | 3 | 1 | 69.57 | 45.62 | 70.90 |

The final score $fs_{M\_cand}$ of the candidate species of molecules $M_{cand}$ is calculated by the formula:

$$fs_{M\_cand} = \frac{0.05 * s_{1,shift,M\_cand} + 0.9 * s_{2,M\_cand}}{0.05 + 0.9}$$

In table 3 it is shown, the species of molecules M2 has the highest final score and that the species of molecules M1 and M3 have only the ranks 9 and 7. By using the second method of comparison which is taking into account all peaks of the measured mass spectrum $I_{meas\_1}(m/z)$ which are not identified in the identification mass spectra $I_{id,M\_cand}(m/z)$ of a candidate species of molecules $M_{cand}$ now the species of molecules M2 has been identified to have the most likely elemental composition from which the isotope distribution comprising the peak of interest $C_{int}$ is originated. Only by the use of the second method of comparison it is possible to realize that a lot of measured peaks in the measured mass spectrum $I_{meas\_1}(m/z)$ have not been identified by the identification mass spectra $I_{id,M\_cand}(m/z)$ of species of molecules M2 and M3. Only the appropriate combination of different scores and an appropriate formula of to calculate the final score improves the identification of the most likely formula of a species of molecules from its isotope distribution measured by a mass spectrometer.

This identified elemental composition as the most likely elemental composition of a molecule contained in the sample can be stored and displayed for further use. In this example it is shown that the inventive method alone is able to identify the correct elemental composition of the species of molecules Imidachloprid having the molecular formula $C_9H_{10}ClN_5O_2$ contained in the investigated sample.

In the second measurement example a Sulfentrazone sample is investigated. The species of molecules Sulfentrazone has the molecular formula $C_{11}H_{10}Cl_2F_2N_4O_3S$. The sample is introduced after infusion into a Q Exactive® Orbitrap® mass spectrometer and ionized by electrospray ionisation before measuring a mass spectrum.

Figure 4:
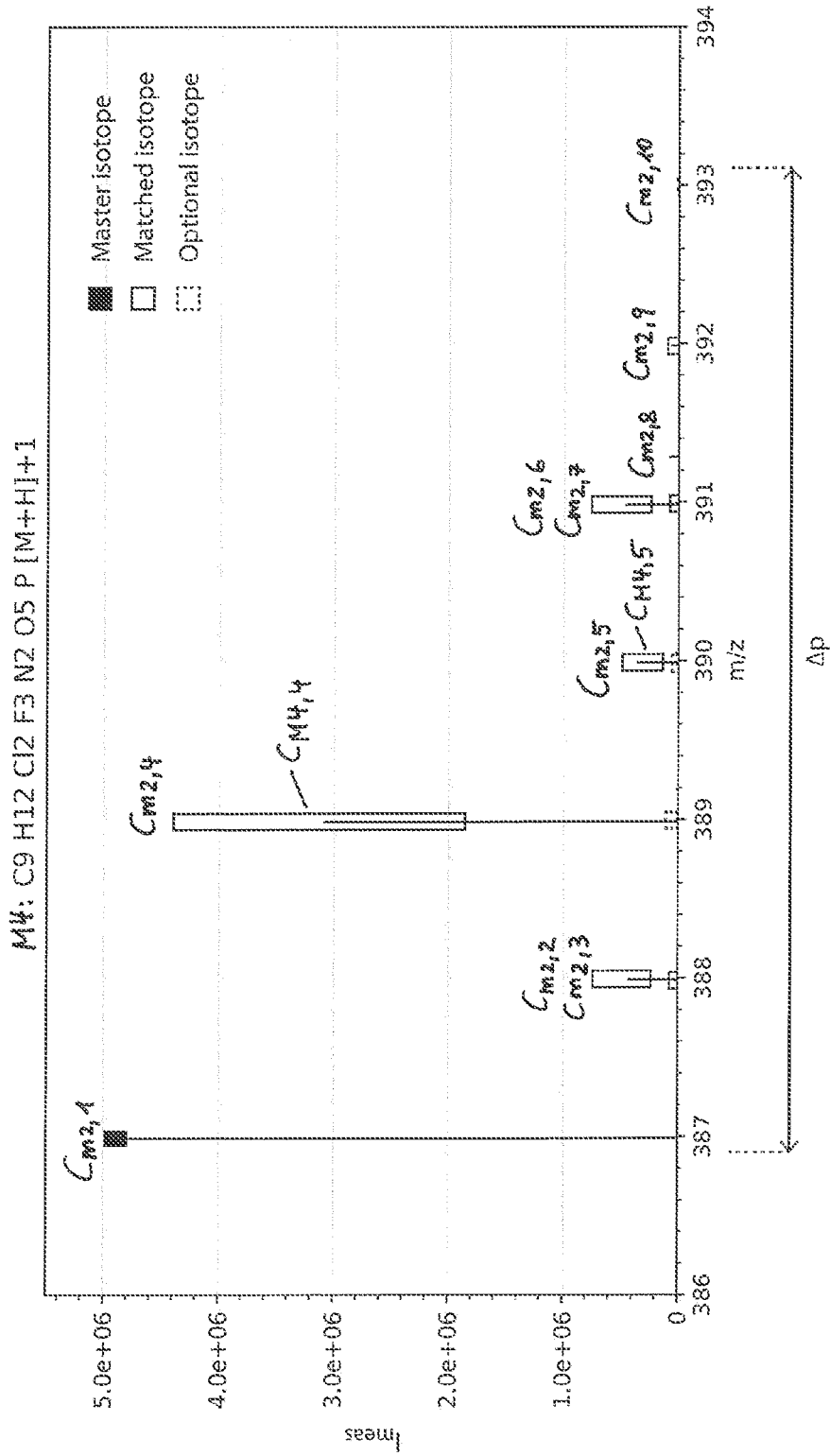
FIG. 4 shows a measured mass spectrum $I_{meas\_2}(m/z)$ and the comparison of the measured mass spectrum $I_{meas\_2}(m/z)$ with a theoretical mass spectrum $I_{th,M4}(m/z)$ of a fourth candidate species M4 with two different methods.
Figure 5:
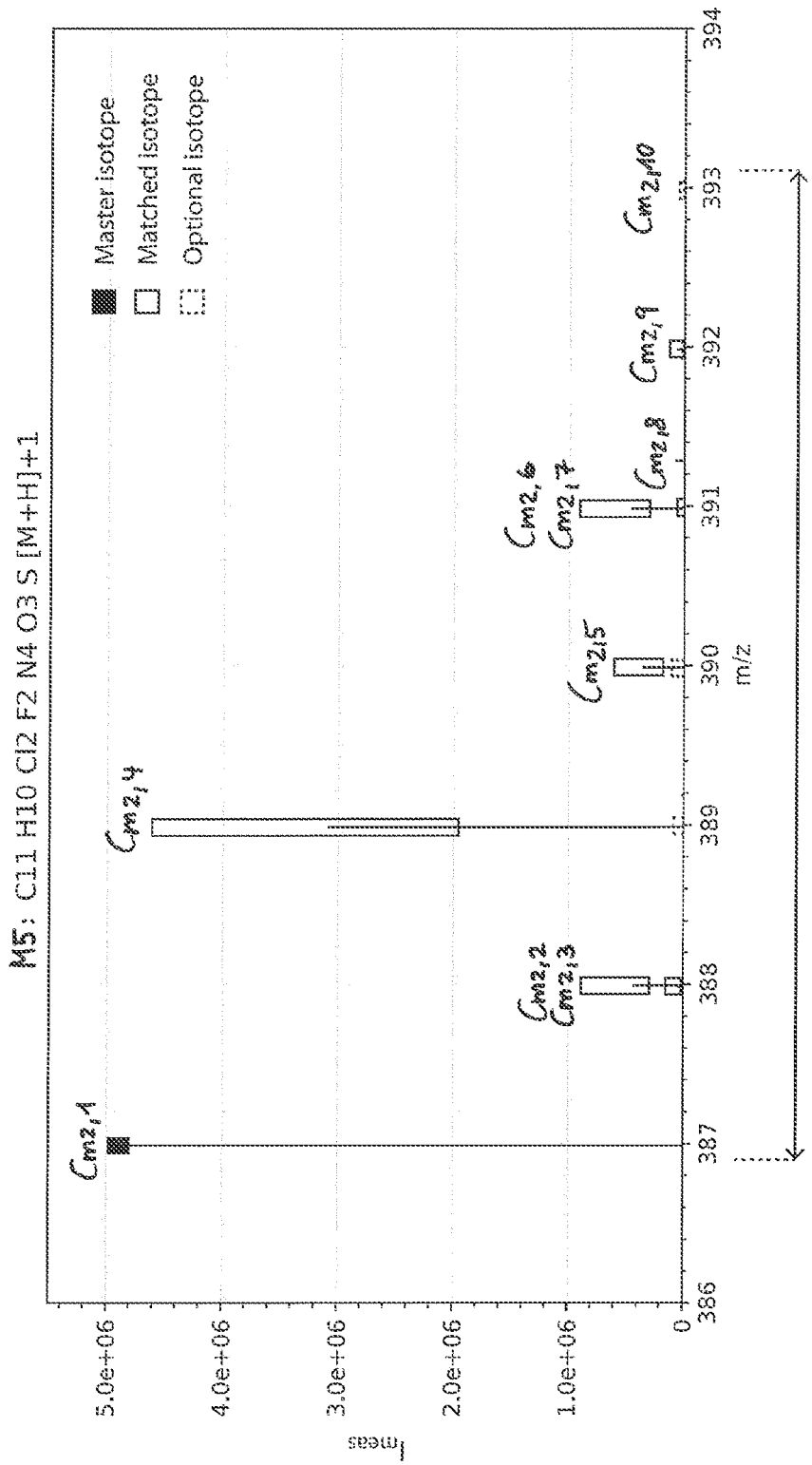
FIG. 5 shows the measured mass spectrum $I_{meas\_2}(m/z)$ also shown in FIG. 4 and the comparison of the measured mass spectrum $I_{meas\_2}(m/z)$ with a theoretical mass spectrum $I_{th,M5}(m/z)$ of a fifth candidate species M5 with two different methods.

A portion of the measured mass spectrum $I_{meas\_2}(m/z)$ is shown in the FIGS. 4 and 5. In a range of mass to charge ratio range $\Delta p$ defined below 10 peaks are identified, the peaks $C_{m2,1}, C_{m2,2} \ldots C_{m2,10}$.

If now the inventive method of the third example is applied to identify species of molecules M, at first a peak of interest $C_{int}$ has to be identified for which the elemental composition of the corresponding molecule $M_{int}$ has to be identified. In this example the peak of interest $C_{int}$ is the like mostly the highest peak of an expected isotope distribution, the measured peak $C_{m2,1}$. The set $S_{inv}$ of investigated species $M_{inv}$ is to limited by same criteria as described above when applying the inventive method of the third example: the used criteria are:

The molecule may contain only the elements: H, C, N, O, S, P, Cl, Br, F, Si, I

The minimum number of atoms contained in the molecule for all of these elements is 0.

Maximum number $Max_H$ of H atoms: 180
Maximum number $Max_C$ of C atoms: 80
Maximum number $Max_N$ of N atoms: 30
Maximum number $Max_O$ of O atoms: 30
Maximum number $Max_S$ of S atoms: 5
Maximum number $Max_P$ of P atoms: 2
Maximum number $Max_{Cl}$ of Cl atoms: 4
Maximum number $Max_{Br}$ of Br atoms: 3
Maximum number $Max_I$ of I atoms: 1
Maximum number $Max_F$ of F atoms: 10

Maximum number $Max_{Si}$ of Si atoms: 1
Minimum value of the R/C ratio: 0.1
Maximum value of the R/C ratio: 4.0
Minimum value of RDBE: 0
Maximum value of RDBE: 40

To determine the set $S_{cand}$ of candidate species of molecules $M_{cand}$ form the set $S_{inv}$ in step (ii) to the peak of interest $C_{m2,1}$ is assigned a mass to charge ratio range $\Delta m/z_{tol}$ which is correlated with a mass to charge tolerance of 5 ppm That means that every candidate species of molecules $M_{cand}$ has to have an expected peak $C_{ex,inv}$ within a mass to charge range tolerance of 5 ppm related to the mass to charge ratio value $m/z_{m2,1}$ of the peak of interest $C_{m2,1}$. Because the mass to charge ratio value $m/z_{m1,1}$ is roughly 387 u, the mass to charge ratio range $\Delta m/z_{tol}$ has a value of 0.00387 u and because this range is symmetric every candidate species of molecules has to have a peak whose mass to charge ratio should not differ from that of the peak of interest $C_{m2,1}$ more than 0.001935 u.

For the identified candidate species of molecules $M_{cand}$ a theoretical mass spectrum is calculated as identification mass spectrum $I_{id,M\_cand}(m/z)$ and from the identification mass spectrum $I_{id,M\_cand}$ of all candidate species $M_{cand}$ of mass to charge ratio range $\Delta m/z$ is determined comprising all peaks $C_{id,M\_cand,i}$ of the identification mass spectrum $I_{id,M\_cand}$ of all candidate species $M_{cand}$.

Then in step (iv) these identification mass spectra $I_{id,M\_cand}$ are compared with the measured mass spectrum $I_{meas\_2}(m/z)$ in this mass to charge ratio range $\Delta m/z$. The first method to compare both spectra of the method to calculate a pattern spectral distance described in the U.S. Pat. No. 8,831,888 B2 as subscore $S_{1,M\_cand}$. The method is applied by allowing an mass to charge ratio error of 5 ppm of the expected peaks of the identification mass spectra $I_{id,M\_cand}$ and an intensity error of 30% of the expected peak of the identification mass spectra $I_{id,M\_cand}$. The pattern spectral distance (PSD) is based on the assumption to identify the expected peaks of identification mass spectra $I_{id,M\_cand}$. Therefore a penalty value for the spectral distance (SD) of a non-identified expected peak of the identification mass spectra $I_{id,M\_cand}(m/z)$ is given, which is defined to by 1. Due to this penalty for expected peaks of the identification mass spectra $I_{id,M\_cand}(m/z)$ the method of the pattern spectral distance here is addressing to missing peaks in the identification mass spectra $I_{id,M\_cand}$ not identified in the measured spectrum mass spectrum $I_{meas\_2}(m/z)$ The results of the comparison with the method of the pattern spectral distance are shown in the FIGS. 4 to 5 for the candidate molecules $M_{cand}$:

FIG. 4 M4: $C_9H_{12}Cl_2F_3N_2O_5P$
FIG. 5 M2: $C_{11}H_{10}Cl_2F_2N_4O_3S$

For each expected peak of the identification mass spectra $I_{id,M\_cand}$ of these molecules there is given a rectangle identification box by the allowed mass to charge ratio error of 5 ppm of the expected peaks (x direction, no appropriate dimension used for clarity) and the intensity error of 30% of the expected peaks (y direction). In FIG. 4 for the expected peaks $C_{M4,4}$ and $C_{M4,5}$ of the molecule M4 the rectangle identification boxes are labelled. If no measured peak is lying in an rectangle identification box of expected peak, the expected peak is missing and penalized in calculating the score $s_{1,M4}$. Only expected peaks which have an intensity of below a threshold of 3 times of the S/N ratio of the measured mass spectrum $I_{meas\_2}(m/z)$ are not penalized if they are missing.

In table 4 is shown the calculated results for the candidate species $M_{cand}$ having the highest PSD values as subscore $s_{1,M\_cand}$.

TABLE 4

| Rank | Molecular formula | Matched expected isotopes | Missed expected isotopes | Final score $s_1$ | PSD = subscore $s_1$ |
|---|---|---|---|---|---|
| 1 | C9 H12 Cl2 F3 N2 O5 P | 8 | 0 | 82.99 | 82.99 |
| 2 | C9 H7 F7 N2 O3 P2 | 3 | 0 | 79.00 | 79.00 |
| 3 | C12 H17 Cl2 I N2 | 8 | 0 | 78.78 | 78.78 |
| 4 | C8 H4 F6 N2 O9 | 3 | 0 | 77.88 | 77.88 |
| 5 | C8 H3 F8 N4 O3 P | 3 | 0 | 75.84 | 75.84 |
| 6 | C7 H18 F I N2 O3 P2 | 3 | 0 | 74.81 | 74.81 |
| 7 | C10 H16 Cl2 F2 O5 P2 | 7 | 0 | 73.72 | 73.72 |
| 8 | C10 H17 I N2 O2 P2 | 3 | 0 | 73.21 | 73.21 |
| 9 | C14 H6 Cl2 F6 N2 | 8 | 0 | 71.12 | 71.12 |
| → 10 | C11 H10 Cl2 F2 N4 O3 S | 8 | 0 | 68.95 | 68.95 |

Molecule M4 has rank 1 and molecule M5 has rank 10.

In the FIGS. 4 and 5 is shown at first the master isotope, which has to fit the peak of interest $C_{m2,1}$. The expected intensity of master isotope is set to be the same as the intensity of the peak of interest $C_{m2,1}$ to normalize the intensity of the measured mass spectrum $I_{meas\_2}(m/z)$ and the intensity of identification mass spectra $I_{id,M\_cand}(m/z)$. Further it is shown which measured peaks $C_{m2,i}$ match with an expected peak $C_{MX,j}$ of the identification mass spectra $I_{id,MX}$ of the molecule MX (X=4,5) and its rectangle identification box. When a measured peaks $C_{m2,i}$ match with an expected peak $C_{MX,j}$ then the rectangle identification box is shown with a continuous line showing that an theoretical expected isotope is matched by the measured mass spectrum. When the expected intensity of an expected peak $C_{MX,j}$ is below the threshold of 3 times of the S/N ratio the minimum allowed expected intensity of an expected peak $C_{MX,j}$ is extended to 0. If no measured peaks $C_{m2,i}$ matches with such an expected peak $C_{MX,j}$ by lying in the rectangle identification box, then the rectangle identification box is shown with a dotted line showing that there is an optional expected peak $C_{MX,j}$ which is not matched but also not penalized due to the small value of the expected intensity of an expected peak $C_{MX,j}$.

It can be seen in the FIGS. 4 and 5, that for both molecules M4 and M5 the measured peaks $C_{m2,i}$ match with all expected peak $C_{MX,j}$ of the identification mass spectra $I_{id,MX}$ of the molecule MX (X=1,2,3) and its rectangle identification box, which otherwise would be penalized. There are only optional expected peak $C_{MX,j}$ which are not matched. The number of matched measured peaks $C_{m2,J}$ is for both species of molecules M4 and M5 the same. 8 peaks $C_{m2,1}$, $C_{m2,2}$, $C_{m2,3}$, $C_{m2,4}$, $C_{m,5}$, $C_{m2,6}$, $C_{m2,7}$ and $C_{m2,9}$ of the measured mass spectrum $I_{meas\_2}(m/z)$ match the expected peak $C_{M4,j}$ of the identification mass spectra $I_{id,M4}(m/z)$ of the molecule M4. 8 peaks $C_{m2,1}$, $C_{m2,2}$, $C_{m2,3}$, $C_{m2,4}$, $C_{m,5}$, $C_{m2,6}$, $C_{m2,7}$ and $C_{m2,9}$ of the measured mass spectrum $I_{meas\_2}(m/z)$ match the expected peak $C_{M5,j}$ of the identification mass spectra $I(m/z)_{id,M5}$ of the molecule M5.

Then in step (iii) of the third example of the inventive method the identification mass spectra $I_{id,M\_cand}(m/z)$ are compared with the measured mass spectrum $I_{meas\_2}(m/z)$ with a second method, which is addressing all those measured peaks $C_{m2,i}$, which are not identified in the identification mass spectra $I_{id,M\_cand}$.

The method is using an measured mass spectrum coverage score $s_{2,M\_cand}$ as already described in the first measurement example before. There score is given by the ratio, how much of the intensity of the measured peaks $C_{m2,i}$ in the mass to charge ratio range $\Delta m/z$ is identified by an identification mass spectra $I_{id,M\_cand}(m/z)$. This is done by assigning to each measured peak $C_{m2,i}$ its centroid intensity $I_{m2,i}$.

In this third example of the inventive method it is already defined by the first method to compare the identification mass spectra $I_{id,M\_cand}(m/z)$ with the measured mass spectrum $I_{meas\_2}(m/z)$, which measured peaks $C_{m2,i}$ in the mass to charge ratio range $\Delta m/z$ are identified by an identification mass spectra $I_{id,M\_cand}(m/z)$.

In table 5 is shown the calculated results for the candidate species $M_{cand}$ having the highest final score $fs_{M\_cand}$ calculated from PSD values as subscore $S_{1,M\_cand}$ and the measured mass spectrum coverage (MS coverage) score $s_{2,M\_cand}$.

more likely elemental composition. A third subscore $s_{3,M\_cand}$ is determined for each candidate species of molecules $M_{cand}$ by a further fragmentation experiment. The ions having the mass to charge ratio of the peak of interest $C_{int}$ are isolated and fragmented by a known fragmentation process in the fragmentation experiment of then the mass spectrum ($MS^2$ spectrum) of the fragments is detected.

Figure 6:
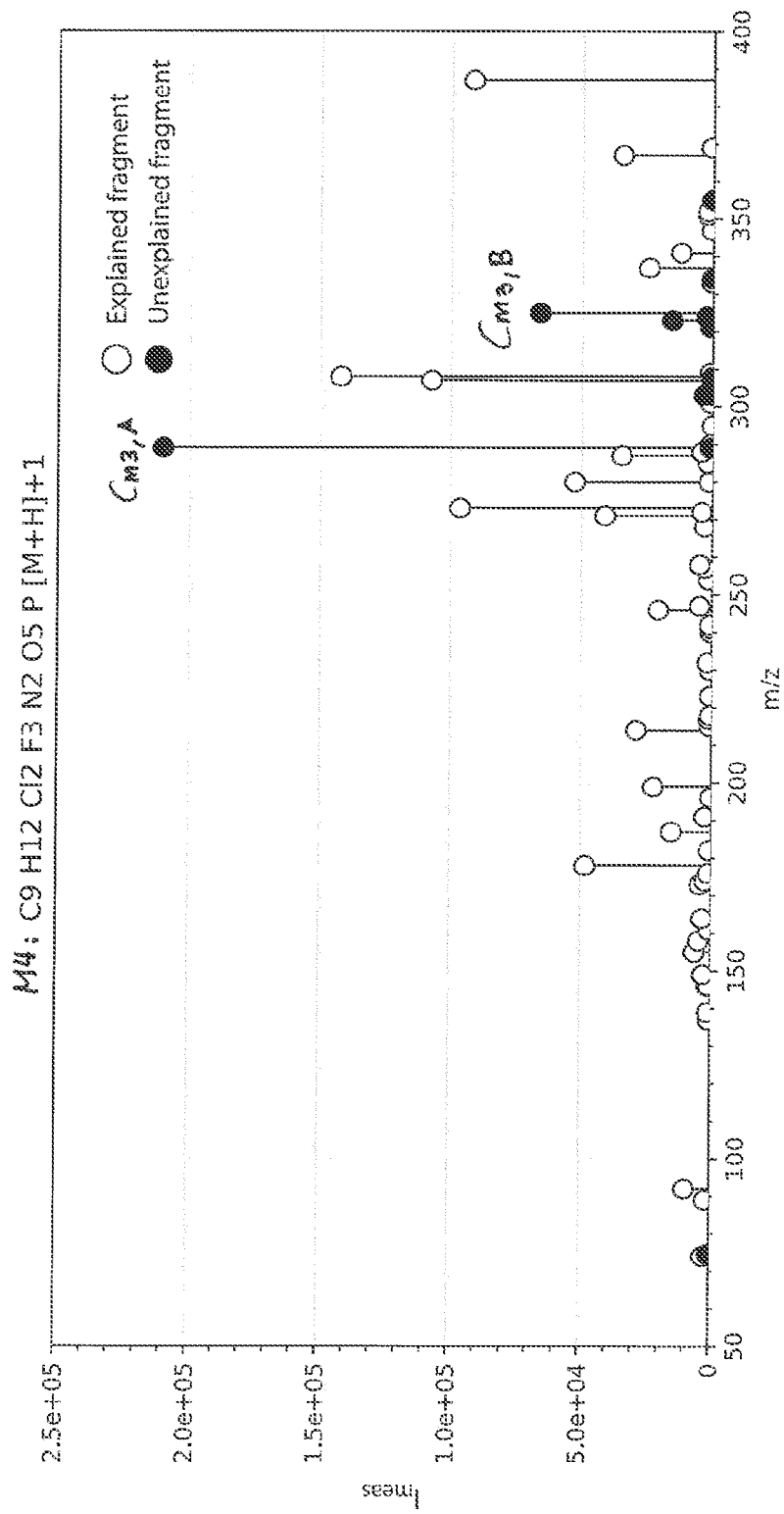
FIG. 6 shows a measured mass spectrum $I_{meas\_3}(m/z)$ of the fragments of a molecule measured with the mass spectrum $I_{meas\_2}(m/z)$ and the comparison of the measured mass spectrum $I_{meas\_3}(m/z)$ with an expected mass spectrum $I_{th,M4}(m/z)$ of the fragments of the fourth candidate species M4.
Figure 7:
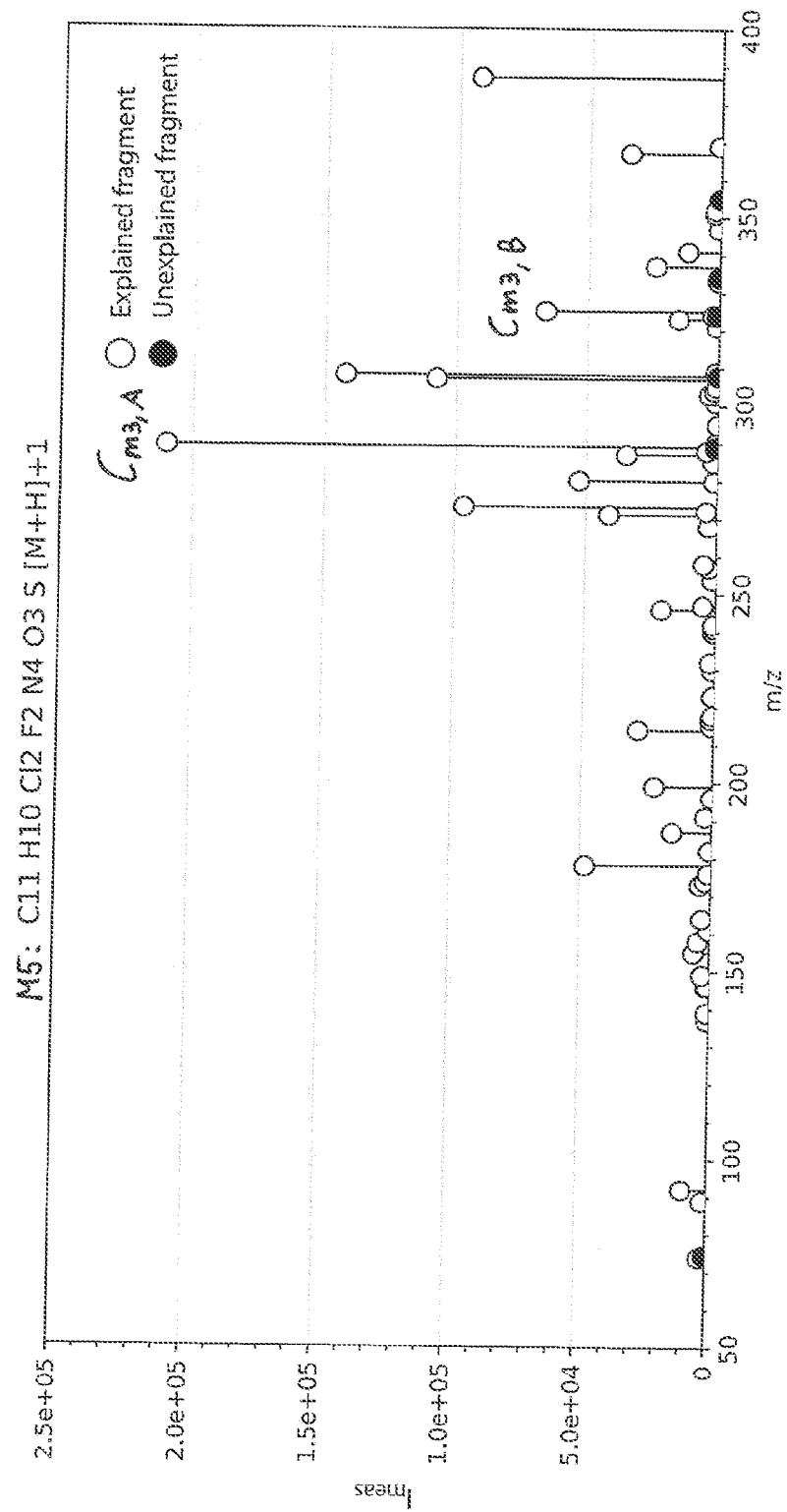
FIG. 7 shows a measured mass spectrum $I_{meas\_3}(m/z)$ of the fragments of a molecule measured with the mass spectrum $I_{meas\_2}(m/z)$ also shown in FIG. 6 and the comparison of the measured mass spectrum $I_{meas\_3}(m/z)$ with an expected mass spectrum $I_{th,M5}(m/z)$ of the fragments of the fifth candidate species M5.

In the FIGS. 6 and 7 the measured $MS^2$ spectrum of the ions $I_{meas\_3}(m/z)$ having the mass to charge ratio of the peak of interest $C_{int}$ of the mass spectrum shown in the FIGS. 4 and 5 is shown.

Then the fragments shown in this measured $MS^2$ spectrum are compared with an $MS^2$ identification spectrum of each candidate species of molecules $M_{cand}$ resulting in the subscore $s_3$. This $MS^2$ identification spectrum of each candidate species of molecules $M_{cand}$ is given due to the theoretical knowledge about the fragmentation during the used fragmentation process.

The method is using an measured $MS^2$ spectrum coverage score $S_{3,M\_cand}$ which is the same as the measured mass spectrum coverage score, but now applied to the $MS^2$ spectrum. There score is given by the ratio, how much of the intensity of the measured peaks $C_{m3,i}$ in the mass to charge ratio range $\Delta m/z$ is identified by an identification mass spectra $I_{id,M\_cand}(m/z)$. This is done by assigning to each measured peak $C_{m3,i}$ its centroid intensity $I_{m3,i}$.

For the $MS^2$ mass spectrum $I_{meas\_3}(m/z)$ shown in the FIGS. 4 and 5 a lot of the peaks of fragments are shown. If

TABLE 5

| Rank | Molecular formula | Matched expected isotopes | Missed expected isotopes | Final score fs | PSD = Subscore $s_1$ | MS coverage score $S_2$ |
|---|---|---|---|---|---|---|
| 1 | C9 H12 Cl2 F3 N2 O5 P | 8 | 0 | 97.74 | 82.99 | 98.56 |
| 2 | C12 H17 Cl2 I N2 | 8 | 0 | 97.54 | 78.78 | 98.58 |
| 3 | C14 H6 Cl2 F6 N2 | 8 | 0 | 97.13 | 71.12 | 98.58 |
| →4 | C11 H10 Cl2 F2 N4 O3 S | 8 | 0 | 97.02 | 68.95 | 98.58 |
| 5 | C8 H8 Cl2 F4 N4 O5 | 8 | 0 | 96.96 | 68.20 | 98.56 |
| 6 | C13 H7 Cl2 F2 N6 P | 8 | 0 | 96.90 | 66.57 | 98.58 |
| 7 | C10 H16 Cl2 F2 O5 P2 | 7 | 0 | 96.89 | 73.72 | 98.18 |
| 8 | C13 H8 Cl2 N4 O6 | 8 | 0 | 96.62 | 61.41 | 98.58 |
| 9 | C9 H12 Cl2 F4 N4 S2 | 8 | 0 | 96.58 | 60.61 | 98.58 |
| 10 | C14 H11 Cl2 F N4 P2 | 8 | 0 | 96.55 | 59.92 | 98.58 |

The final score $fs_{M\_cand}$ of the candidate species of molecules $M_{cand}$ is calculated by the formula:

$$fs_{M\_cand} = \frac{0.05 * s_{1,shift,M_{cand}} + 0.9 * s_{2,M\_cand}}{0.05 + 0.9}$$

In table 5 it is shown, the species of molecules M4 has the highest final score and that the species of molecules M5 has only the rank 4. The final score values $fs_{M4}$ and $fs_{M5}$ have only a small difference.

Therefore an option of the inventive method is used to distinguish which of both molecules M4 and M5 has the now only a subset $C_{m3,a}$ of these peaks $C_{m3,i}$ is identified by an $MS^2$ identification mass spectrum $I_{id\_MS2,M\_cand}$ of an candidate species $M_{cand}$, at first the centroid intensities of these subset is summed up and then divided by the summed up centroid intensities $I_{m3,i}$ of all peaks $C_{m3,i}$ identified in the measured $MS^2$ mass spectrum $I_{meas\_3}(m/z)$.

In table 6 is shown the calculated results for the candidate species $M_{cand}$ having the highest final score $fs_{M\_cand}$ calculated from PSD values as subscore $S_{1,M\_cand}$, the measured mass spectrum coverage (MS coverage) score $s_{2,M\_cand}$ and the measured $MS^2$ spectrum coverage score $s_{3,M\_cand}$.

TABLE 6

| Rank | Molecular formula | Matched expected isotopes | Missed expected Isotopes | Final score fs | PSD = Subscore $s_1$ | MS coverage score $S_2$ | MS² coverage score $S_3$ |
|---|---|---|---|---|---|---|---|
| →1 | C11 H10 Cl2 F2 N4 O3 S | 8 | 0 | 97.93 | 68.95 | 98.58 | 99.66 |
| 2 | C12 H11 Cl2 F2 N2 O4 P | 8 | 0 | 97.19 | 52.32 | 98.56 | 99.21 |
| 3 | C11 H14 Cl2 F N2 O4 P Si | 7 | 0 | 96.99 | 61.99 | 98.16 | 98.39 |
| 4 | C10 H10 Cl2 F2 N4 O4 Si | 7 | 2 | 96.83 | 48.30 | 98.16 | 99.27 |
| 5 | C9 H17 Cl F2 N2 O2 S4 | 7 | 0 | 96.63 | 39.26 | 98.18 | 99.59 |
| 6 | C14 H9 Cl2 F N4 O2 S | 8 | 0 | 96.46 | 55.91 | 98.58 | 96.70 |
| 7 | C9 H16 Cl2 F3 N2 O P S Si | 7 | 2 | 96.44 | 46.90 | 98.16 | 98.31 |
| 8 | C10 H13 Cl2 F4 N2 O P S | 7 | 0 | 96.40 | 44.83 | 98.16 | 98.39 |
| 9 | C13 H9 Cl2 F N4 O3 Si | 7 | 0 | 96.03 | 54.17 | 98.16 | 96.39 |
| 10 | C12 H14 Cl2 F N2 O3 P S | 7 | 0 | 95.96 | 57.83 | 98.18 | 95.77 |

The final score $fs_{M\_cand}$ of the candidate species of molecules $M_{cand}$ is calculated by the formula:

$$fs_{M\_cand}=0.05*s_{1,M\_cand}+0.9*s_{2,M\_cand}+0.05*s_{3,M\_cand} \quad (20)$$

In table 6 it is shown, the species of molecules M4 is not ranked in the highest final scores and that the species of molecules M5 has now the rank 1. Due to the MS² spectrum coverage score $s_{3,M\_cand}$ there is now a big different in the final scores of both molecules. The explanation for this is, that the MS² identification mass spectrum $I_{id\_MS2,M4}$ of the species of molecules M4 does not fit with the measured MS² mass spectrum $I_{meas\_3}(m/z)$. In the FIGS. 4 and 5 it is shown which fragments of the measured MS² mass spectrum $I_{meas\_3}(m/z)$ can be explained by the MS² identification mass spectra $I_{id\_MS2,M5}$ and $I_{id\_MS2,M4}$. For the species of molecules M4 the important measured peaks $C_{m3,A}$ and $C_{m3,B}$ of high intensity are not explained, which is resulting in a lower measured MS² spectrum coverage score $s_{3,M4}$. For the species of molecules M4 the important measured peaks $C_{m3,A}$ and $C_{m3,B}$ of high intensity are explained resulting in a high measured MS² spectrum coverage score $s_{3,M5}$ and accordingly the highest final score $fs_{M5}$.

This identified elemental composition as the most likely elemental composition of a molecule contained in the sample can be stored and displayed for further use. In this example it is shown that the inventive method alone using the option to take into account a further score from a measured MS² mass spectrum is able to identify the correct elemental composition of the species of molecules Sulfentrazone having molecular formula $C_{11}H_{10}Cl_2F_2N_4O_3S$.

By repeating the procedure of the steps of the inventive method one or more most likely elemental composition of several species of molecules M can be identified when the identification is done in every repetition for another peak of interest $C_{int}$.

The inventive method is preferably executed by at least one processor of a controlling system, preferentially of the mass spectrometer used to measure the mass spectrum $I_{meas}(p)$, a local computer or a computer in a computer network or processors in a cloud system.

To the content of this description of the invention belong also all embodiments which are combinations of the before mentioned embodiments of the invention. So all embodiments are encompassed which comprise a combinations of features described just for single embodiments before.

We claim:

1. A method of identification of one or more most likely elemental compositions of at least one species of molecules M contained in a sample and/or originated from a sample by at least one ionization process comprising the following steps:

(i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;

(ii) determining for a peak of interest $C_{int}$ of the measured mass spectrum $I_{meas}(p)$ or neutral mass spectrum $I_{neut}(p)$ a set $S_{cand}$ of candidate species of molecules $M_{cand}$ that is defined according to an expectation regarding which kind of species of molecules can be present in the sample from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;

(iii) determining for each candidate species $M_{cand}$ of the set $S_{cand}$ of candidate species of molecules $M_{cand}$ an identification mass spectrum $I_{id,M\_cand}(p)$ showing at least a part of an isotope distribution of the molecule $M_{cand}$ corresponding to the measured mass spectrum $I_{meas}(p)$ or the neutral mass spectrum $I_{neut}(p)$ and determining a range of peak positions $\Delta p$ comprising the peak positions $P_{id,M\_cand,i}$ of all peaks $C_{id,M\_cand,i}$ of the identification mass spectrum $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;

(iv) comparing the measured mass spectrum $I_{meas}(p)$ or the neutral mass spectrum $I_{neut}(p)$ with each identification mass spectrum $I_{id,M\_cand}(p)$ of the candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$ and calculating for each candidate species $M_{cand}$ of the set $S_{cand}$ of candidate species of molecules $M_{cand}$ a final score $fs_{M\_cand}$ from the subscores $s_{i,M\_cand}$ or calculating for each candidate species $M_{cand}$ of the set $S_{cand}$ of candidate species of molecules $M_{cand}$ a final score $fs_{M\_cand}$ from the subscores $s_{i,M\_cand}$, for which one of both of the subscores of the first method and the second method $s_{1,M\_cand}$ and $s_{1,M\_cand}$ are higher than an assigned threshold value $s_{i,th,fs}$ for calculating the final score $fs_{M\_cand}$;

(v) determining one or more calculated final scores $fs_{high,k}$ having the highest values; and (vi) determining the elemental composition of the candidate species $M_{cand,high\_k}$ of the set $S_{cand}$ of candidate species of molecules $M_{cand}$ which have the one or more calculated final scores $fs_{high,k}$ of the highest values by looking up the elemental composition of the candidate species $M_{cand,high\_k}$.

2. The method of claim 1 wherein in step (iv) by the first method to compare the measured mass spectrum $I_{meas}(p)$ or the neutral mass spectrum $I_{neut}(p)$ with each identification mass spectrum $I_{id,M\_cand}(p)$ of the candidate species $M_{cand}$ as subscore $s_{1,M\_cand}$ a pattern spectral distance is calculated.

3. The method of claim 2 wherein by the second method to compare the measured mass spectrum $I_{meas}(p)$ or the neutral mass spectrum $I_{neut}(p)$ with each identification mass spectrum $I_{id,M\_cand}(p)$ of the candidate species $M_{cand}$ as subscore $s_{2,M\_cand}$ a measured mass spectrum coverage subscore is calculated.

4. The method of claim 1 wherein in step (i) a mass spectrum $I_{meas}(p)$ of the sample is measured with a mass spectrometer, wherein in step (ii) for a peak of interest $C_{int}$ of the measured mass spectrum $I_{meas}(p)$ a set $S_{cand}$ of candidate species of molecules $M_{cand}$ that is defined according to the expectation regarding which kind of species of molecules can be present in the sample from a set $S_{inv}$ of species of molecules $M_{inv}$ is determined which have an expected $peak_{ex,inv}$ in a mass spectrum corresponding to the measured mass spectrum $I_{meas}(p)$ with a peak position $p_{ex,inv}$ within a peak position tolerance range $\Delta p_{tol}$ of the peak of interest $C_{int}$ in the measured mass spectrum $I_{meas}(p)$; wherein in step (iii) for each candidate species $M_{cand}$ of the set $S_{cand}$ of candidate species of molecules $M_{cand}$ a theoretical mass spectrum $I_{th,M\_cand}(p)$ showing at least a part of an isotope distribution of the molecule $M_{cand}$ corresponding to the measured mass spectrum $I_{meas}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the measured mass spectrum $I_{meas}(p)$ of all candidate species $M_{cand}$ of the set $S_{cand}$ of candidate species of molecules $M_{cand}$ is determined, and wherein in step (iv) the measured mass spectrum $I_{meas}(p)$ is compared with each theoretical mass spectrum $I_{th,M\_cand}(p)$ of the candidate species $M_{cand}$ of the set $S_{cand}$ of candidate species of molecules $M_{cand}$ corresponding to the measured mass spectrum $I_{meas}(p)$ in the determined range of peak positions $\Delta p$ with a first method, which is determining a first subscore $s_{1,M\_cand}$ for each candidate Species $M_{cand}$, and with a second method, which is determining a second subscore $s_{2,M\_cand}$ for each candidate Species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the measured mass spectrum $I_{meas}(p)$, and wherein the second subscore $s_2$ is addressing all peaks $C_{meas,i}$ in the measured mass spectrum $I_{meas}(p)$, which are not identified in the theoretical mass spectrum $I_{th,M\_cand}(p)$ of the candidate species $M_{cand}$.

5. The method of claim 4 wherein with the most likely elemental composition of at least one species of molecules M originated from the sample by at least one ionization process is identified and then the most likely elemental composition of a species of molecules $M_s$ contained in a sample is derived from the identified most likely elemental composition of each of the at least one species of molecules M originated from the sample by the at least one ionization process according to the at least one ionization process.

6. The method of claim 1 wherein in step (i) a mass spectrum $I_{meas}(p)$ of the sample is measured with a mass spectrometer and then the measured mass spectrum $I_{meas}(p)$ is reduced to a neutral mass spectrum $I_{neut}(p)$, wherein in step (ii) for a peak of interest $C_{int}$ of the neutral mass spectrum $I_{neut}(p)$ a set $S_{cand}$ of candidate species of molecules $M_{cand}$ that is defined according to the expectation regarding which kind of species of molecules can be present in the sample from a set $S_{inv}$ of species of molecules $M_{inv}$ is determined which have an expected $peak_{ex,inv}$ in a mass spectrum corresponding the neutral mass spectrum $I_{neut}(p)$, with a peak position $p_{ex,inv}$ within a peak position tolerance range $\Delta p_{tol}$ of the peak of interest $C_{int}$ in the neutral mass spectrum $I_{neut}(p)$, wherein in step (iii) for each candidate species $M_{cand}$ of the set $S_{cand}$ of candidate species of molecules $M_{cand}$ a complete theoretical mass spectrum $I_{th,M\_cand}(p)$ showing at least a part of an isotope distribution of the molecule $M_{cand}$ corresponding to the neutral mass spectrum $I_{neut}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the neutral mass spectrum $I_{neut}(p)$ of all candidate species $M_{cand}$ of the set $S_{cand}$ of candidate species of molecules $M_{cand}$ is determined and wherein in step (iv) the neutral mass spectrum $I_{neut}(p)$ is compared with each theoretical mass spectrum $I_{th,M\_cand}(p)$ of the candidate species $M_{cand}$ of the set $S_{cand}$ of candidate species of molecules $M_{cand}$ corresponding to the neutral mass spectrum $I_{neut}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the neutral mass spectrum $I_{neut}(p)$, and wherein the second subscore $s_2$ is addressing all peaks $C_{neut,I}$ in the neutral mass spectrum $I_{neut}(p)$, which are not identified in the theoretical mass spectrum $I_{th,M\_cand}(p)$ of the candidate species $M_{cand}$.

7. The method of claim 1 wherein in step (i) a mass spectrum $I_{meas}(p)$ of the sample is measured with a mass spectrometer, wherein in step (ii) for a peak of interest $C_{int}$ of the measured mass spectrum $I_{meas}(p)$ a set $S_{cand}$ of candidate species of molecules $M_{cand}$ from a set $S_{inv}$ of species of molecules $M_{inv}$ is determined which have an expected $peak_{th,int}$ in a mass spectrum corresponding to a neutral mass spectrum $I_{neut}(p)$ derived by reduction of the measured mass spectrum $I_{meas}(p)$ with a peak position $p_{ex,inv}$ within a peak position tolerance range $\Delta p_{tol}$ assigned to the peak of interest $A_{int}$ in the neutral mass spectrum $I_{neut}(p)$ derived by reduction of the measured mass spectrum $I_{meas}(p)$, wherein in step (iii) for each candidate species $M_{cand}$ of the set $S_{cand}$ of candidate species of molecules $M_{cand}$ a complete theoretical mass spectrum $I_{th,M\_cand}(p)$ corresponding the measured mass spectrum $I_{meas}(p)$ is calculated and a range of peak positions $\Delta p$ comprising the peak positions $p_{th,i}$ of all peaks $C_{th,M\_cand,i}$ of the complete theoretical mass spectra $I_{th,M\_cand}(p)$ corresponding to the measured mass spectrum $I_{meas}(p)$ of all candidate species $M_{cand}$ of the set $S_{cand}$ of candidate species of molecules $M_{cand}$ is determined and wherein in step (iv) the measured mass spectrum $I_{meas}(p)$ is compared with each theoretical mass spectrum $I_{th,M\_cand}(p)$ of the candidate species $M_{cand}$ of the set $S_{cand}$ of candidate species of molecules $M_{cand}$ corresponding to the measured mass spectrum $I_{meas}(p)$ in the determined range of peak positions $\Delta p$ with a first method, which is determining a first subscore $s_{1,M\_cand}$ for each candidate species $M_{cand}$, and with a second method, which is determining a second subscore $s_{2,M\_cand}$ for each candidate species $M_{cand}$, wherein the first subscore $s_1$ is addressing all peaks $C_{th,M\_cand,i}$ in the theoretical mass spectrum $I_{th,M\_cand}(p)$ of the candidate species $M_{cand}$, which are not identified in the measured mass spectrum $I_{meas}(p)$, and wherein the second subscore $s_2$ is addressing all peaks $C_{meas,i}$ in the measured mass spectrum $I_{meas}(p)$, which are not identified in the theoretical mass spectrum $I_{th,M\_cand}(p)$ of the candidate species $M_{cand}$.

8. The method of claim 7 wherein in step (ii) the position $P_{meas,int}$ of the peak of interest $C_{int}$ of the measured mass spectrum is reduced to its position $p_{neutral,int}$ in the neutral mass spectrum $I_{neut}(p)$ derived by reduction of the measured mass spectrum $I_{meas}(p)$ and the mass spectrum of candidate species of molecules $M_{cand}$ has an expected peak $C_{ex,inv}$ with a peak position $p_{ex,inv}$ within a peak position tolerance range $\Delta p_{tol}$ of the position $p_{neutral,int}$ of the peak of interest $C_{int}$ in the neutral mass spectrum $I_{neut}(p)$.

9. The method of claim 8 wherein before the measurement of the mass spectrum $I_{meas}(p)$ in step (i) the sample is ionized by at least one ionization process and in step (iii) for each candidate species $M_{cand}$ is determined an assigned ion $I_{cand}$ which is originated by at least one ionization process of the sample before the measurement of the mass spectrum $I_{meas}(p)$ and based on this assigned ions $I_{cand}$ for each candidate species $M_{cand}$ the complete theoretical mass spectrum $I_{th,M\_cand}(p)$ corresponding the measured mass spectrum $I_{meas}(p)$ is calculated.

10. The method of claim 1 wherein in step (iv) a dynamic recalibration is used shifting the measured mass spectrum $I_{meas}(p)$ or the neutral mass spectrum $I_{neut}(p)$ for each candidate molecule $M_{cand}$ by the difference $\Delta p_{recal}$ of the peak positions of expected peaks and the measured peaks of peaks of the neutral mass spectrum before a subscore $s_i$ calculated.

11. The method of claim 1 wherein in step (iv) a third score that is a MS$^2$ spectrum coverage subscore $s_{3,M\_cand}$ is determined and used to calculate the final score $fs_{M\_cand}$ from a summation of linear functions of the subscores $s_{i,M\_cand}$.

12. A method of identification of one or more most likely elemental compositions of at least one species of molecules M contained in a sample and/or originated from a sample by at least one ionization process comprising the following steps:
(i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;
(ii) determining for a peak of interest $C_{int}$ of the measured mass spectrum $I_{meas}(p)$ or neutral mass spectrum $I_{neut}(p)$ a set $S_{cand}$ of candidate species of molecules $M_{cand}$ that is defined according to an expectation regarding which kind of species of molecules can be present in the sample from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;
(iii) determining for each candidate species $M_{cand}$ of the set $S_{cand}$ of candidate species of molecules $M_{cand}$ an identification mass spectrum $I_{id,M\_cand}(p)$ showing at least a part of an isotope distribution of the molecule $M_{cand}$ corresponding to the measured mass spectrum $I_{meas}(p)$ or the neutral mass spectrum $I_{neut}(p)$ and determining a range of peak positions $\Delta p$ comprising the peak positions $p_{id,M\_cand,i}$ of all peaks $C_{id,M\_cand,i}$ of the identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;
(iv) comparing the measured mass spectrum $I_{meas}(p)$ or the neutral mass spectrum $I_{neut}(p)$ with the identification mass spectrum $I_{id,M\_cand}(p)$ of candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for the candidate species $M_{cand}$, and with a second method, which is determining a second subscore $s_{2,M\_cand}$ for the candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$ and wherein at first the comparison is done for each candidate species $M_{cand}$ only with one method of the first method and the second method and only for candidate species $M_{cand}$ whose subscore $M_{i,M\_cand}$ has a subscore within a specific number of subscores having the highest values, the comparison with the other method is done and calculating for each candidate species $M_{cand}$ of the set $S_{cand}$ of candidate species of molecules $M_{cand}$ a final score $fs_{M\_cand}$ from the subscores $S_{i,M\_cand}$, for which both subscores of the first method and the second method $s_{1,M\_cand}$ and $s_{1,M\_cand}$ have been calculated or for which both subscores of the first method and the second method $s_{1,M\_cand}$ and $s_{1,M\_cand}$ have been calculated and one of both of the subscores of the first method and the second method $s_{1,M\_cand}$ and $s_{1,M\_cand}$ are higher than an assigned threshold value $s_{i,th,fs}$ for calculating the final score $fs_{M\_cand}$;
(v) determining one or more calculated final scores $fs_{high,\,k}$ having the highest values; and
(vi) determining the elemental composition of the candidate species $M_{cand,high\_k}$ of the set $S_{cand}$ of candidate species of molecules $M_{cand}$ which have the one or more calculated final scores $fs_{high,\,k}$ of the highest values by looking up the elemental composition of the candidate species $M_{cand,high\ k}$.

13. A method of identification of one or more most likely elemental compositions of at least one species of molecules M contained in a sample and/or originated from a sample by at least one ionization process comprising the following steps:
- (i) measuring a mass spectrum $I_{meas}(p)$ of the sample with a mass spectrometer or measuring a mass spectrum $I_{meas}(p)$ of the sample with a mass spectrometer and reducing the measured mass spectrum $I_{meas}(p)$ to a neutral mass spectrum $I_{neut}(p)$;
- (ii) determining for a peak of interest $C_{int}$ of the measured mass spectrum $I_{meas}(p)$ or neutral mass spectrum $I_{neut}(p)$ a set $S_{cand}$ of candidate species of molecules $M_{cand}$ that is defined according to an expectation regarding which kind of species of molecules can be present in the sample from a set $S_{inv}$ of species of molecules $M_{inv}$ which have an expected peak $C_{ex,inv}$ in a mass spectrum corresponding to the measured mass spectrum $I_{meas}(p)$ or the neutral mass spectrum $I_{neut}(p)$ with a peak position $p_{ex,inv}$ within a peak position tolerance range $\Delta p_{tol}$ assigned to the peak of interest $C_{int}$ in the corresponding measured mass spectrum $I_{meas}(p)$ or neutral mass spectrum $I_{neut}(p)$;
- (iii) determining for each candidate species $M_{cand}$ of the set $S_{cand}$ of candidate species of molecules $M_{cand}$ an identification mass spectrum $I_{id,M\_cand}(p)$ showing at least a part of an isotope distribution of the molecule $M_{cand}$ corresponding to the measured mass spectrum $I_{meas}(p)$ or the neutral mass spectrum $I_{neut}(p)$ and determining a range of peak positions $\Delta p$ comprising the peak positions $p_{id,M\_cand,i}$ of all peaks $C_{id,M\_cand,i}$ of the identification mass spectra $I_{id,M\_cand}(p)$ corresponding to the measured mass spectrum $I_{meas}(p)$ or the neutral mass spectrum $I_{neut}(p)$ of all candidate species $M_{cand}$ of the set $S_{cand}$ of candidate species of molecules $M_{cand}$;
- (iv) comparing the measured mass spectrum $I_{meas}(p)$ or the neutral mass spectrum $I_{neut}(p)$ with the identification mass spectrum $I_{id,M\_cand}(p)$ of candidate species $M_{cand}$ of the set $S_{cand}$ of candidate species of molecules $M_{cand}$ corresponding to the measured mass spectrum $I_{meas}(p)$ or the neutral mass spectrum $I_{neut}(p)$ in the determined range of peak positions $\Delta p$ with a first method, which is determining a first subscore $s_{1,M\_cand}$ for the candidate species $M_{cand}$, and with a second method, which is determining a second subscore $s_{2,M\_cand}$ for the candidate species $M_{cand}$, wherein the first subscore $s_{1,M\_cand}$ is addressing all peaks $C_{id,M\_cand,i}$ in the identification mass spectrum $I_{id,M\_cand}(p)$ of the candidate species $M_{cand}$, which are not identified in the measured mass spectrum $I_{meas}(p)$ or neutral mass spectrum $I_{neut}(p)$, and wherein the second subscore $s_{2,M\_cand}$ is addressing all peaks $C_{meas,i}$ in the measured mass spectrum $I_{meas}(p)$ or all peaks $C_{neut,i}$ in the neutral mass spectrum $I_{neut}(p)$, which are not identified in the identification mass spectrum $I_{id,M\_cand}(p)$ of the candidate species $M_{cand}$ and wherein at first the comparison is done with one method for each candidate species $M_{cand}$ and only if the subscore $S_{i,M\_cand}$ of this method is higher than a threshold value $S_{th,2,cal}$ the comparison with the other method is done and calculating for each candidate species $M_{cand}$ of the set $S_{cand}$ of candidate species of molecules $M_{cand}$ a final score $fs_{M\_cand}$ from the subscores $S_{i,M\_cand}$, for which both subscores of the first method and the second method $S_{1,M\_cand}$ and $S_{1,M\_cand}$ have been calculated or for which both subscores of the first method and the second method $s_{1,M\_cand}$ and $s_{1,M\_cand}$ have been calculated and one of both of the subscores of the first method and the second method $s_{1,M\_cand}$ and $s_{1,M\_cand}$ are higher than an assigned threshold value $s_{i,th,fs}$ for calculating the final score $fs_{M\_cand}$;
- (v) determining one or more calculated final scores $fs_{high,k}$ having the highest values;
- (vi) determining the elemental composition of the candidate species $M_{cand,high\_k}$ of the set $S_{cand}$ of candidate species of molecules $M_{cand}$ which have the one or more calculated final scores $fs_{high,\,k}$ of the highest values by looking up the elemental composition of the candidate species $M_{cand,high\ k}$.

14. A mass spectrometer able to execute the method of claim 13.

15. A mass spectrometer able to execute the method of claim 1.

16. A mass spectrometer able to execute the method of claim 12.

* * * * *